(12) United States Patent
Ibuki

(10) Patent No.: US 8,999,436 B2
(45) Date of Patent: Apr. 7, 2015

(54) OPTICAL FUNCTIONAL FILM, ANTIREFLECTION FILM, POLARIZING PLATE AND IMAGE DISPLAY DEVICE

(75) Inventor: Shuntaro Ibuki, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 2500 days.

(21) Appl. No.: 10/571,990

(22) PCT Filed: Sep. 13, 2004

(86) PCT No.: PCT/JP2004/013694
§ 371 (c)(1),
(2), (4) Date: Mar. 15, 2006

(87) PCT Pub. No.: WO2005/026789
PCT Pub. Date: Mar. 24, 2005

(65) Prior Publication Data
US 2007/0035839 A1      Feb. 15, 2007

(30) Foreign Application Priority Data

Sep. 16, 2003   (JP) ................................. 2003-323414

(51) Int. Cl.
*B05D 5/06*       (2006.01)
(52) U.S. Cl.
CPC ....................................... *G02B 1/111* (2013.01)
(58) Field of Classification Search
CPC .......... G02B 1/10; G02B 5/201; G02B 1/105; G02B 1/111; G11B 7/26; C03C 2217/425
USPC ............................ 427/160–169, 248.1–255.7
See application file for complete search history.

(56) References Cited

U.S. PATENT DOCUMENTS

| | | | |
|---|---|---|---|
| 5,449,558 A | 9/1995 | Hasegawa et al. | |
| 6,319,594 B1 * | 11/2001 | Suzuki et al. | 428/208 |
| 2002/0085284 A1 | 7/2002 | Nakamura et al. | |
| 2003/0072943 A1 * | 4/2003 | Anderson et al. | 428/411.1 |

FOREIGN PATENT DOCUMENTS

| | | |
|---|---|---|
| JP | 7-168005 A | 7/1995 |
| JP | 11-209490 | 8/1999 |

(Continued)

OTHER PUBLICATIONS

Haruo Kiryu, Advanced Technology of Coating Additives, CMC 2001.

(Continued)

*Primary Examiner* — David Turocy
*Assistant Examiner* — Michael G Miller
(74) *Attorney, Agent, or Firm* — Buchanan, Ingersoll & Rooney PC

(57) ABSTRACT

Provided are an optical functional film including at least one functional layer, where the functional layer comprises a copolymer having a polymerization unit derived from a fluoroaliphatic group-containing monomer in a content of 10 weight % or more and the fluoroaliphatic group-containing copolymer is localized on the surface of the functional layer; an optical functional film obtained by coating an upper layer on the functional layer; an antireflection film, where the upper layer is a low refractive index layer; a polarizing plate using such a film for one of two protective sheets of a polarizer; and an image display device using the above-described optical functional film, antireflection film or polarizing plate for the outermost surface of the display.

7 Claims, 1 Drawing Sheet

(56) References Cited

FOREIGN PATENT DOCUMENTS

| | | | |
|---|---|---|---|
| JP | 2000-144118 | 5/2000 | |
| JP | 2000-284102 | 10/2000 | |
| JP | 2000-301053 | 10/2000 | |
| JP | 2002-98803 | 4/2002 | |
| JP | 2002-202402 A | 7/2002 | |
| JP | 2002-249706 | 9/2002 | |
| JP | 2003-020303 A * | 1/2003 | ................ C08F 2/44 |
| JP | 2003-026732 A | 1/2003 | |
| JP | 2004-45971 | 2/2004 | |
| JP | 2004-126532 | 4/2004 | |

OTHER PUBLICATIONS

Official Action issued Feb. 9, 2010, in corresponding Japanese Patent Application No. 2004-268497, together with an English translation thereof.

* cited by examiner

OPTICAL FUNCTIONAL FILM, ANTIREFLECTION FILM, POLARIZING PLATE AND IMAGE DISPLAY DEVICE

TECHNICAL FIELD

The present invention relates to an optical functional film, an antireflection film, a polarizing plate using the optical functional film or antireflection film, and an image display device equipped with the optical functional film or antireflection film.

BACKGROUND ART

In a display device such as cathode ray tube display device (CRT), plasma display panel (PDP), electroluminescence display (ELD) and liquid crystal display device (LCD), an antireflection film as an optical functional film is generally disposed on the outermost surface of the display to reduce the reflectance by using the principle of optical interference and thereby prevent the external light reflection which causes reduction in contrast or projection of an image.

Such an antireflection film can be generally produced by forming a low refractive index layer of an appropriate thickness on a support, in which the refractive index of the low refractive index layer is lower than that of the support. In order to realize a low reflectance, a material having a refractive index as low as possible is preferably used for the low refractive index layer. Furthermore, since the antireflection film is used on the outermost surface of a display, this film is required to have high scratch resistance. In order to realize high scratch resistance of a thin film with a thickness of about 100 nm, strength of the film itself and tight adhesion to the underlying layer are necessary.

With recent trend toward thin and large displays, the antireflection film is required to have a wide area and a uniform surface state. Also increase in the productivity of antireflection film is demanded in view of cost reduction and for this purpose, high-rate coating is an essential technique. However, the high-rate coating is liable to cause film thickness unevenness due to associated wind or drying air and the surface state uniformity required of the antireflection film can be hardly maintained. The "surface state uniformity" as used herein means that fluctuation in the optical performances represented by antireflection and in the film properties such as scratch resistance is small in the entire display part of a display.

The film thickness unevenness accompanying the high-rate coating is known to be effectively improved by enhancing the leveling property of the coating solution. One technique heretofore proposed for enhancing the leveling property is a method of adding a surfactant in the coating solution. This method is based on the mechanism that when a surfactant is added in the coating solution, the surface tension decreases to improve the wetting to a material on which the coating-solution is coated, and the change of surface tension in the process of forming a coating film is made small or reduced to prevent heat convection and thereby improve the film uniformity (see, Haruo Kiryu (supervisor), Coating Yo Tenka Zai no Saishin Gijutsu (Up-to-date Technology of Additives for Coating), CMC (0.2001)).

JP-A-2002-249706 (the term "JP-A" as used herein means an "unexamined published Japanese patent application") discloses a case where excellent leveling property can be realized by using a fluorine-base polymer-type surfactant containing a perfluoroalkyl group having 6 or less carbon atoms. However, when the coating is performed by using a fluorine-base surfactant, a uniform film may be formed by virtue of its leveling effect, but the surface free energy of the coating film formed after drying decreases and this causes a problem that when another material is laminated on the coating film surface or coating is further applied thereon, the adhesion at the interface is weak and the scratch resistance becomes bad.

DISCLOSURE OF THE INVENTION

An object of the present invention is to provide an optical functional film having sufficiently high interlayer adhesion and a production method therefor.

Another object of the present invention is to provide an antireflection film having antireflection property and scratch resistance, and the antireflection film is capable of being produced by high-rate coating.

Still another object of the present invention is to provide a polarizing plate using the above-described optical functional film or antireflection film.

Yet still another object of the present invention is to provide an image display device equipped with the above-described optical functional film, antireflection film or polarizing plate.

As a result of intensive investigations, the present inventors have found that when a specific additive is localized on the surface of a lower layer to reduce the film thickness unevenness upon coating the lower layer and diffuses into an upper layer to eliminate the localization of the additive on the lower layer surface (interface between the upper layer and the lower layer) upon coating the upper layer, uniformity of the surface state can be maintained even at high-rate coating, excellent adhesion can be obtained between the upper layer and the lower layer, and thereby an antireflection film having high scratch resistance can be provided.

According to the present invention, an optical functional film, a production process therefor, an antireflection film, a polarizing plate and a display device, having the following constitutions, are provided, whereby the above-described objects can be attained.

1. An optical functional layer comprising a fluoroaliphatic group-containing copolymer, the fluoroaliphatic group-containing copolymer having a polymerizable unit derived from a fluoroaliphatic group-containing monomer in a content of 10 weight % or more, and being localized on a surface of the functional layer.

2. An optical functional film obtained by coating an upper layer on the functional layer described in 1 in which a fluoroaliphatic group-containing copolymer is localized on the surface.

3. The optical functional film as described in 2 above, wherein the fluoroaliphatic group-containing copolymer is a copolymer having on a side chain thereof a perfluoroalkyl group including 4 or more carbon atoms or fluoroalkyl group having a $CF_2H-$ group including 4 or more carbon atoms.

4. The optical functional film described in 2 or 3, comprising a transparent support having thereon at least two adjacent functional layers, wherein out of multiple adjacent functional layers, the fluoroaliphatic group-containing copolymer is contained in a layer remoter from the support in a larger amount than in a layer closer to the support.

5. The optical functional film as described in 2 to 4 above, wherein multiple adjacent functional layers contain a cured composition of an ionizing radiation-curable resin or thermosetting resin.

6. A antireflection film, which is the optical functional film as described in 4 or 5 above, wherein out of the at least two functional layers, the functional layer remoter from the support is a low refractive index layer containing a cured composition of a crosslinking fluorine-containing polymer.

7. The antireflection film as described in 6 above, wherein the functional layer closer to the support is a hard coat layer, an antiglare layer, a light-diffusing layer or a high refractive index layer.

8. The antireflection film as described in 6 or 7 above, wherein the low refractive index layer contains at least one kind of silica fine particle having an average particle size corresponding to 30 to 150% of the thickness of the low refractive index layer.

9. The antireflection film as described in 8 above, wherein the at least one kind of silica fine particle contained in the low refractive index layer is a hollow silica fine particle and the refractive index of the silica fine particle is from 1.17 to 1.40.

10. The antireflection film as described in any one of 6 to 9 above, wherein the fluorine-containing polymer is a copolymer (P) with the copolymer main chain comprising only carbon atoms, and the copolymer containing on a side chain thereof a polymerization unit derived from a fluorine-containing vinyl monomer and a polymerization unit having a (meth)acryloyl group.

11. The antireflection film as described in 1.0 above, wherein the copolymer (P) is represented by the following formula 1:

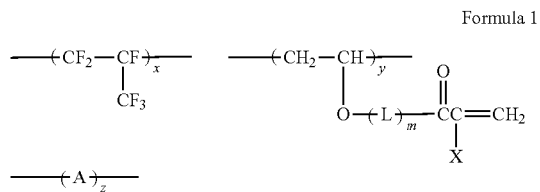

Formula 1 wherein L represents a linking group having from 1 to 10 carbon atoms, m represents 0 or 1, X represents a hydrogen atom or a methyl group, A represents an arbitrary vinyl monomer polymerization unit and may comprise a single component or multiple components, and x, y and z represent mol % of respective, constituent components and each represents a value satisfying $30 \le x \le 60$, $5 \le y \le 70$ and $0 \le z \le 65$.

12. The antireflection film as described in any one of 6 to 11 above, wherein the functional layer closer to the support is a high refractive index layer and the high refractive index layer is a constituent layer with a refractive index of 1.55 to 2.40, the refractive index layer comprising an inorganic fine particle which contains titanium dioxide as a main component and also at least one element selected from cobalt, aluminum and zirconium.

13. A method for producing the optical functional film or antireflection film described in any one of 3 to 12 above, comprising coating and then curing a second functional layer on an optical functional film comprising a transparent support having thereon a first functional layer on a surface of which a fluoroaliphatic group-containing copolymer is localized.

14. The method as described in 1.3 above, wherein a surface tension of a coating solution for forming the first functional layer containing the fluoroaliphatic group-containing copolymer decreases by 1 mN/m or more resulting from addition of the copolymer.

15. The method as described in 13 or 14, wherein a main solvent of coating solutions for forming the two functional layers is a ketone, an aromatic hydrocarbon or an ester.

16. The method for producing an optical functional film as described in 15 above, wherein a main solvent of a coating solution for forming the second functional layer is a ketone.

17. The method as described in 16 above, wherein the main solvent of the coating solution for forming the first functional layer is different from the main solvent of the coating solution for forming the second functional layer.

18. A method for producing an optical functional film, comprising adjacently forming at least a first functional layer and a second functional layer in this order on a transparent support above, wherein when the first functional layer is formed and then a solvent of a coating solution for forming the second functional layer is coated on the first functional layer, the surface free energy of the first functional layer changes by 1 mN/m or more.

19. A method for producing an optical functional film, comprising adjacently forming at least a first functional layer and a second functional layer in this order on a transparent support above wherein a coating composition for forming the first functional layer contains a fluoroaliphatic group-containing copolymer having polymerization unit derived from a fluoroaliphatic group-containing monomer in a content of 10 weight % or more, the fluoroaliphatic group-containing copolymer is localized on a surface of the first functional layer when a coating Composition for forming the first functional layer is coated, and the fluoroaliphatic group-containing copolymer dissolves out into a coating composition for forming the second functional layer when the second functional layer is coated.

20. A polarizing plate comprising a polarizer and two protective sheets therefor, one protective sheet being the optical functional film described in any one of 1 to 5, the antireflection film described in 6 to 12 or the optical functional film produced by the production method described in 13 to 19.

21. The polarizing plate as described in 20 above, wherein out of two protective films for the polarizer, a film other than the antireflection film is an optical compensatory film having an optical compensation layer comprising an optically anisotropic layer, the optically anisotropic layer is a layer formed from a compound having a discotic structure unit, the disc plane of the discotic structure unit is inclined with respect to a plane of the surface protective film, and an angle made between the disc plane of the discotic structure unit and the plane of the surface protective film is changing in a dept direction of the optically anisotropic layer.

22. An image display device using the optical functional film described in any one of 1 to 5, the antireflection film described in 6 to 12, the optical functional film produced by the production method described in 13 to 18 or the polarizing plate described in 19 to 21, for the outermost surface of the display.

23. A TN-mode, STN-mode, VA-mode, IPS-mode or OCB-mode transmissive, reflective or transflective liquid crystal display device having at least one sheet of the polarizing plate described in 19 to 21.

BEST MODE FOR CARRYING OUT THE INVENTION

As one mode for practicing the present invention, the fundamental constitution of the antireflection film, which is one preferred embodiment of the optical functional film of the present invention, is described below by referring to drawings. The term "from (numerical value 1) to (numerical value 2)" as used in the present invention means that "(numerical value 1) or more and (numerical value 2) or less".

Figure 1:
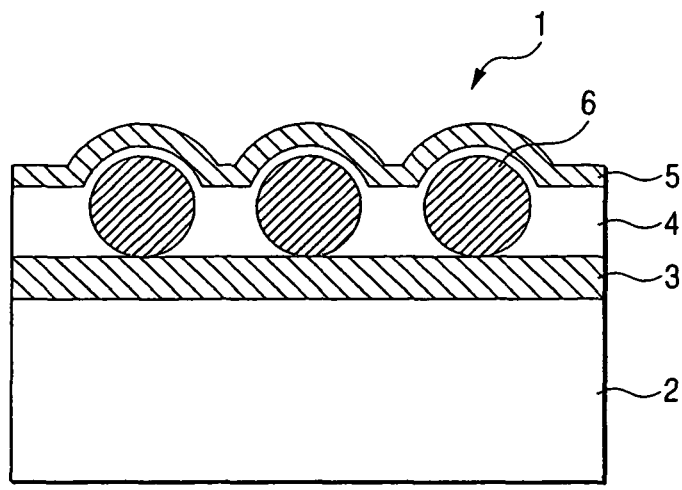
FIG. 1(a) is a schematic cross-sectional view showing the layer structure of an antiglare and antireflection film.
FIG. 1(b) is a schematic cross-sectional view showing the layer structure of an antireflection film excellent in the antireflection performance.
Figure 1:
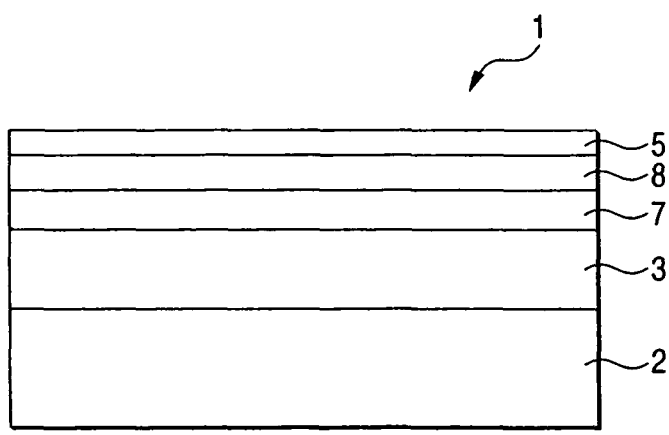

FIG. 1(a) is a cross-sectional view schematically showing one example of the antireflection film of the present invention. The antireflection film 1 has a layer structure of a transparent support 2 and three functional layers (hard coat layer 3, antiglare hard coat layer 4, low refractive index layer 5) in this order. In the antiglare hard coat layer 4, mat particles 6 are dispersed and the material constituting the portion other than the mat particle 6 of the antiglare hard coat layer 4 preferably has a refractive index of 1.50 to 2.00. The refractive index of the low refractive index layer 5 is preferably from 1.30 to 1.44. In the present invention, the functional layer may be a hard coat layer having such antiglare property, a hard coat layer not having the antiglare property or a light-diffusing layer, and may be constituted by one layer or multiple layers, for example, two, three or four layers. The low refractive index layer, which is a functional layer, is provided as an outermost layer.

Furthermore, from the standpoint of obtaining a low reflectance, the low refractive index layer preferably satisfies the following formula (VII):

$$(m/4) \times 0.7 < n_1 d_1 < (m/4) \times 1.3 \quad \text{Formula (VII)}$$

wherein m is a positive odd number, $n_1$ is a refractive index of the low refractive index layer, $d_1$ is a film thickness (nm) of the low refractive index layer, and $\lambda$ is a wavelength and is a value in the range from 500 to 550 nm.

When formula (VII) is satisfied, this means that m (positive odd number, usually 1) satisfying formula (VII) is present in the above-described wavelength range.

FIG. 1(b) is a cross-sectional view schematically showing one example of the antireflection film of the present invention, where the antireflection film 1 has a layer structure of a transparent support 2, respective functional layers (hard coat layer 3, medium refractive index layer 7 and high refractive index layer 8) and a low refractive index layer (outermost layer) 5 in this order. The transparent support 2, the medium refractive index layer 7, the high refractive index layer 8 and the low refractive, layer 5 have refractive indexes satisfying the following relationship:

Refractive index of high refractive index layer>refractive index of medium refractive index layer>refractive index of transparent support>refractive index of low refractive index layer As described in JP-A-59-50401, in the layer structure shown in FIG. 1(b), the medium refractive index layer, the high refractive index layer and the low refractive index layer preferably satisfy the following formulae (I), (II) and (III), respectively, because an antireflection film having more excellent antireflection performance can be produced.

$$(h\lambda/4) \times 0.7 < n_1 d_1 < (h\lambda/4) \times 1.3 \quad \text{Formula (I):}$$

wherein h is a positive integer (generally 1, 2 or 3), $n_1$ is a refractive index of the medium refractive index layer, $d_1$ is a layer thickness (nm) of the medium refractive index layer, and $\lambda$ is a wavelength (nm) of visible light and is a value in the range from 380 to 680 nm;

$$(i\lambda/4) \times 0.7 < n_2 d_2 < (i\lambda/4) \times 1.3 \quad \text{Formula (II):}$$

wherein i is a positive integer (generally 1, 2 or 3), $n_2$ is a refractive index of the high refractive index layer, $d_2$ is a layer thickness (nm) of the high refractive index layer, and $\lambda$ is a wavelength (nm) of visible light and is a value in the range from 380 to 680 nm;

$$(j\lambda/4) \times 0.7 < n_3 d_3 < (j\lambda/4) \times 1.3 \quad \text{Formula (III):}$$

wherein j is a positive odd number (generally 1), $n_3$ is a refractive index of the low refractive index layer, $d_3$ is a layer thickness (nm) of the low refractive index layer, and $\lambda$ is a wavelength (nm) of visible light and is a value in the range from 380 to 680 nm.

In the layer structure shown in FIG. 1(b), the medium refractive index layer, the high refractive index layer and the low refractive index layer preferably satisfy the following formulae (IV), (V) and (VI), respectively. In formulae, $\lambda$ is 500 nm, h is 1, i is 2 and j is 1.

$$(h\lambda/4) \times 0.80 < n_1 d_1 < (h\lambda/4) \times 1.00 \quad \text{Formula (IV)}$$

$$(i\lambda/4) \times 0.75 < n_2 d_2 < (i o/4) \times 0.95 \quad \text{Formula (V)}$$

$$(j\lambda/4) \times 0.95 < n_3 d_3 < (j\lambda/4) \times 1.05 \quad \text{Formula (VI)}$$

The high refractive index, medium refractive index and low refractive index as used herein mean a relative height of the refractive index among layers. In FIG. 1(b), the high refractive index layer is used as a light interference layer and therefore, an antireflection film having a remarkably excellent antireflection performance can be produced.

The functional layer in the optical functional film, particularly, antireflection film, of the present invention is described below. In the present invention, the functional layer may be either an optical functional layer or a physical functional layer. The optical functional layer includes a low refractive index layer, a high refractive index layer and a light-diffusing layer, and the physical functional layer includes a hard coat layer and the like. Of course, the functional layer sometimes serves as both an optical functional layer and a physical functional layer and, for example, an antiglare hard coat layer comes under this case.

In the antireflection film of the present invention, the functional layer contains a fluoroaliphatic group-containing copolymer in the coating composition for forming the functional layer so as to ensure surface state uniformity free of coating unevenness, drying unevenness, dot defects and the like when applied by high-rate coating. This fluoroaliphatic group-containing copolymer is preferred because it brings out an effect of improving surface state failures of the antireflection film, such as coating unevenness, drying unevenness and dot defect, by the addition in a smaller amount.

However, when the above-described fluoroaliphatic group-containing copolymer is used, the functional group containing F atom is localized on the functional layer surface, as a result, the surface energy of the functional layer decreases and this causes a problem that when a low refractive index layer is overcoated on the functional layer, the antireflection performance and scratch resistance are worsened.

The antireflection performance is presumed to decrease because the wettability of the coating composition for forming the low refractive index layer is worsened and the visually undetectable fine unevenness is generated in the film thickness of the low refractive index layer. The scratch resistance is presumed to decrease because the surface energy difference at the interface between the functional layer and the low refractive index layer becomes large and the adhesive property changes for the worse.

In the present invention, it has been found that these problems can be effectively overcome by selecting a fluoroaliphatic group-containing copolymer structure where the copolymer localized on the functional layer surface is extracted by the solvent of an upper layer when coating the upper layer (for example, low refractive index layer), and is caused not to be present on the functional layer surface (functional layer interface) when forming the antireflection film of the present invention. Furthermore, this effect is effectively enhanced by adjusting the amount added of the fluoroaliphatic group-containing copolymer.

In the antireflection film of the present invention, in order to obtain surface state uniformity of the functional layer at high-rate coating, a fluoroaliphatic group-containing copolymer containing 10 weight % or more of a fluoroaliphatic group-containing monomer polymerization unit must be added to the coating solution for the functional group, so that the fluoroaliphatic containing-copolymer can be segregated (localized) on the surface. The surface tension of the coating solution preferably decreases by 1 mN/m or more resulting from the addition of the fluoroaliphatic group-containing copolymer.

In the antireflection film of the present invention, in order to obtain tight adhesion to an upper layer, the surface free energy of the functional layer preferably changes by 1 mN/m or more, more preferably 3 mN/m or more, when the solvent of a coating solution for forming the upper layer is coated and dried on the functional layer containing the fluoroaliphatic group-containing copolymer.

In an optical functional film obtained by forming a first functional layer from a coating composition containing the fluoroaliphatic group-containing copolymer of the present invention and then forming a second functional layer on the first functional layer, the fluoroaliphatic group-containing copolymer is localized on the surface of the first functional layer when the first functional layer is formed, but the fluoroaliphatic group-containing copolymer localized on the first functional layer surface diffuses into the second functional layer when coating the second functional layer, as a result, the content of the fluoroaliphatic group-containing copolymer becomes large in the second functional layer.

The fluoroaliphatic group-containing copolymer (sometimes simply referred to as a "fluorine-base polymer") is preferably a copolymer having on the side chain thereof a perfluoroalkyl group including 4 or more carbon atoms or fluoroalkyl group having a CF$_2$H— group including 4 or more carbon atoms.

In particular, an acryl or methacryl resin containing a repeating unit (polymerization unit) corresponding to the monomer of the following (i) and a repeating unit (polymerization unit) corresponding to the monomer of the following (ii), or a copolymer with a vinyl-base monomer copolymerizable with such a polymer is useful. As for the monomer, those described in J. Brandrup, Polymer Handbook, 2nd ed., Chapter 2, pages 1 to 483, Wiley Interscience (1975) can be used.

Examples thereof include compounds having one addition-polymerizable unsaturated bond selected from acrylic acid, methacrylic acid, acrylic acid esters, methacrylic acid esters, acrylamides, methacrylamides, allyl compounds, vinyl ethers and vinyl esters.

(i) Fluoroaliphatic Group-Containing Monomer Represented by the Following Formula 2

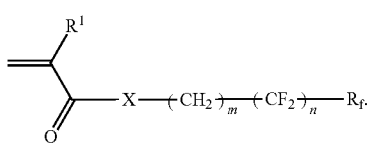

Formula 2

In formula 2, $R^1$ represents a hydrogen atom, a halogen atom or a methyl group, preferably a hydrogen atom or a methyl group. X represents an oxygen atom, a sulfur atom or —N($R^{12}$)—, preferably an oxygen atom or —N($R^{12}$)—, more preferably an oxygen atom. $R^{12}$ represents a hydrogen atom or an alkyl group having from 1 to 8 carbon atoms, which may have a substituent, preferably a hydrogen atom or an alkyl group having from 1 to 4 carbon atoms, more preferably a hydrogen atom or a methyl group. $R_f$ represents —CF$_3$ or —CF$_2$H.

In formula 2, m represents an integer of 1 to 6, preferably from 1 to 3, more preferably 1.

In formula 2, n represents an integer of 1 to 17, preferably from 4 to 11, more preferably 6 or 7. $R_f$ is preferably —CF$_2$H.

In the fluorine-base polymer, two or more polymerization units derived from the fluoroaliphatic group-containing monomer represented by formula 2 may be contained as constituent components.

(ii) Monomer Copolymerizable with (i), Represented by the Following Formula 3

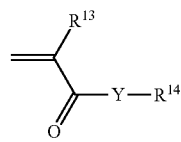

Formula 3

In formula 3, $R^{13}$ represents a hydrogen atom, a halogen atom or a methyl group, preferably a hydrogen atom or a methyl group. Y represents an oxygen atom, a sulfur atom or —N($R^{15}$)—, preferably an oxygen atom or —N($R^{15}$)—, more preferably an oxygen atom. $R^{15}$ represents a hydrogen atom or an alkyl group having from 1 to 8 carbon atoms, preferably a hydrogen atom or an alkyl group having from 1 to 4 carbon atoms, more preferably a hydrogen atom or a methyl group.

$R^{14}$ represents a linear, branched or cyclic alkyl group having from 1 to 60 carbon atoms, which may have a substituent, or an aromatic group (e.g., phenyl, naphthyl) which may have a substituent. The alkyl group may contain a poly(alkyleneoxy) group. A liner, branched or cyclic alkyl group having from 1 to 12 carbon atoms, an alkyl group containing a poly(alkyleneoxy) group having from 5 to 40 carbon atoms, or an aromatic group having a total carbon number of 6 to 18 is preferred, and a cyclic alkyl group or an alkyl group containing a poly(alkyleneoxy) group having from 5 to 30 carbon atoms is very preferred. The poly(alkyleneoxy) group is described below.

The poly(alkyleneoxy) group can be presented by (OR)$_x$, wherein R is an alkylene group having from 2 to 4 carbon atoms, preferably, for example, —CH$_2$CH$_2$—, —CH$_2$CH$_2$CH$_2$—, —CH(CH$_3$) CH$_2$— or —CH(CH$_3$)CH(CH$_3$)—, and x is a number of 2 to 30, preferably from 2 to 20, more preferably from 4 to 15.

In the poly(oxyalkylene) group, the oxyalkylene units may be the same with each other like poly(oxypropylene), or two or more oxyalkylenes differing from each other may be irregularly distributed. The oxyalkylene unit may be a linear or branched oxypropylene or oxyethylene unit or may be present as a linear or branched oxypropylene unit block or an oxyethylene unit block.

The poly(oxyalkylene) chain can include those linked by one or more chain bond (for example, —CONH-Ph-NHCO and —S—, wherein Ph represents a phenylene group). When the chain bond has three or more valences, a branched oxyalkylene unit is obtained. In the case of using this copolymer in the present invention, the molecular weight of the poly(oxyalkylene) group is suitably from 250 to 3,000.

The poly(oxyalkylene) acrylate or methacrylate can be produced by reacting a hydroxy poly(oxyalkylene) material commercially available under trade names of "Pluronic" (produced by Asahi Denka Co., Ltd.), "Adeca-Polyether" (produced by Asahi Denka Co., Ltd.), "Carbowax" (produced by Glyco Products Co.), "Toriton" (produced by Rohm and Haas Co.) and "P.E.G." (produced by Dai-ichi Kogyo Seiyaku Co., Ltd.), with acrylic acid, methacrylic acid, acryl chloride, methacryl chloride or acrylic anhydride according to a known method. Also, poly(oxyalkylene)diacrylate and the like produced by a known method can be used.

The amount of the fluoroaliphatic group-containing monomer represented by formula 2, which is used in the production of the fluorine-base polymer for use in the present invention, is 10 weight % or more, preferably from 50 weight % or more, more preferably from 70 to 100 weight %, still more preferably from 80 to 100 weight %, based on the entire monomer amount in the fluorine-base polymer.

The weight average molecular weight of the fluorine-base polymer for use in the present invention is preferably from 3,000 to 100,000, more preferably from 6,000 to 80,000, still more preferably from 8,000 to 60,000.

The weight average molecular weight and the weight average molecular weight are a molecular weight in terms of polystyrene determined according to solvent THF or differential refractive index detection by a GPC analyzer using columns TSKgel GMHxL, TSKgel G4000HxL and TSKgel G2000Hxl (all are trade names produced by Tosoh Corp.) The molecular weight is calculated from peak areas of 300 or more components.

In view of expression of effect by the addition, drying and prevention of surface state failures, the amount added of the fluorine-base polymer for use in the present invention is preferably from 0.001 to 5 weight %, more preferably from 0.005 to 3 weight %, still more preferably from 0.01 to 1 weight %, based on the weight of the coating solution.

Specific structural examples of the fluorine-base polymer for use in the present invention are set forth below, but the present invention is not limited thereto. In formulae, the numeral indicates the molar ratio of each monomer component and Mw indicates the weight average molecular weight.

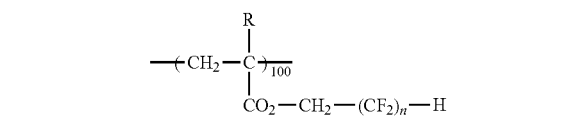

| | R | n | Mw |
|---|---|---|---|
| FP-1 | H | 4 | 8000 |
| FP-2 | H | 4 | 16000 |
| FP-3 | H | 4 | 33000 |
| FP-4 | $CH_3$ | 4 | 12000 |
| FP-5 | $CH_3$ | 4 | 28000 |
| FP-6 | H | 6 | 8000 |
| FP-7 | H | 6. | 14000 |
| FP-8 | H | 6 | 29000 |
| FP-9 | $CH_3$ | 6 | 10000 |
| FP-10 | $CH_3$ | 6 | 21000 |
| FP-11 | H | 8 | 4000 |
| FP-12 | H | 8 | 16000 |
| FP-13 | H | 8 | 31000 |
| FP-14 | $CH_3$ | 8 | 3000 |
| FP-15 | $CH_3$ | 8 | 10000 |
| FP-16 | $CH_3$ | 8 | 27000 |
| FP-17 | H | 10 | 5000 |

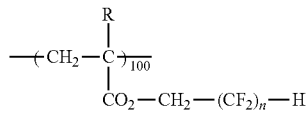

| | R | n | Mw |
|---|---|---|---|
| FP-18 | H | 10 | 11000 |
| FP-19 | $CH_3$ | 10 | 4500 |
| FP-20 | $CH_3$ | 10 | 12000 |
| FP-21 | H | 12 | 5000 |
| FP-22 | H | 12 | 10000 |
| FP-23 | $CH_3$ | 12 | 5500 |
| FP-24 | $CH_3$ | 12 | 12000 |

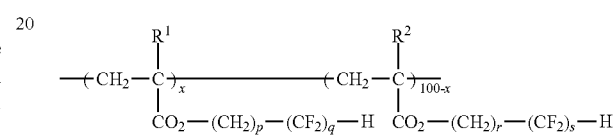

| | x | $R^1$ | p | q | $R^2$ | r | s | Mw |
|---|---|---|---|---|---|---|---|---|
| FP-25 | 50 | H | 1 | 4 | $CH_3$ | 1 | 4 | 10000 |
| FP-26 | 40 | H | 1 | 4 | H | 1 | 6 | 14000 |
| FP-27 | 60 | H | 1 | 4 | $CH_3$ | 1 | 6 | 21000 |
| FP-28 | 10 | H | 1 | 4 | H | 1 | 8 | 11000 |
| FP-29 | 40 | H | 1 | 4 | H | 1 | 8 | 16000 |
| FP-30 | 20 | H | 1 | 4 | $CH_3$ | 1 | 8 | 8000 |
| FP-31 | 10 | $CH_3$ | 1 | 4 | $CH_3$ | 1 | 8 | 7000 |
| FP-32 | 50 | H | 1 | 6 | $CH_3$ | 1 | 6 | 12000 |
| FP-33 | 50 | H | 1 | 6 | $CH_3$ | 1 | 6 | 22000 |
| FP-34 | 30 | H | 1 | 6 | $CH_3$ | 1 | 6 | 5000 |
| FP-35 | 40 | $CH_3$ | 1 | 6 | H | 3 | 6 | 3000 |
| FP-36 | 10 | H | 1 | 6 | H | 1 | 8 | 7000 |
| FP-37 | 30 | H | 1 | 6 | H | 1 | 8 | 17000 |
| FP-38 | 50 | H | 1 | 6 | H | 1 | 8 | 16000 |
| FP-39 | 50 | $CH_3$ | 1 | 6 | H | 3 | 8 | 19000 |
| FP-40 | 50 | H | 1 | 8 | $CH_3$ | 1 | 8 | 5000 |
| FP-41 | 80 | H | 1 | 8 | $CH_3$ | 1 | 8 | 10000 |
| FP-42 | 50 | $CH_3$ | 1 | 8 | H | 3 | 8 | 14000 |
| FP-43 | 90 | H | 1 | 8 | $CH_3$ | 3 | 8 | 9000 |
| FP-44 | 70 | H | 1 | 8 | H | 1 | 10 | 7000 |
| FP-45 | 90 | H | 1 | 8 | H | 3 | 10 | 12000 |
| FP-46 | 50 | H | 1 | 8 | H | 1 | 12 | 10000 |
| FP-47 | 70 | H | 1 | 8 | $CH_3$ | 3 | 12 | 8000 |

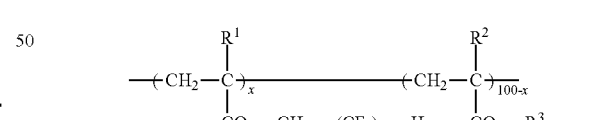

| | x | $R^1$ | n | $R^2$ | $R^3$ | Mw |
|---|---|---|---|---|---|---|
| FP-48 | 80 | H | 4 | $CH_3$ | $CH_3$ | 11000 |
| FP-49 | 90 | H | 4 | H | $C_4H_9(n)$ | 7000 |
| FP-50 | 95 | H | 4 | H | $C_6H_{13}(n)$ | 5000 |
| FP-51 | 90 | $CH_3$ | 4 | H | $CH_2CH(C_2H_5)C_4H_9(n)$ | 15000 |
| FP-52 | 70 | H | 6 | $CH_3$ | $C_2H_5$ | 18000 |
| FP-53 | 90 | H | 6 | $CH_3$ | (cyclohexyl-H) | 12000 |
| FP-54 | 80 | H | 6 | H | $C_4H_9(sec)$ | 9000 |
| FP-55 | 90 | H | 6 | H | $C_{12}H_{25}(n)$ | 21000 |

$$-(-CH_2-\underset{\underset{CO_2-CH_2-(CF_2)_n-H}{|}}{\overset{\overset{R^1}{|}}{C}})_x-(-CH_2-\underset{\underset{CO_2-R^3}{|}}{\overset{\overset{R^2}{|}}{C}})_{100-x}-$$

|       | x  | R¹  | n  | R²  | R³ | Mw |
|-------|----|-----|----|-----|----|-----|
| FP-56 | 60 | CH₃ | 6  | H   | CH₃ | 15000 |
| FP-57 | 60 | H   | 8  | H   | CH₃ | 10000 |
| FP-58 | 70 | H   | 8  | H   | C₂H₅ | 24000 |
| FP-59 | 70 | H   | 8  | H   | C₄H₉(n) | 5000 |
| FP-60 | 50 | H   | 8  | H   | C₄H₉(n) | 16000 |
| FP-61 | 80 | H   | 8  | CH₃ | C₄H₉(iso) | 13000 |
| FP-62 | 80 | H   | 8  | CH₃ | C₄H₉(t) | 9000 |
| FP-63 | 60 | H   | 8  | H   | cyclohexyl | 7000 |
| FP-64 | 80 | H   | 8  | H   | CH₂CH(C₂H₅)C₄H₉(n) | 8000 |
| FP-65 | 90 | H   | 8  | H   | C₁₂H₂₅(n) | 6000 |
| FP-66 | 80 | CH₃ | 8  | CH₃ | C₄H₉(sec) | 18000 |
| FP-67 | 70 | CH₃ | 8  | CH₃ | CH₃ | 22000 |
| FP-68 | 70 | H   | 10 | CH₃ | H | 17000 |
| FP-69 | 90 | H   | 10 | H   | H | 9000 |

$$-(-CH_2-\underset{\underset{CO_2-CH_2-(CF_2)_n-H}{|}}{\overset{\overset{R^1}{|}}{C}})_x-(-CH_2-\underset{\underset{CO_2-R^3}{|}}{\overset{\overset{R^2}{|}}{C}})_{100-x}-$$

|       | x  | R¹  | n  | R² | R³ | Mw |
|-------|----|-----|----|----|-----|-----|
| FP-70 | 95 | H   | 4  | CH₃ | —(CH₂CH₂O)₂—H | 18000 |
| FP-71 | 80 | H   | 4  | H   | —(CH₂CH₂O)₂—CH₃ | 16000 |
| FP-72 | 80 | H   | 4  | H   | —(C₃H₆O)₇—H | 24000 |
| FP-73 | 70 | CH₃ | 4  | H   | —(C₃H₆O)₁₃—H | 18000 |
| FP-74 | 90 | H   | 6  | H   | —(CH₂CH₂O)₂—H | 21000 |
| FP-75 | 90 | H   | 6  | CH₃ | —(CH₂CH₂O)₈—H | 9000 |
| FP-76 | 80 | H   | 6  | H   | —(CH₂CH₂O)₂—C₄H₉(n) | 12000 |
| FP-77 | 80 | H   | 6  | H   | —(C₃H₆O)₇—H | 34000 |
| FP-78 | 75 | F   | 6  | H   | —(C₃H₆O)₁₃—H | 11000 |
| FP-79 | 85 | H   | 6  | CH₃ | —(C₃H₅O)₂₀—H | 18000 |
| FP-80 | 95 | CH₃ | 6  | CH₃ | —CH₂CH₂OH | 27000 |
| FP-81 | 80 | H   | 8  | CH₃ | —(CH₂CH₂O)₈—H | 12000 |
| FP-82 | 95 | H   | 8  | H   | —(CH₂CH₂O)₉—CH₃ | 20000 |
| FP-83 | 90 | H   | 8  | H   | —(C₃H₆O)₇—H | 8000 |
| FP-84 | 95 | H   | 8  | H   | —(C₃H₆O)₂₀—H | 15000 |
| FP-85 | 90 | F   | 8  | H   | —(C₃H₆O)₁₃—H | 12000 |
| FP-86 | 80 | H   | 8  | CH₃ | —(CH₂CH₂O)₂—H | 20000 |
| FP-87 | 95 | CH₃ | 8  | H   | —(CH₂CH₂O)₉—CH₃ | 17000 |
| FP-88 | 90 | CH₃ | 8  | H   | —(C₃H₆O)₇—H | 34000 |
| FP-89 | 80 | H   | 10 | H   | —(CH₂CH₂O)₃—H | 19000 |
| FP-90 | 90 | H   | 10 | H   | —(C₃H₆O)₇—H | 8000 |
| FP-91 | 80 | H   | 12 | H   | —(CH₂CH₂O)₇—CH₃ | 7000 |
| FP-92 | 95 | CH₃ | 12 | H   | —(C₃H₆O)₇—H | 10000 |

$$-(-CH_2-\underset{\underset{CO_2-(CH_2)_p-(CF_2)_q-H}{|}}{\overset{\overset{R^1}{|}}{C}})_x-(-CH_2-\underset{\underset{CO_2-R^3}{|}}{\overset{\overset{R^2}{|}}{C}})_{100-x}-$$

|        | x  | R¹  | p | q  | R²  | R³ | Mw |
|--------|----|-----|---|----|-----|-----|-----|
| FP-93  | 80 | H   | 2 | 4  | H   | C₄H₉(n) | 18000 |
| FP-94  | 90 | H   | 2 | 4  | H   | —(CH₂CH₂O)₉—CH₃ | 16000 |
| FP-95  | 90 | CH₃ | 2 | 4  | F   | C₆H₁₃(n) | 24000 |
| FP-96  | 80 | CH₃ | 1 | 6  | F   | C₄H₉(n) | 18000 |
| FP-97  | 95 | H   | 2 | 6  | H   | —(C₃H₆O)₇—H | 21000 |
| FP-98  | 90 | CH₃ | 3 | 6  | H   | —CH₂CH₂OH | 9000 |
| FP-99  | 75 | H   | 1 | 8  | F   | CH₃ | 12000 |
| FP-100 | 80 | H   | 2 | 8  | H   | CH₂CH(C₂H₅)C₄H₉(n) | 34000 |
| FP-101 | 90 | CH₃ | 2 | 8  | H   | —(C₃H₆O)₇—H | 11000 |
| FP-102 | 80 | H   | 3 | 8  | CH₃ | CH₃ | 18000 |
| FP-103 | 90 | H   | 1 | 10 | F   | C₄H₈(n) | 27000 |
| FP-104 | 95 | H   | 2 | 10 | H   | —(CH₂CH₂O)—CH₃ | 12000 |
| FP-105 | 85 | CH₃ | 2 | 10 | CH₃ | C₄H₉(n) | 20000 |
| FP-106 | 80 | H   | 1 | 12 | H   | C₆H₁₃(n) | 8000 |
| FP-107 | 90 | H   | 1 | 12 | F   | —(CH₃H₅O)₁₃—H | 15000 |
| FP-108 | 60 | CH₃ | 3 | 12 | CH₃ | C₂H₅ | 12000 |
| FP-109 | 60 | H   | 1 | 16 | H   | CH₂CH(C₂H₅)C₄H₉(n) | 20000 |
| FP-110 | 80 | CH₃ | 1 | 16 | H   | —(CH₂CH₂O)₂—C₄H₉(n) | 17000 |
| FP-111 | 90 | H   | 1 | 18 | H   | —CH₂CH₂OH | 34000 |
| FP-112 | 60 | H   | 3 | 18 | CH₃ | CH₃ | 19000 |

$$-(-CH_2-\underset{\underset{\underset{S-(CH_2)_3-(CF_2)_6H}{|}}{\overset{O}{\|}}}{\overset{}{C}}HF)_{80}-(-CH_2-\underset{\underset{\underset{O-(C_3H_6O)_7CH_3}{|}}{\overset{O}{\|}}}{\overset{}{C}}H)_{20}-$$ FP-113, Mw 39,000

$$-(-CH_2-\underset{\underset{\underset{S-(CH_2)_3-(CF_2)_6H}{|}}{\overset{O}{\|}}}{\overset{}{C}}HF)_{90}-(-CH_2-\underset{\underset{\underset{O-(C_3H_6O)_{13}H}{|}}{\overset{O}{\|}}}{\overset{}{C}}H)_{10}-$$ FP-114, Mw 45,000

|  |  |  |
|---|---|---|
| —(CH$_2$—HF)$_{75}$<br>C(=O)—S—(CH$_2$)$_3$—(CF$_2$)$_8$H | —(CH$_2$—CH)$_{25}$<br>C(=O)—O—(C$_2$H$_4$O)$_4$(C$_3$H$_6$O)$_7$H | FP-115<br>Mw 46,000 |
| —(CH$_2$—HF)$_{80}$<br>C(=O)—S—(CH$_2$)$_3$—(CF$_2$)$_8$H | —(CH$_2$—CH)$_{20}$<br>C(=O)—O—(C$_3$H$_6$O)$_7$CH$_3$ | FP-116<br>Mw 28,000 |
| —(CH$_2$—HF)$_{90}$<br>C(=O)—NH—(CH$_2$)$_2$—(CF$_2$)$_4$H | —(CH$_2$—CH)$_{10}$<br>C(=O)—O—(C$_2$H$_4$O)$_4$(C$_3$H$_6$O)$_7$H | FP-117<br>Mw 56,000 |
| —(CH$_2$—C(CH$_3$))$_{85}$<br>C(=O)—NH—(CH$_2$)$_2$—(CF$_2$)$_4$H | —(CH$_2$—CH)$_{15}$<br>C(=O)—O—(C$_2$H$_4$O)$_2$H | FP-118<br>Mw 32,000 |
| —(CH$_2$—CH)$_{70}$<br>C(=O)—NH—(CH$_2$)$_2$—(CF$_2$)$_6$H | —(CH$_2$—CH)$_{30}$<br>C(=O)—O—(C$_2$H$_4$O)$_4$(C$_3$H$_6$O)$_7$H | FP-119<br>Mw 29,000 |
| —(CH$_2$—C(CH$_3$))$_{80}$<br>C(=O)—NH—(CH$_2$)$_2$—(CF$_2$)$_6$H | —(CH$_2$—CH)$_{20}$<br>C(=O)—O—(C$_2$H$_4$O)$_4$CH$_3$ | FP-120<br>Mw 45,000 |
| —(CH$_2$—CH)$_{95}$<br>C(=O)—NH—(CH$_2$)$_2$—(CF$_2$)$_8$H | —(CH$_2$—CH)$_{5}$<br>C(=O)—O—(C$_3$H$_3$O)$_{20}$H | FP-121<br>Mw 30,000 |
| —(CH$_2$—CH)$_{90}$<br>C(=O)—NH—(CH$_2$)$_2$—(CF$_2$)$_8$H | —(CH$_2$—CH)$_{10}$<br>C(=O)—O—(C$_3$H$_3$O)$_{20}$H | FP-122<br>Mw 32,000 |
| —(CH$_2$—C(CH$_3$))$_{75}$<br>C(=O)—NH—(CH$_2$)$_3$—(CF$_2$)$_8$H | —(CH$_2$—CH)$_{25}$<br>C(=O)—O—cyclohexyl | FP-123<br>Mw 48,000 |
| —(CH$_2$—CH)$_{80}$<br>C(=O)—N(CH$_3$)—(CH$_2$)$_3$—(CF$_2$)$_6$H | —(CH$_2$—CH)$_{20}$<br>C(=O)—O—decahydronaphthyl | FP-124<br>Mw 39,000 |
| —(CH$_2$—C(CH$_3$))$_{80}$<br>C(=O)—N(CH$_3$)—(CH$_2$)$_3$—(CF$_2$)$_6$H | —(CH$_2$—CH)$_{20}$<br>C(=O)—NH—cyclopentyl | FP-125<br>Mw 45,000 |
| —(CH$_2$—CH)$_{95}$<br>C(=O)—N(CH$_3$)—(CH$_2$)$_3$—(CF$_2$)$_8$H | —(CH$_2$—CH)$_{5}$<br>C(=O)—NH—tricyclodecyl | FP-126<br>Mw 28,000 |

| Structure | ID |
|---|---|
| $-(CH_2-C(CH_3))_{80}-C(O)-N(CH_3)-(CH_2)_3-(CF_2)_8H$ / $-(CH_2-CH)_{20}-C(O)-N(CH_3)-C_6H_{11}$ | FP-127, Mw 29,000 |
| $-(CH_2-CH)_{80}-C(O)-O-CH_2-(CF_2)_6H$ / $-(CH_2-CH)_{10}-C(O)-O-(C_3H_6O)_7H$ / $-(CH_2-CH)_{10}-C(O)-O-(C_2H_4O)_8H$ | FP-128, Mw 30,000 |
| $-(CH_2-CH)_{90}-C(O)-O-CH_2-(CF_2)_8H$ / $-(CH_2-C(CH_3))_5-C(O)-O-CH_3$ / $-(CH_2-CH)_5-C(O)-O-(C_3H_6O)_7H$ | FP-129, Mw 31,000 |
| $-(CH_2-CH)_{80}-C(O)-O-CH_2-(CF_2)_8H$ / $-(CH_2-C(CH_3))_{10}-C(O)-O-C_4H_9(n)$ / $-(CH_2-CH)_{10}-C(O)-O-(C_3H_6O)_9H$ | FP-130, Mw 40,000 |
| $-(CH_2-CH)_{40}-C(O)-O-CH_2CH_2-(CF_2CF_2)_2F$ / $-(CH_2-CH)_{60}-C(O)-O-(C_2H_4O)_{20}CH_3$ | FP-131, Mw 15,000 |
| $-(CH_2-CH)_{50}-C(O)-O-CH_2CH_2-(CF_2CF_2)_2F$ / $-(CH_2-CH)_{50}-C(O)-O-(C_2H_4O)_7CH_3$ | FP-132, Mw 15,000 |
| $-(CH_2-CH)_{40}-C(O)-O-CH_2CH_2-(CF_2CF_2)_2F$ / $-(CH_2-CH)_{60}-C(O)-O-(C_3H_6O)_{20}CH_3$ | FP-133, Mw 30,000 |
| $-(CH_2-CH)_{40}-C(O)-O-CH_2CH_2-(CF_2CF_2)_2F$ / $-(CH_2-CH)_{60}-C(O)-O-(C_3H_6O)_{20}CH_3$ | FP-134, Mw 50,000 |
| $-(CH_2-CH)_{45}-C(O)-O-CH_2CH_2-(CF_2CF_2)_3F$ / $-(CH_2-CH)_{55}-C(O)-O-(C_2H_4O)_7CH_3$ | FP-135, Mw 15,000 |
| $-(CH_2-CH)_{40}-C(O)-O-CH_2CH_2-(CF_2CF_2)_3F$ / $-(CH_2-CH)_{60}-C(O)-O-(C_3H_6O)_{20}CH_3$ | FP-136, Mw 7,000 |
| $-(CH_2-CH)_{35}-C(O)-O-CH_2CH_2-(CF_2CF_2)_3F$ / $-(CH_2-CH)_{65}-C(O)-O-(C_3H_6O)_{20}CH_3$ | FP-137, Mw 20,000 |
| $-(CH_2-C(CH_3))_{40}-C(O)-O-CH_2CH_2-(CF_2CF_2)_3F$ / $-(CH_2-CH)_{60}-C(O)-O-(C_2H_4O)_{20}CH_3$ | FP-138, Mw 15,000 |
| $-(CH_2-C(CH_3))_{45}-C(O)-O-CH_2CH_2-(CF_2CF_2)_3F$ / $-(CH_2-CH)_{55}-C(O)-O-(C_3H_6O)_{20}CH_3$ | FP-139, Mw 40,000 |

| Structure | | Name |
|---|---|---|
| $-(CH_2-CH)_{40}-COO-CH_2CH_2-(CF_2CF_2)_3F$ | $-(CH_2-CH)_{60}-COO-(C_2H_4O)_4CH_3$ | FP-140<br>Mw 15,000 |
| $-(CH_2-CH)_{40}-COO-CH_2CH_2-(CF_2CF_2)_3F$ | $-(CH_2-CH)_{60}-COO-(C_3H_6O)_7(C_2H_4O)_{10}CH_3$ | FP-141<br>Mw 20,000 |
| $-(CH_2-CH)_{35}-COO-CH_2CH_2-(CF_2CF_2)_3F$ | $-(CH_2-CH)_{65}-COO-(C_3H_6O)_7(C_2H_4O)_{10}CH_3$ | FP-142<br>Mw 25,000 |

The solvent used in coating solutions for forming the functional layer (e.g., antiglare hard coat layer, light-diffusing layer, high refractive index layer, hard coat layer) and the low refractive index layer in the antireflection film of the present invention is described below.

Examples of the coating solvent include, as a solvent having a boiling point of 100° C. or less, hydrocarbons such as hexane (boiling point: 68.7° C., hereinafter "° C." is omitted), heptane (98.4), cyclohexane (80.7) and benzene (80.1), halogenated hydrocarbons such as dichloromethane (39.8), chloroform (61.2), carbon tetrachloride (76.8), 1,2-dichloroethane (83.5) and trichloroethylene (87.2), ethers such as diethyl ether (34.6), diisopropyl ether (68.5), dipropyl ether (90.5) and tetrahydrofuran (66), esters such as ethyl formate (54.2), methyl acetate (57.8), ethyl acetate (77.1) and isopropyl acetate (89), ketones such as acetone (56.1) and 2-butanone (=methyl ethyl ketone, 79.6), alcohols such as methanol (64.5), ethanol (78.3), 2-propanol (82.4) and 1-propanol (97.2), cyano compounds such as acetonitrile (81.6) and propionitrile (97.4), and carbon disulfide (46.2).

Examples of the coating solvent include, as a solvent having a boiling point exceeding 100° C., octane (125.7), toluene (110.6), xylene (138), tetrachloroethylene (121.2), chlorobenzene (131.7), dioxane (101.3), dibutyl ether (142.4), isobutyl acetate (118), cyclohexanone (155.7), 2-methyl-4-pentanone (=MIBK, 115.9), 1-butanol (117.7), N,N-methylformamide (153), N,N-methylacetamide (166) and dimethylsulfoxide (189). Among these, cyclohexanone and 2-methyl-4-pentanone are preferred.

Among these, ketones, aromatic hydrocarbons and esters are preferred, and ketones are more preferred. Among ketones, 2-butanone is preferred.

In the case of using the ketone-base solvent, a sole ketone-base solvent may be used or a mixture of ketone-base solvents may be used. In using a mixture of ketone-base solvents, the ketone-base solvent content is preferably 10 weight % or more, more preferably 30 weight % or more, still more preferably 60 weight % or more, based on all solvents contained in the coating composition.

In the antireflection film of the present invention, the coating solution for the functional layer or low refractive index layer is prepared by diluting the components for the layer with a solvent having the above-described composition. The coating solution is preferably adjusted to an appropriate concentration by taking account of viscosity of the coating solution and specific gravity of the layer material, but the concentration of the coating solution is preferably from 0.1 to 80 weight %, more preferably from 1 to 60 weight %.

The solvents for respective functional layers may have the same composition or may differ in the composition.

Respective functional layer of the present invention are described below.

[Antiglare Hard Coat Layer]

The antiglare hard coat layer of the present invention is described below.

The antiglare hard coat layer is composed of a binder for imparting the hard coat property, a mat particle for imparting the antiglare property, and an inorganic filler for elevating the high refractive index and strength and preventing the crosslinking shrinkage.

The binder is preferably a polymer having a saturated hydrocarbon chain or a polyether chain as the main chain, more preferably a polymer having a saturated hydrocarbon chain as the main chain. Also, the binder polymer preferably has a crosslinked structure.

The binder polymer having a saturated hydrocarbon chain as the main chain is preferably a polymer of an ethylenically unsaturated monomer (binder precursor). The binder polymer having a saturated hydrocarbon chain as the main chain and having a crosslinked structure is preferably a (co)polymer of a monomer having two or more ethylenically unsaturated groups.

In order to give a high refractive index, the monomer preferably contains in the structure thereof an aromatic ring or at least one atom selected from the group consisting of halogen atoms (excluding fluorine), a sulfur atom, a phosphorus atom and a nitrogen atom.

Examples of the monomer having two or more ethylenically unsaturated groups include esters of polyhydric alcohol and (meth)acrylic acid (e.g., ethylene glycol di(meth)acrylate 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate), vinylbenzene and derivatives thereof (e.g., 1,4-vinylbenzene, 4-vinylbenzoic acid-2-acryloylethyl ester, 1,4-divinylcyclohexanone), vinylsulfones (e.g., divinylsulfone), acrylamides (e.g., methylenebisacrylamide) and methacrylamides. These monomers may be used in combination of two or more thereof.

Specific examples of the high refractive index monomer include bis(4-methacryloylthiophenyl)sulfide, vinylnaphthalene, vinylphenylsulfide and 4-methacryloxy-phenyl-4'-methoxyphenylthioether. These monomers may also be used in combination of two or more thereof.

The polymerization of such a monomer having ethylenically unsaturated groups may be performed under irradiation of ionizing radiation or under heating in the presence of a photo-radical initiator or a heat-radical initiator.

Accordingly, the antireflection film can be formed by preparing a coating solution containing a monomer having ethylenically unsaturated groups, a photo- or heat-radical initiator, a mat particle and an inorganic filler, applying the coating solution to a transparent support, and curing the coating solution through a polymerization reaction due to ionizing radiation or heat.

Examples of the photo-radical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums. Examples of the acetophenones include 2,2-ethoxy-acetophenone, p-methylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)-butanone. Examples of the benzoins include benzoin benzenesulfonic acid ester, benzoin toluenesulfonic acid ester, benzoin methyl ether, benzoin ethyl ether and benzoin isopropyl ether. Examples of the benzophenones include benzophenone, 2,4-chlorobenzophenone, 4,4-dichlorobenzophenone and p-chlorobenzophenone. Examples of the phosphine oxides include 2,4,6-trimethylbenzoyldiphenylphosphine oxide Also, various examples are described in Saishin UV Koka Gijutsu (Newest UV Curing Technology), page 159, Kazuhiro Takausu (publisher), Gijutsu Joho Kyokai (publishing company) (1991) and these are useful in the present invention.

Preferred examples of the commercially available photocleavable photo-radical polymerization initiator include Irgacure (651, 184 and 907) produced by Nippon Ciba Geigy.

The photopolymerization initiator is preferably used in an amount of 0.1 to 15 parts by weight, more preferably from 1 to 10 parts by weight, per 100 parts by weight of the polyfunctional monomer.

In addition to the photopolymerization initiator, a photosensitizer may be used. Specific examples of the photosensitizer include n-butylamine, triethylamine, tri-n-butylphosphine, Michler's ketone and thioxanthone.

Examples of the heat-radical initiator which can be used include organic or inorganic peroxides and organic azo and diazo compounds.

Specific examples of the organic peroxide include benzoyl peroxide, halogen benzoyl peroxide, lauroyl peroxide, acetyl peroxide, dibutyl peroxide, cumene hydroperoxide and butyl hydroperoxide. Specific examples of the inorganic peroxide include hydrogen peroxide, ammonium persulfate and potassium persulfate. Specific examples of the azo compound include 2-azo-bis-isobutyronitrile, 2-azo-bis-propionitrile and 2-azo-bis-cyclohexanedinitrile. Specific examples of the diazo compound include diazoaminobenzene and p-nitrobenzene-diazonium.

The polymer having a polyether as the main chain is preferably a ring-opening polymer of a polyfunctional epoxy compound. The ring-opening polymerization of a polyfunctional epoxy compound can be performed under irradiation of ionizing radiation or under heating in the presence of a photoacid generator or a heat-acid generator.

Accordingly, the antireflection film can be formed by preparing a coating solution containing a polyfunctional epoxy compound, a photoacid or heat-acid generator, a mat particle and an inorganic filler, applying the coating solution to a transparent support and curing the coating solution through a polymerization reaction due to ionizing radiation or heat.

In place of or in addition to the monomer having two or more ethylenically unsaturated groups, a monomer having a crosslinkable functional group may be used to introduce a crosslinkable functional group into the polymer, so that by the reaction of this crosslinkable functional group, a crosslinked structure can be introduced into the binder polymer.

Examples of the crosslinkable functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester, a urethane or a metal alkoxide such as tetramethoxysilane can be used as a monomer for introducing a crosslinked structure. A functional group which exhibits crosslinking property as a result of the decomposition reaction, such as block isocyanate group, may also be used. In other words, the crosslinkable functional group for use in the present invention may be a group which does not directly cause a reaction but exhibits reactivity as a result of decomposition.

The binder polymer having this crosslinkable functional group is coated and then heated, whereby a crosslinked structure can be formed.

The binder of the antiglare hard coat layer is added in an amount of 20 to 95 weight % based on the solid content of the coating composition for the antiglare hard coat layer.

For the purpose of imparting the antiglare property, the antiglare hard coat layer contains a mat particle larger than the filler particle and having an average particle size of 1 to 10 μm, preferably from 1.5 to 7.0 μm, such as inorganic compound particle or resin particle.

Specific preferred examples of the mat particle include an inorganic compound particle such as silica particle and $TiO_2$ particle; and a resin particle such as acryl particle, crosslinked acryl particle, polystyrene particle, crosslinked styrene particle, melamine resin particle and benzoguanamine resin particle. Among these, crosslinked styrene particle, crosslinked acryl particle and silica particle are more preferred.

The shape of the mat particle may be either true spherical or amorphous.

Also, two or more kinds of mat particles differing in the particle size may be used in combination. The mat particle having a larger particle size can impart the antiglare property and the mat particle having a smaller particle size can impart a different optical property. For example, when an antireflection film is attached to a high-definition display of 133 ppi or more, this is required to cause no trouble called glare in the optical performance. The glare is attributable to a phenomenon that the picture element is enlarged or reduced due to asperities (contributing to the antiglare property) present on the film surface and the uniformity of brightness is lost. This glare can be greatly improved by using in combination a mat particle having a particle size smaller than that of the mat particle for imparting the antiglare property and having a refractive index different from that of the binder.

The particle size distribution of this mat particle is most preferably monodisperse. Individual particles preferably have the same particle size as much as possible. For example, when a particle having a particle size 20% or more larger than the average particle size is defined as a coarse particle, the percentage of the coarse particle occupying in the total number of particles is preferably 1% or less, more preferably 0.1% or less, still more preferably 0.01% or less. The mat particle having such a particle size distribution is obtained by performing the classification after the normal synthesis reaction. By increasing the number of classification operations or intensifying the classification degree, a matting agent having a more preferred distribution can be obtained.

This mat particle is preferably contained in the antiglare hard coat layer such that the amount of the mat particle in the formed antiglare hard coat layer is from 10 to 2,000 mg/m$^2$, more preferably from 100 to 1,400 mg/m$^2$.

The particle size distribution of the mat particle is measured by a Coulter counter method and the measured distribution is converted into the particle number distribution.

In addition to the above-described mat particle, the antiglare hard coat layer preferably contains an inorganic filler comprising an oxide of at least one metal selected from the group consisting of titanium, zirconium, aluminum, indium, zinc, tin and antimony and having an average particle size of 0.2 μm or less, preferably 0.1 μm or less, more preferably 0.06 μm or less, so as to increase the refractive index of the antiglare hard coat layer.

Conversely, for increasing the difference in the refractive index from the mat particle, it is also preferred to use an oxide of silicon in the antiglare hard coat layer using a high refractive index mat particle and thereby keep lower the refractive index of the layer. The preferred particle size is same as that of the inorganic filler.

Specific examples of the inorganic filler for use in the antiglare hard coat layer include $TiO_2$, $ZrO_2$, $Al_2O_3$, $In_2O_3$, ZnO, $SnO_2$, $Sb_2O_3$, ITO and $SiO_2$. Among these inorganic fillers, $TiO_2$ and $ZrO_2$ are preferred from the standpoint of attaining a high refractive index. The surface of the inorganic filler is preferably subjected to a silane coupling treatment or a titanium coupling treatment. A surface treating agent having a functional group capable of reacting with the binder species on the filler surface is preferably used.

The amount of the inorganic filler added is preferably from 10 to 90%, more preferably from 20 to 80%, still more preferably from 30 to 75%, based on the entire weight of the antiglare hard coat layer.

This filler has a particle size sufficiently smaller than the wavelength of light and therefore, causes no scattering and the dispersion obtained by dispersing the filler in the binder polymer behaves as an optically uniform substance.

The bulk refractive index of the binder and inorganic filler mixture in the antiglare hard coat layer of the present invention is preferably 1.48 to 2.00, more preferably from 1.50 to 1.80. The refractive index in this range can be attained by appropriately selecting the kind and amount ratio of binder and inorganic filler. The kind and amount ratio to be selected can be easily known by previously performing an experiment.

The film thickness of the antiglare hard coat layer is preferably from 1 to 10 μm, more preferably from 1.2 to 8 μm.

[Light-Diffusing Layer]

In the optical functional film of the present invention, the light-diffusing layer has a purpose of enlarging the view angle (particularly, view angle in the lower direction) of a liquid crystal display device and preventing contrast reduction, gradation or black-and-white reversal or color hue change even when the angle of the observation direction is changed.

The present inventors have confirmed that the scattered light intensity distribution measured by a goniophotometer is correlated with the effect of improving the view angle. That is, as the light emitted from the backlight is more diffused due to the internal scattering effect of light-transmitting fine particles contained in the light-diffusing film provided on the polarizing plate surface in the viewing side, the view angle properties are more improved. However, if the light is excessively diffused, the back scattering increases and the front brightness decreases or too large scattering is generated to cause problems such as deterioration of image clearness.

Therefore, the scattered light intensity distribution must be controlled to a certain range. As a result of intensive investigations, it has been found that for achieving the desired visibility properties, the scattered light intensity at 30° particularly correlated with the view angle-improving effect is preferably from 0.01 to 0.2%, more preferably from 0.02 to 0.15%, still more preferably from 0.03 to 0.1%, based on the light intensity at an exit angle of 0° in the scattered light profile.

The scattered light profile of the produced light-scattering film can be measured by using an autogoniophotometer, Model GP-5, manufactured by Murakami Color Research Laboratory.

The light-diffusing layer of the present invention is formed from a binder, an inorganic filler and a light-transmitting fine particle. The binder and inorganic filler may be the same as those described above for the antiglare hard coat layer. The light-transmitting fine particle may be the same as that described above for the mat particle.

The binder of the light-diffusing layer is added in an amount of 5 to 80 weight % based on the solid content of the coating composition for the light-diffusing layer.

[High Refractive Index Layer]

In the antireflection film of the present invention, in order to impart higher antireflection performance, a high refractive index layer can be preferably used.

<Inorganic Fine Particle Mainly Comprising Titanium Dioxide>

The high refractive index layer for use in the present invention contains an inorganic fine particle mainly comprising (comprising as the main component) a titanium dioxide containing at least one element selected from cobalt, aluminum and zirconium. The main component means a component of which content (weight %) is highest among the components constituting the particle.

The refractive index of the high refractive index layer for use in the present invention is from 1.55 to 2.40 and this is a layer called a high refractive index layer or a medium refractive index layer, but in the present invention, these layers are sometimes collectively called a high refractive index layer.

The inorganic fine particle mainly comprising titanium dioxide for use in the present invention preferably has a refractive index of 1.90 to 2.80, more preferably from 2.10 to 2.80, and most preferably from 2.20 to 2.80.

The weight average primary particle size of the inorganic fine particle mainly comprising titanium dioxide is preferably from 1 to 200 nm, more preferably from 1 to 150 nm, still more preferably from 1 to 100 nm, particularly preferably from 1 to 80 nm.

The particle size of the inorganic fine particle can be measured by a light scattering method or an electron microphotograph. The specific surface area of the inorganic fine particle is preferably from 10 to 400 m$^2$/g, more preferably from 20 to 200 m$^2$/g, and most preferably from 30 to 150 m$^2$/g.

As for the crystal structure of the inorganic fine particle mainly comprising titanium dioxide, the main component is preferably a rutile structure, a rutile/anatase mixed crystal, an anatase structure or an amorphous structure, more preferably a rutile structure. The main component means a component of which content (weight %) is highest among the components constituting the particle.

By incorporating at least one element selected from Co, Al and Zr into the inorganic fine particle mainly comprising titanium dioxide, the photocatalytic activity of the titanium dioxide can be suppressed and the weather resistance of the high refractive index layer for use in the present invention can be improved.

The element is preferably Co. A combination use of two or more elements is also preferred.

The content of Co, Al or Zr is preferably from 0.05 to 30 weight %, more preferably from 0.1 to 10 weight %, still more preferably from 0.2 to 7 weight %, particularly preferably from 0.3 to 5 weight %, and most preferably from 0.5 to 3 weight %, based on Ti.

Co, Al or Zr can be present at least in either the inside or the surface of the inorganic fine particle mainly comprising titanium dioxide, but the element is preferably present in the inside of the inorganic fine particle mainly comprising titanium dioxide, most preferably in both the inside and the surface.

Co, Al or Zr can be made to exist (for example, doped) in the inside of the inorganic fine particle mainly comprising titanium dioxide by various methods. Examples of the method include an ion injection method (see, Yasushi Aoki, Vol. 18, No. 5, pp. 262-268 (1998)) and methods described in JP-A-11-263620, JP-T-11-512336, EP-A-0335773 and JP-A-5-330825.

A method of introducing Co, Al or Zr in the process of forming the inorganic fine particle mainly comprising titanium dioxide (see, for example, JP-T-11-512336, EP-A-033577 and JP-A-5-330825) is particularly preferred.

Co, Al or Zr is also preferably present in the form of an oxide.

The inorganic fine particle mainly comprising titanium dioxide may further contain other elements according to the purpose. Other elements may be contained as impurities. Examples of other elements include Sn, Sb, Cu, Fe, Mn, Pb, Cd, As, Cr, Hg, Zn, Mg, Si, P and S.

The inorganic fine particle mainly comprising titanium dioxide for use in the present invention may be surface-treated. The surface treatment is performed by using an inorganic compound or an organic compound. Examples of the inorganic compound for use in the surface treatment include cobalt-containing inorganic compounds (e.g., $CoO_2$, $Co_2O_3$, $Co_3O_4$), aluminum-containing inorganic compounds (e.g., $Al_2O_3$, $Al(OH)_4$), zirconium-containing inorganic compounds (e.g., $ZrO_2$, $Zr(OH)_4$), silicon-containing inorganic compounds (e.g., $SiO_2$) and iron-containing inorganic compounds (e.g., $Fe_2O_3$).

Among these, cobalt-containing inorganic compounds, aluminum-containing inorganic compounds and zirconium-containing inorganic compounds are preferred, and cobalt-containing inorganic compounds, $Al(OH)_3$ and $Zr(OH)_4$ are most preferred.

Examples of the organic compound for use in the surface treatment include a polyol, an alkanolamine, a stearic acid, a silane coupling agent and a titanate coupling agent. Among these, a silane coupling agent is most preferred. In particular, the surface treatment is preferably performed with at least one member selected from a silane coupling agent represented by formula 5 which is shown later (organosilane compound), and a partially hydrolyzed product and a condensate thereof. The silane coupling agent represented by formula 5 is described in detail later.

Examples of the titanate coupling agent include metal alkoxides such as tetramethoxy titanium, tetraethoxy titanium and tetraisorpopoxy titanium, and Preneact (e.g., KR-TTS, KR-46B, KR-55 and KR-41B, produced by Ajinomoto Co., Inc.).

Preferred examples of the organic compound for use in the present invention include a polyol, an alkanolamine and other organic compounds having an anionic group. Among these, more preferred are organic compounds having a carboxyl group, a sulfonic acid group or a phosphoric acid group.

A stearic acid, a lauric acid, an oleic acid, a linoleic acid and a linolenic acid are preferably used.

The organic compound for use in the surface treatment preferably further has a crosslinkable or polymerizable functional group. Examples of the crosslinkable or polymerizable functional group include ethylenically unsaturated groups (e.g., (meth)acryl, allyl, styryl, vinyloxy) capable of an addition reaction/polymerization reaction under the action of a radical species, cationic polymerizable groups (e.g., epoxy, oxatanyl, vinyloxy), and polycondensation reactive groups (e.g., hydrolyzable silyl group, N-methylol). Among these, preferred are functional groups having an ethylenically unsaturated group.

These surface treatments may also be used in combination of two or more thereof. A combination use of an aluminum-containing organic compound and a zirconium-containing inorganic compound is particularly preferred.

The inorganic fine particle mainly comprising titanium dioxide for use in the present invention may be rendered to have a core/shell structure by the surface treatment as described in JP-A-2001-166104. The shape of the inorganic fine particle mainly comprising titanium dioxide, which is contained in the high refractive index layer, is preferably a pebble form, a spherical form, a cubic form, a spindle form or an amorphous form, more preferably an amorphous form or a spindle form.

<Dispersant>

For dispersing the inorganic fine particle mainly comprising titanium dioxide, which is used in the high refractive index layer of the present invention, a dispersant can be used.

For the dispersion of the inorganic fine particle mainly comprising titanium dioxide used in the present invention, a dispersant having an anionic group is preferably used.

As the anionic group, a group having an acidic proton, such as carboxyl group, sulfonic acid group (and sulfo group), phosphoric acid group (and phosphono group) and sulfonamide group, and a salt thereof are effective. Among these, preferred are a carboxyl group, a sulfonic acid group, a phosphonic acid group, and a salt thereof, more preferred are a carboxyl group and a phosphoric acid group. The number of anionic groups contained per one molecule of the dispersant is 1 or more.

For the purpose of more improving the dispersibility of the inorganic fine particle, a plural number of anionic groups may be contained. The average number of anionic groups is preferably 2 or more, more preferably 5 or more, still more preferably 10 or more. Also, a plural kind of anionic groups may be contained in one molecule of the dispersant.

The dispersant preferably further contains a crosslinkable or polymerizable functional group. Examples of the crosslinkable or polymerizable functional group include ethylenically unsaturated groups (e.g., (meth)acryloyl, allyl, styryl, vinyloxy) capable of an addition reaction/polymerization reaction under the action of a radical species, cationic polymerizable groups (e.g., epoxy, oxatanyl, vinyloxy), and polycondensation reactive groups (e.g., hydrolyzable silyl, N-methylol). Among these, functional groups having an ethylenically unsaturated group are preferred.

The dispersant used for dispersing the inorganic fine particle mainly comprising titanium dioxide, which is used in the high refractive index layer of the present invention, is preferably a dispersant having an anionic group and a crosslinkable or polymerizable functional group and at the same time, having the crosslinkable or polymerizable functional group on the side chain.

The weight average molecular weight (Mw) of the dispersant having an anionic group and a crosslinkable or polymerizable functional group and at the same time, having the crosslinkable or polymerizable functional group on the side chain is not particularly limited but this is preferably 1,000 or more, more preferably from 2,000 to 1,000,000, still more preferably from 5,000 to 200,000, particularly preferably from 10,000 to 100,000.

As the anionic group, a group having an acidic proton, such as carboxyl group, sulfonic acid group (and sulfo group), phosphoric acid group (and phosphono group) and sulfonamide group, and a salt thereof are effective. Among these, preferred are a carboxyl group, a sulfonic acid group, a phosphonic acid group, and a salt thereof, more preferred are a carboxyl group and a phosphoric acid group. The number of anionic groups contained per one molecule of the dispersant is, on an average, preferably 2 or more, more preferably 5 or more, still more preferably 10 or more. Also, a plural kind of anionic groups may be contained in one molecule of the dispersant.

The dispersant having an anionic group and a crosslinkable or polymerizable functional group and at the same time, having the crosslinkable or polymerizable functional group on the side chain has the anionic group on the side chain or at the terminal.

A dispersant having the anionic group on the side chain is particularly preferred. In the dispersant having an anionic group on the side chain, the proportion of the anionic group-containing repeating unit is from $10^{-4}$ to 100 mol %, preferably from 1 to 50 mol %, still more preferably from 5 to 20 mol %, based on all repeating units.

Examples of the crosslinkable or polymerizable functional group include ethylenically unsaturated groups (e.g., (meth) acryl, allyl, styryl, vinyloxy) capable of an addition reaction/polymerization reaction under the action of a radical species, cationic polymerizable groups (e.g., epoxy, oxatanyl, vinyloxy), and polycondensation reactive groups (e.g., hydrolyzable silyl, N-methylol). Among these, functional groups having an ethylenically unsaturated group are preferred.

The number of crosslinkable or polymerizable functional groups contained per one molecule of the dispersant is, on an average, preferably 2 or more, more preferably 5 or more, still more preferably 10 or more. Also, a plural kind of crosslinkable or polymerizable functional groups may be contained in one molecule of the dispersant.

Examples of the repeating unit having an ethylenically unsaturated group on the side chain, which can be used in the preferred dispersant for use in the present invention, include a poly-1,2-butadiene structure, a poly-1,2-isoprene structure, and a (meth)acrylic acid ester or amide repeating unit which is bonded with a specific residue (the R group of —COOR or —CONHR). Examples of the specific residue (R group) include —$(CH_2)_n$—$CR^{21}$=$CR^{22}R^{23}$, —$(CH_2O)_n$—$CH_2CR^{21}$=$CR^{22}R^{23}$, —$(CH_2CH_2O)_n$—$OCH_2CR^{21}$=$CR^{22}R^{23}$, —$(CH_2)_n$—NH—CO—O—$CH_2CR^{21}$=$CR^{22}R^{23}$, —$(CH_2)_n$—O—CO—$CR^{21}$=$CR^{22}R^{23}$ and —$(CH_2CH_2O)_2$—X (wherein $R^{21}$ to $R^{23}$ each is a hydrogen atom, a halogen atom, an alkyl group having from 1 to 20 carbon atoms, an aryl group, an alkoxy group or an aryloxy group, $R^{21}$ may combine with $R^{22}$ or $R^{23}$ to form a ring, n is an integer of 1 to 10, and X is a dicyclopentadienyl residue). Specific examples of the ester residue R include —$CH_2CH$=$CH_2$ (corresponding to a polymer of allyl (meth)acrylate described in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NHCOO—$CH_2CH$=$CH_2$ and —$CH_2CH_2O$—X (wherein X is a dicyclopentadienyl residue). Specific examples of the amide residue R include —$CH_2CH$=$CH_2$, —$CH_2CH_2$—Y (wherein Y is a 1-cyclohexenyl residue), —$CH_2CH_2$—OCO—CH=$CH_2$ and —$CH_2CH_2$—OCO—$C(CH_3)$=$CH_2$.

In the dispersant having an ethylenically unsaturated group, a free radical (a polymerization initiation radical or a radical grown in the polymerization process of a polymerizable compound) is added to the unsaturated bond group to cause an addition polymerization between molecules directly or through polymerization chain of a polymerizable compound, as a result, a crosslink is formed between molecules, thereby completing the curing. Alternatively, an atom in the molecule (for example, a hydrogen atom on a carbon atom adjacent to the unsaturated bond group) is withdrawn by a free radical to produce a polymer radical and the polymer radicals are bonded with each other to form a crosslink between molecules, thereby completing the curing.

The crosslinkable or polymerizable functional group-containing unit may constitute all repeating units except for the anionic group-containing repeating unit, but preferably occupies from 5 to 50 mol %, more preferably from 5 to 30 mol %, in all crosslinking or repeating units.

The preferred dispersant of the present invention may be a copolymer with an appropriate monomer other than the monomer having a crosslinkable or polymerizable functional group and an anionic group. The copolymerization component is not particularly limited but is selected by taking account of various points such as dispersion stability, compatibility with other monomer component, and strength of film formed. Preferred examples thereof include methyl (meth)acrylate, n-butyl (meth)acrylate, tert-butyl (meth) acrylate, cyclohexyl (meth)acrylate and styrene.

The preferred dispersant of the present invention is not particularly limited in the form but is preferably a block copolymer or a random copolymer and in view of cost and easy synthesis, more preferably a random copolymer.

Specific examples of the dispersant preferably used in the present invention are set forth below, but the dispersant for use in the present invention is not limited thereto. Unless otherwise indicated, these are a random copolymer.

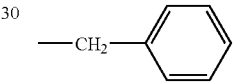

| | A | Mw |
|---|---|---|
| | ![structure with -(CH2-C(CH3)(CO2CH2CH=CH2))80- and -(A)20-] | |
| P-(11) | -CH2-CH(COOH)- | 20,000 |
| P-(12) | -CH2-CH(CO2CH2CH2COOH)- | 30,000 |
| P-(13) | -CH2-CH(C6H4-SO3Na)- | 100,000 |
| P-(14) | -CH2-C(CH3)(CO2CH2CH2SO3H)- | 20,000 |
| P-(15) | -CH2-C(CH3)(CO2CH2CH2OP(OH)2=O)- | 50,000 |
| P-(16) | -CH2-CH(CO2CH2CH2O-(CH2)5-OP(OH)2=O)- | 15,000 |

| | A | Mw |
|---|---|---|
| | ![structure with -(A)80- and -(CH2-C(CH3)(COOH))20-] | |
| P-(17) | -CH2-C(CH3)(COOCH2CH2OCH=CH-C6H5)- | 20,000 |
| P-(18) | -CH2-CH(COOCH2CH2OCH2CH=CH2,C=O)- | 25,000 |
| P-(19) | -CH2-C(CH3)(COO-CH2-C6H4-CH=CH2)- | 18,000 |
| P-(20) | -CH2-CH(C6H4-OCH2CH=CH2, with C=O)- | 20,000 |
| P-(21) | -CH2-CH(CONHCH2CH2OC(=O)CH=CH2)- | 35,000 |

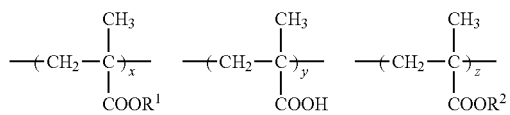

| | R¹ | R² | x | y | z | Mw |
|---|---|---|---|---|---|---|
| P-(22) | -CH2CH2OC(=O)CH=CH2 | $C_4H_9(n)$ | 10 | 10 | 80 | 25,000 |
| P-(23) | -CH2CH2OC(=O)CH=CH2 | $C_4H_9(t)$ | 10 | 10 | 80 | 25,000 |
| P-(24) | -CH2CH2OC(=O)C(CH3)=CH2 | $C_4H_9(n)$ | 10 | 10 | 80 | 500,000 |

-continued $$-(CH_2-\underset{\underset{COOR^1}{|}}{\overset{\overset{CH_3}{|}}{C}})_x- \quad -(CH_2-\underset{\underset{COOH}{|}}{\overset{\overset{CH_3}{|}}{C}})_y- \quad -(CH_2-\underset{\underset{COOR^2}{|}}{\overset{\overset{CH_3}{|}}{C}})_z-$$

| | $R^1$ | $R^2$ | x | y | z | Mw |
|---|---|---|---|---|---|---|
| P-(25) | HO—[cyclohexyl(H)]—CH$_2$OC(O)CH=CH$_2$ | C$_4$H$_9$(n) | 10 | 10 | 80 | 23,000 |
| P-(26) | HO—[cyclohexyl(H)]—CH$_2$OC(O)CH=CH$_2$ | C$_4$H$_9$(n) | 80 | 10 | 10 | 30,000 |
| P-(27) | HO—[cyclohexyl(H)]—CH$_2$OC(O)CH=CH$_2$ | C$_4$H$_9$(n) | 50 | 20 | 30 | 30,000 |
| P-(28) | HO—[cyclohexyl(H)]—CH$_2$OC(O)CH=CH$_2$ | C$_4$H$_9$(t) | 10 | 10 | 80 | 20,000 |
| P-(29) | HO—[cyclohexyl(H)]—CH$_2$OC(O)CH=CH$_2$ | CH$_2$CH$_2$OH | 50 | 10 | 40 | 20,000 |
| P-(30) | HO—[cyclohexyl(H)]—CH$_2$OC(O)C(CH$_3$)=CH$_2$ | C$_4$H$_9$(n) | 10 | 10 | 80 | 25,000 |

P-(31) $-(CH_2-CH)-$ with pendant phenyl–OCH$_2$CH(OOC-phenyl-COOH)OC(O)CH=CH$_2$  Mw = 60,000

P-(32) $-(CH_2-\underset{\underset{CO_2CH_2CH=CH_2}{|}}{\overset{\overset{CH_3}{|}}{C}})-S-COOH$  Mw = 10,000

P-(33) $-(CH_2-\underset{\underset{CO_2CH_2CH=CH_2}{|}}{\overset{\overset{CH_3}{|}}{C}})-S-\underset{\underset{}{}}{\overset{\overset{COOH}{|}}{C}}HCH_2COOH$  Mw = 20,000

P-(34) $-(CH_2-\underset{\underset{CO_2CH_2CH=CH_2}{|}}{CH})_{80}-(CH_2-\underset{\underset{CO_2CH_2CH_2COOH}{|}}{CH})_{20}-$  Mw = 30,000

(block copolymer)

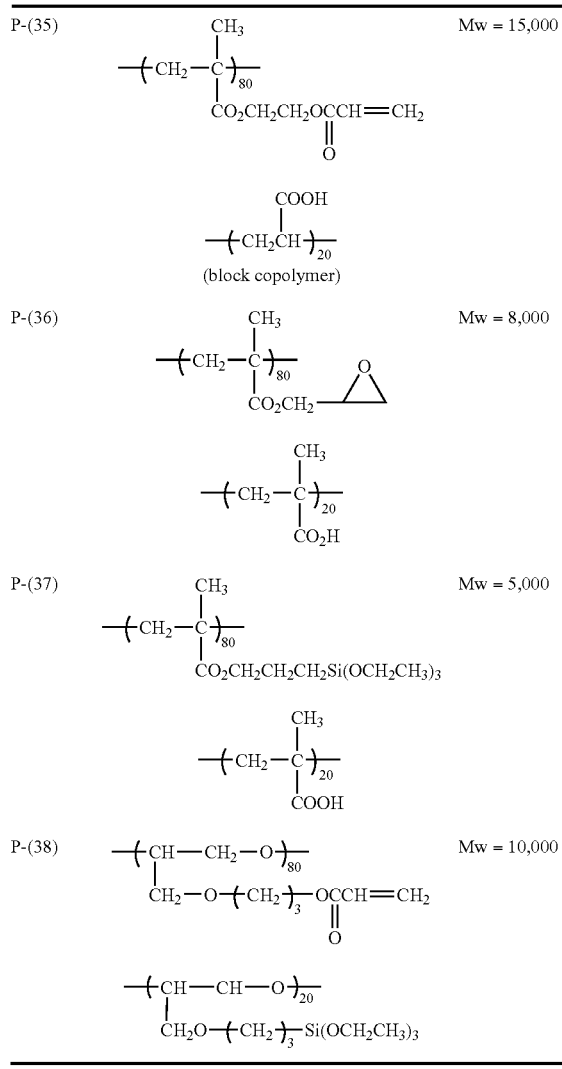

The amount of the dispersant used is preferably from 1 to 50 weight %, more preferably from 5 to 0.30 weight %, and most preferably from 5 to 20 weight %, based on the inorganic fine particle. Also, two or more dispersants may be used in combination.

<Formation Method of High Refractive Index Layer>

The inorganic fine particle mainly comprising titanium dioxide, for use in the high refractive index layer, is used in the dispersion state for the formation of high refractive index layer.

The inorganic fine particle is dispersed in a dispersion medium in the presence of a dispersant described above.

The dispersion medium is preferably a liquid having a boiling point of 60 to 170° C. Examples of the dispersion medium include water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran) and ether alcohols (e.g., 1-methoxy-2-propanol). Among these, preferred are toluene, xylene, methyl ethyl ketone, methyl isobutyl ketone, cyclohexanone and butanol, more preferred are methyl ethyl ketone, methyl isobutyl ketone, cyclohexanone and toluene.

The inorganic fine particle is dispersed by using a disperser. Examples of the disperser include a sand grinder mill (e.g., bead mill with pin), a high-speed impeller, a pebble mill, a roller mill, an attritor and a colloid mill. Among these, a sand grinder mill and a high-speed impeller are preferred. Also, a preliminary dispersion treatment may be performed. Examples of the disperser for use in the preliminary dispersion treatment include a ball mill, a three-roll mill, a kneader and an extruder.

The inorganic fine particle is preferably dispersed in the dispersion medium to have a particle size as small as possible. The weight average particle size is from 1 to 200 nm, preferably from 5 to 150 nm, more preferably from 10 to 100 nm, still more preferably from 10 to 80 nm.

By dispersing the inorganic fine particle to a small particle size of 200 nm or less, a high refractive index layer can be formed without impairing the transparency.

The high refractive index layer for use in the present invention is preferably formed as follows. A binder precursor (the same as the binder precursor for the antiglare hard coat layer) necessary for the matrix formation, a photopolymerization initiator and the like are preferably further added to the dispersion obtained as above by dispersing the inorganic fine particle in a dispersion medium, to prepare a coating composition for the formation of high refractive index layer and the obtained coating composition for the formation of high refractive index layer is coated on a transparent support and cured through a crosslinking reaction or polymerization reaction of an ionizing radiation-curable compound (for example, a polyfunctional monomer or a polyfunctional oligomer).

Simultaneously with or after the coating of the high refractive index layer, the binder of the layer is preferably crosslinked or polymerized with the dispersant.

The binder of the thus-produced high refractive index layer takes a form such that the anionic group of the dispersant is taken into the binder as a result of crosslinking or polymerization reaction between the above-described preferred dispersant and the ionizing radiation-curable polyfunctional monomer or oligomer. The anionic group taken into the binder of the high refractive index layer has a function of maintaining the dispersed state of inorganic fine particles and the crosslinked or polymerized structure imparts a film-forming ability to the binder, whereby the high refractive index layer containing inorganic fine particles is improved in the physical strength and the resistance against chemicals and weather.

For the polymerization reaction of the photo-polymerizable polyfunctional monomer, a photopolymerization is preferably used. The photopolymerization initiator is preferably a photo-radical polymerization initiator or a photo-cationic polymerization initiator, more preferably a photo-radical polymerization initiator.

Examples of the photo-radical polymerization initiator which can be used include those described above for the antiglare hard coat layer.

In the high refractive index layer, the binder preferably further has a silanol group. By further having a silanol group in the binder, the high refractive index layer is more improved in the physical strength and the resistance against chemicals and weather.

The silanol group can be introduced into the binder, for example, by adding a silane coupling agent having a crosslinkable or polymerizable functional group, represented by formula A, or its partially hydrolyzed product or condensate to the coating composition for the formation of high refractive index layer, applying the coating composition to a transparent support, and crosslinking or polymerizing the above-described dispersant, the polyfunctional monomer or oligomer and the silane coupling agent represented by formula A or its partially hydrolyzed product or condensate.

In the high refractive index layer, the binder also preferably has an amino group or a quaternary ammonium group.

The binder having an amino group or a quaternary ammonium group of the high refractive index layer can be formed, for example, by adding a monomer having a crosslinkable or polymerizable functional group and an amino group or a quaternary ammonium group to the coating composition for the formation of high refractive index layer, applying the coating composition to a transparent support, and crosslinking or polymerizing it with the above-described dispersant and polyfunctional monomer or oligomer.

The monomer having an amino group or a quaternary ammonium group functions as a dispersion aid for the inorganic fine particle in the coating composition. Furthermore, after the coating, this monomer is cross linked or polymerized with the dispersant and polyfunctional monomer or oligomer to form a binder, whereby good dispersibility of inorganic fine particles in the high refractive index layer can be maintained and a high refractive index layer excellent in the physical strength and the resistance against chemicals and weather can be produced.

Preferred examples of the monomer having an amino group or a quaternary ammonium group include N,N-dimethylaminoethyl (meth)acrylate, N,N-dimethylaminopropyl (meth)acrylate, hydroxypropyltrimethylammonium chloride (meth)acrylate and dimethylallylammonium chloride.

The amount used of the monomer having an amino group or a quaternary ammonium group is preferably from 1 to 40 weight %, more preferably from 3 to 30 weight %, still more preferably from 3 to 20 weight %, based on the dispersant. When the binder is formed by the crosslinking or polymerization reaction simultaneously with or after the coating of high refractive index layer, this monomer can effectively function before the coating of high refractive index layer.

The crosslinked or polymerized binder has a structure that the polymer main chain is crosslinked or polymerized. Examples of the polymer main chain include a polyolefin (saturated hydrocarbon), a polyether, a polyurea, a polyurethane, a polyester, a polyamine, a polyamide and a melamine resin. Among these, preferred are a polyolefin main chain, a polyether main chain and a polyurea main chain, more preferred are a polyolefin main chain and a polyether main chain, and most preferred is a polyolefin main chain.

The polyolefin main chain comprises a saturated hydrocarbon. The polyolefin main chain is obtained, for example, by the addition polymerization of an unsaturated polymerizable group. In the polyether main chain, repeating units are connected through an ether bond (—O—). The polyether main chain is obtained, for example, by the ring-opening polymerization reaction of an epoxy group. In the polyurea main chain, repeating units are connected through a urea bond (—NH—CO—NH—). The polyurea main chain is obtained, for example, by the condensation polymerization reaction of an isocyanate group and an amino group. In the polyurethane main chain, repeating units are connected through a urethane bond (—NH—CO—O—). The polyurethane main chain is obtained, for example, by the condensation polymerization reaction of an isocyanate group and a, hydroxyl group (including an N-methylol group). In the polyester main chain, repeating units are connected through an ester bond (—CO—O—). The polyester main chain is obtained, for example, by the condensation polymerization reaction of a carboxyl group (including an acid halide group) and a hydroxyl group (including an N-methylol group). In the polyamine main chain, repeating units are connected through an imino group (—NH—). The polyamine main chain is obtained, for example, by the ring-opening polymerization reaction of an ethyleneimine group. In the polyamide main chain, repeating units are connected through an amido bond (—NH—CO—). The polyamide main chain is obtained, for example, by the reaction of an isocyanate group and a carboxyl group (including an acid halide group). The melamine resin main chain is obtained, for example, by the condensation polymerization reaction of a triazine group (e.g., melamine) and an aldehyde (e.g., formaldehyde). Incidentally, in the melamine resin, the main chain itself has a crosslinked or polymerized structure.

The anionic group is preferably bonded as a side chain of the binder to the main chain through a linking group.

The linking group connecting the anionic group and the binder main chain is preferably a divalent group selected from —CO—, —O—, an alkylene group, an arylene group and a combination thereof. The crosslinked or polymerized structure forms chemical bonding (preferably covalent bonding) of two or more main chains, preferably forms covalent bonding of three or more main chains. The crosslinked or polymerized structure preferably comprises a divalent or greater valence group selected from —CO—, —O—, —S—, a nitrogen atom, a phosphorus atom, an aliphatic residue, an aromatic residue and a combination thereof.

The binder is preferably a copolymer comprising a repeating unit having an anionic group and a repeating unit having a crosslinked or polymerized structure. In the copolymer, the proportion of the repeating unit having an anionic group is preferably from 2 to 96 mol %, more preferably from 4 to 94 mol %, and most preferably from 6 to 92 mol %. The repeating unit may have two or more anionic groups. In the copolymer, the proportion of the repeating unit having a crosslinked or polymerized structure is preferably from 4 to 98 mol %, more preferably from 6 to 96 mol %, and most preferably from 8 to 94 mol %.

The repeating unit of the binder may have both an anionic group and a crosslinked or polymerized structure. Also, the binder may contain other repeating unit (a repeating unit having neither an anionic group nor a crosslinked or polymerized unit).

This other repeating unit is preferably a repeating unit having a silanol group, an amino group or a quaternary ammonium group.

In the repeating unit having a silanol group, the silanol group is bonded directly to the binder main chain or bonded to the main chain through a linking group. The silanol group is preferably bonded as a side chain to the main chain through a linking group. The linking group connecting the silanol group and the binder main chain is preferably a divalent group selected from —CO—, —O—, an alkylene group, an arylene group and a combination thereof. In the case where the binder contains a repeating unit having a silanol group, the proportion of the repeating unit is preferably from 2 to 98 mol %, more preferably from 4 to 96 mol %, and most preferably from 6 to 94 mol %.

In the repeating unit having an amino group or a quaternary ammonium group, the amino group or quaternary ammonium group is bonded directly to the binder main chain or bonded to the main chain through a linking group. The amino group or quaternary ammonium group is preferably bonded as a side chain to the main chain through a linking group. The amino group or quaternary ammonium group is preferably a secondary amino group, a tertiary amino group or a quaternary ammonium group, more preferably a tertiary amino group or a quaternary ammonium group. The group bonded to the nitrogen atom of the secondary or tertiary amino group or quaternary ammonium group is preferably an alkyl group, more preferably an alkyl group having from 1 to 12 carbon atoms, still more preferably an alkyl group having from 1 to 6 carbon atoms. The counter ion of the quaternary ammonium group is preferably a halide ion. The linking group connecting the amino group or quaternary ammonium group and the binder main chain is preferably a divalent group selected from —CO—, —NH—, —O—, an alkylene group, an arylene group and a combination thereof. In the case where the binder contains a repeating unit having an amino group or a quaternary ammonium group, the proportion of the repeating unit is preferably from 0.1 to 32 mol %, more preferably from 0.5 to 30 mol %, and most preferably from 1 to 28 mol %.

Incidentally, the same effects can be obtained even when the silanol group, amino group or quaternary ammonium group is contained in the repeating unit having an anion group or in the repeating unit having a crosslinked or polymerized structure.

The crosslinked or polymerized binder is preferably formed by applying a coating composition for the formation of high refractive index layer to a transparent support and simultaneously with or after the coating, causing a crosslinking or polymerization reaction.

The binder of the high refractive index layer is added in an amount of 5 to 80 weight % based on the solid content of the coating composition for the high refractive index layer.

The inorganic fine particle has an effect of controlling the refractive index of the high refractive index layer and also has a function of suppressing the curing shrinkage.

The inorganic fine particle is preferably dispersed in the high refractive index layer to have a particle size as small as possible. The weight average particle size is from 1 to 200 nm, preferably from 5 to 150 nm, more preferably from 10 to 100 nm, and most preferably from 10 to 80 nm.

By dispersing the inorganic fine particle to a small particle size of 200 nm or less, a high refractive index layer can be formed without impairing the transparency.

The content of the inorganic fine particle in the high refractive index layer is preferably from 10 to 90 weight %, more preferably from 15 to 80 weight %, still more preferably from 15 to 75 weight %, based on the weight of the high refractive index layer. In the high refractive index layer, two or more kinds of inorganic fine particles may used in combination.

In the case of having a low refractive index layer on the high refractive index layer, the refractive index of the high refractive index layer is preferably higher than the refractive index of the transparent support.

In the high refractive index layer, a binder obtained by a crosslinking or polymerization reaction of an ionizing radiation-curable compound containing an aromatic ring, an ionizing radiation-curable compound containing a halogen element (e.g., Br, I, Cl) except for fluorine, or an ionizing radiation-curable compound containing an atom such as S, N and P, is also preferably used.

For producing an antireflection film by forming a low refractive index layer on the high refractive index layer, the refractive index of the high refractive index layer is preferably from 1.55 to 2.40, more preferably from 1.60 to 2.20, still more preferably from 1.65 to 2.10, and most preferably from 1.80 to 2.00.

The high refractive index layer may contain, in addition to the above-described components (e.g., inorganic fine particle, polymerization initiator, photosensitizer), a resin, a surfactant, an antistatic agent, a coupling agent, a thickening agent, a coloration inhibitor, a colorant (e.g., pigment, dye), a defoaming agent, a leveling agent, a flame retardant, an ultraviolet absorbent, an infrared absorbent, a tackifier, a polymerization inhibitor, an antioxidant, a surface modifier, an electrically conducting metal fine particle and the like.

The film thickness of the high refractive index layer may be appropriately designed according to usage. When the high refractive index layer is used as an optical interference layer which is described later, the film thickness is preferably from 30 to 200 nm, more preferably from 50 to 170 nm, still more preferably from 60 to 150 nm.

In the present invention, the crosslinking or polymerization reaction of the ionizing radiation-curable compound is preferably performed in an atmosphere having an oxygen concentration of 10 vol % or less. This is not limited to the formation of the high refractive index layer but commonly applies to the antiglare hard coat layer and the light-diffusing layer.

By forming the high refractive index layer in an atmosphere having an oxygen concentration of 10 vol % or less, the high refractive index layer can be improved in the physical strength and resistance against chemicals and weather and furthermore, in the adhesion between the high refractive index layer and a layer adjacent to the high refractive index layer.

The high refractive index layer is preferably formed by performing the crosslinking or polymerization reaction of the ionizing radiation-curable compound in an atmosphere having an oxygen concentration of 6 vol % or less, more preferably 4 vol % or less, still more preferably 2 vol % or less, and most preferably 1 vol % or less.

The oxygen concentration is preferably adjusted to 10 vol % or less by displacing the air (nitrogen concentration: about 79 vol %, oxygen concentration: about 21 vol %) with a different gas, more preferably with nitrogen (nitrogen purging).

The strength of the high refractive index layer is, as determined by a pencil hardness test according to JIS K5400, preferably H or more, more preferably 2H or more, and most preferably 3H or more.

Furthermore, in the Taber test according to JIS K5400, the abrasion loss of specimen between before and after the test is preferably smaller.

In the case where the high refractive index layer does not contain a particle of imparting an antiglare function, the haze of the layer is preferably lower, specifically, 5% or less, more preferably 3% or less, still more preferably 1% or less.

The high refractive index layer is preferably formed on the transparent support directly or through another layer.

[Hard Coat Layer]

As the hard coat layer, a so-called smooth hard coat layer having no antiglare property is also preferably used to impart a physical strength to the antireflection film. The smooth hard coat layer is provided on the transparent support surface, preferably between the transparent support and the antiglare hard coat layer, between the transparent support and the light-diffusing layer, or between the transparent support and the high refractive index layer.

The hard coat layer is preferably formed by the crosslinking or polymerization reaction of an ionizing radiation-curable compound. For example, a coating composition containing an ionizing radiation-curable polyfunctional monomer or oligomer is coated on a transparent support and the polyfunctional monomer or oligomer is crosslinked or polymerized, whereby the hard coat layer can be formed.

The functional group of the ionizing radiation-curable polyfunctional monomer or oligomer is preferably a photopolymerizable functional group, an electron beam polymerizable functional group or a radiation polymerizable functional group, more preferably a photopolymerizable functional group.

Example's of the photopolymerizable functional group include unsaturated polymerizable functional groups such as (meth)acryloyl group, vinyl group, styryl group and allyl group. Among these, a (meth)acryloyl group is preferred. Specific examples of the ionizing radiation-curable polyfunctional monomer or oligomer are the same as those described in regard to the antiglare hard coat layer.

Specific examples of the photopolymerizable polyfunctional monomer having a photopolymerizable functional group include those described in regard to the high refractive index layer. The polyfunctional monomer is preferably polymerized by using a photopolymerization initiator or a photosensitizer. The photopolymerization reaction is preferably performed by ultraviolet irradiation after coating and drying the hard coat layer.

The binder of the hard coat layer is added in an amount of 30 to 95 weight % based on the solid content of the coating composition for the hard coat layer.

The hard coat layer preferably contains an inorganic fine particle having an average primary particle size of 200 nm or less. The average particle size as used herein is a weight average particle size. By setting the average primary particle size to 200 nm or less, the hard coat layer can be formed without impairing the transparency.

The inorganic fine particle has a function of elevating the hardness of the hard coat layer and at the same time, suppressing the curing shrinkage of the coated layer. The inorganic fine particle is added also for the purpose of controlling the refractive index of the hard coat layer.

Examples of the inorganic fine particle include, in addition to the inorganic fine particles described in regard to the refractive index layer, fine particles of silicon dioxide, aluminum oxide, calcium carbonate, barium sulfate, talc, kaolin, calcium sulfate, titanium dioxide, zirconium oxide, tin oxide, ITO and zinc oxide. Among these, preferred are silicon dioxide, titanium dioxide, zirconium oxide, aluminum oxide, tin oxide, ITO and zinc oxide.

The average primary particle size of the inorganic fine particle is preferably from 5 to 200 nm, more preferably from 10 to 150 nm, still more preferably from 20 to 100 nm, particularly preferably from 20 to 50 nm.

The inorganic fine particle is preferably dispersed in the hard coat layer to have a particle size as small as possible.

The particle size of the inorganic fine particle in the hard coat layer is, in terms of the average particle size, preferably from 5 to 300 nm, more preferably from 10 to 200 nm, still more preferably from 20 to 150 nm, particularly preferably from 20 to 80 nm.

The content of the inorganic fine particle in the hard coat layer is preferably from 10 to 90 weight %, more preferably from 15 to 80 weight %, still more preferably from 15 to 75 weight %, based on the entire weight of the hard coat layer.

The film thickness of the hard coat layer may be appropriately designed according to usage. The film thickness of the hard coat layer is preferably from 0.2 to 10 μm, more preferably from 0.5 to 7 μm, still more preferably from 0.7 to 5 μm.

The strength of the hard coat layer is, as determined by a pencil hardness test according to JIS K5400, preferably H or more, more preferably 2H or more, and most preferably 3H or more.

Furthermore, in the Taber test according to JIS K5400, the abrasion loss of specimen between before and after the test is preferably smaller.

In the case where the hard coat layer is formed by the crosslinking or polymerization reaction of the ionizing radiation-curable compound, the crosslinking or polymerization reaction is preferably performed in an atmosphere having an oxygen concentration of 10 vol % or less. By forming the hard coat layer in an atmosphere having an oxygen concentration of 10 vol % or less, a hard coat layer excellent in the physical strength and chemical resistance can be formed.

The hard coat layer is preferably formed by performing the crosslinking or polymerization reaction of the ionizing radiation-curable compound in an atmosphere having an oxygen concentration of 6 vol % or less, more preferably 4 vol % or less, still more preferably 2 vol % or less, and most preferably 1 vol % or less.

The oxygen concentration is preferably adjusted to 10 vol % or less by displacing the air (nitrogen concentration: about 79 vol %, oxygen concentration: about 21 vol %) with a different gas, more preferably with nitrogen (nitrogen purging).

The hard coat layer is preferably formed by coating a coating composition for the formation of hard coat layer on a transparent support surface.

The low refractive index layer for use in the present invention is described below.

The low refractive index layer of the antireflection film of the present invention has a refractive index of 1.20 to 1.49, preferably from 1.30 to 1.44.

The materials constituting the low refractive index layer of the present invention are described below.

The low refractive index layer of the present invention contains a fluorine-containing polymer as a low refractive index binder. The fluorine polymer is preferably a fluorine-containing polymer having a kinetic friction coefficient of 0.03 to 0.15 and a contact angle to water of 90 to 120° and capable of crosslinking by heat or ionizing radiation. In the low refractive index layer of the present invention, as described above, an inorganic filler may also be used so as to improve the film strength.

Examples of the fluorine-containing polymer for use in the low refractive index layer include a hydrolysate and a dehydration-condensate of perfluoroalkyl group-containing silane compound (e.g., (heptadecafluoro-1,1,2,2-tetrahydro-decyl) triethoxysilane), and a fluorine-containing copolymer having, as constituent components, a fluorine-containing monomer unit and a constituent unit for imparting crosslinking reactivity.

Specific examples of the fluorine-containing monomer unit include fluoroolefins (e.g., fluoroethylene, vinylidene fluoride, tetrafluoroethylene, perfluorooctyl ethylene, hexafluoropropylene, perfluoro-2,2-dimethyl-1,3-dioxol), partially or completely fluorinated alkyl ester derivatives of (meth) acrylic acid (e.g., BISCOTE 6FM (produced by Osaka Yuki Kagaku), M-2020 (produced by Daikin)), and completely or partially fluorinated vinyl ethers. Among these, perfluoroolefins are preferred and in view of refractive index, solubility, transparency and easy availability, hexafluoropropylene is more preferred.

Examples of the constituent unit for imparting crosslinking reactivity include a constituent unit obtained by the polymerization of a monomer previously having a self-crosslinkable functional group within the molecule, such as glycidyl (meth) acrylate and glycidyl vinyl ether; a constituent unit obtained by the polymerization of a monomer having a carboxyl group, a hydroxy group, an amino group or a sulfo group, such as (meth)acrylic acid, methylol (meth)acrylate, hydroxyalkyl (meth)acrylate, allyl acrylate, hydroxyethyl vinyl ether, hydroxybutyl vinyl ether, maleic acid and crotonic acid; and a constituent unit obtained by introducing a crosslinking reactive group such as (meth)acryloyl group into the above-described constituent unit by a polymer reaction (the crosslinking reactive group can be introduced, for example, by causing an acrylic acid chloride to act on a hydroxy group).

In addition to the fluorine-containing monomer unit and the constituent unit for imparting the crosslinking reactivity, a monomer not containing a fluorine atom may also be appropriately copolymerized in view of solubility in solvent, transparency of film or the like. The monomer unit which can be used in combination is not particularly limited and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methyl vinyl ether, ethyl vinyl ether, cyclohexyl vinyl ether), vinyl esters (e.g., vinyl acetate, vinyl propionate, vinyl cinnamate), acrylamides (e.g., N-tert-butylacrylamide, N-cyclohexylacrylamide), methacryl-amides and acrylonitrile derivatives.

With this polymer, a curing agent may be appropriately used in combination as described in JP-A-10-25388 and JP-A-10-147739.

The particularly useful fluorine-containing polymer for use in the low refractive index layer is a random copolymer of a perfluoroolefin and a vinyl ether or ester. In particular, the fluorine-containing polymer preferably has a group capable of undergoing crosslinking reaction by itself (for example, a radical reactive group such as (meth)acryloyl group, or a ring-opening polymerizable group such as epoxy group and oxetanyl group). The crosslinking reactive group-containing polymerization unit preferably occupies from 5 to 70 mol %, more preferably from 30 to 60 mol %, in all polymerization units of the polymer.

In a preferred embodiment, the copolymer for use in the low refractive index layer includes the compound represented by formula 1.

In formula 1, L represents a linking group having from 1 to 10 carbon atoms, preferably a linking group having from 1 to 6 carbon atoms, more preferably a linking group having from 2 to 4 carbon atoms, which may be linear, branched or cyclic and which may have a heteroatom selected from O, N and S.

Preferred examples thereof include *—(CH$_2$)$_2$—O—**, *—(CH$_2$)$_2$—NH—**, *—(CH$_2$)$_4$—O—**, *—(CH$_2$)$_6$—O—**, *—(CH$_2$)$_2$—O—(CH$_2$)$_2$—O—**, *—CONH—(CH$_2$)$_3$—O—**, *—CH$_2$CH(OH)CH$_2$—O—**, *—CH$_2$CH$_2$OCONH(CH$_2$)$_3$—O—** (wherein * denotes a linking site in the polymer main chain side and ** denotes a linking site in the (meth)acryloyl group side). m represents 0 or 1.

In formula 1, X represents a hydrogen atom or a methyl group and in view of curing reactivity, preferably a hydrogen atom.

In formula 1, A represents a repeating unit derived from an arbitrary vinyl monomer. The repeating unit is not particularly limited as long as it is a constituent component of a monomer copolymerizable with hexafluoropropylene, and may be appropriately selected by taking account of various points such as adhesion to substrate, Tg of polymer (contributing to film hardness), solubility in solvent, transparency, slipperiness and dust-protecting.antifouling property. The repeating unit may be constituted by a single vinyl monomer or multiple vinyl monomers according to the purpose.

Preferred examples thereof include vinyl ethers such as methyl vinyl ether, ethyl vinyl ether, tert-butyl vinyl ether, cyclohexyl vinyl ether, isopropyl vinyl ether, hydroxyethyl vinyl ether, hydroxybutyl vinyl ether, glycidyl vinyl ether and allyl vinyl ether, vinyl esters such as vinyl acetate, vinyl propionate and vinyl butyrate, (meth)acrylates such as methyl (meth)acrylate, ethyl (meth)acrylate, hydroxyethyl (meth) acrylate, glycidyl methacrylate, allyl (meth)acrylate and (meth)acryloyloxy-propyltrimethoxysilane, styrene derivatives such as styrene and p-hydroxymethylstyrene, unsaturated carboxylic acids such as crotonic acid, maleic acid and itaconic acid, and derivatives thereof. Among these, preferred are vinyl ether derivatives and vinyl ester derivatives, more preferred are vinyl ether derivatives.

x, y and z represent mol % of respective constituent components and each represents a value satisfying 30≤x≤60, 5≤y≤70 and 0≤z≤65, preferably 35≤x≤55, 30≤y≤60 and 0≤z≤20, more preferably 40≤x≤55, 40≤y≤55 and 0≤z≤10.

In a more preferred embodiment, the copolymer for use in the low refractive index layer includes the compound represented by formula 4:

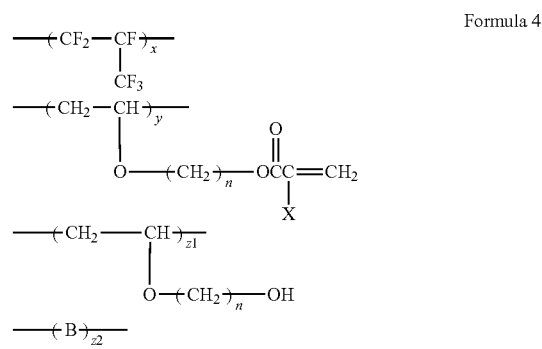

Formula 4

In formula 4, X, x and y have the same meanings as in formula 1 and preferred ranges are also the same.

n represents an integer of 2≤n≤10, preferably 2≤n≤6, more preferably 2≤n≤4.

B represents a repeating unit derived from an arbitrary vinyl monomer and may be composed of a single composition or multiple compositions. Examples thereof include those described above as examples of A in formula 1.

z1 and z2 represent mol % of respective units and each represents a value satisfying 0≤z1≤65 and 0≤z2≤65, preferably 0≤z1≤30 and 0≤z2≤10, more preferably 0≤z1≤10 and 0≤z2≤5.

The copolymer represented by formula 1 or 4 can be synthesized, for example, by introducing a (meth)acryloyl group into a copolymer comprising a hexafluoropropylene component and a hydroxyalkyl vinyl ether component, according to any method described above.

Specific preferred examples of the copolymer useful in the present invention are set forth below, but the present invention is not limited thereto.

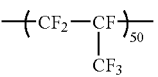
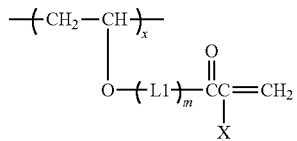
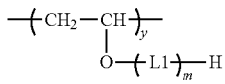
|     | x  | y  | m | L1 | X | Number Average Molecular Weight Mn (×10⁴) |
|-----|----|----|---|----|---|------|
| P-1 | 50 | 0  | 1 | *—CH₂CH₂O— | H | 3.1 |
| P-2 | 50 | 0  | 1 | *—CH₂CH₂O— | CH₃ | 4.0 |
| P-3 | 45 | 5  | 1 | *—CH₂CH₂O— | H | 2.8 |
| P-4 | 40 | 10 | 1 | *—CH₂CH₂O— | H | 3.8 |
| P-5 | 30 | 20 | 1 | *—CH₂CH₂O— | H | 5.0 |
| P-6 | 20 | 30 | 1 | *—CH₂CH₂O— | H | 4.0 |
| P-7 | 50 | 0  | 0 | — | H | 11.0 |
| P-8 | 50 | 0  | 1 | *—C₄H₈O— | H | 0.8 |
| P-9 | 50 | 0  | 1 | *—(CH₂)₂—O—(CH₂)₂—O— | H | 1.0 |
| P-10| 50 | 0  | 1 | 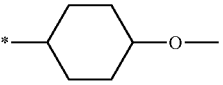 | H | 7.0 |
*denotes the polymer main chain side.
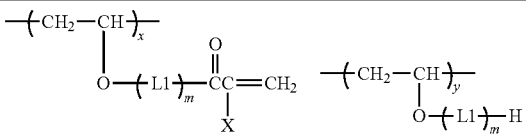
|      | x  | y | m | L1 | X | Number Average Molecular Weight Mn (×10⁴) |
|------|----|---|---|----|---|------|
| P-11 | 50 | 0 | 1 | *—CH₂CH₂NH— | H | 4.0 |
| P-12 | 50 | 0 | 1 | *—CH₂CH₂OC(O)NHCH₂CH₂O— | H | 4.5 |
| P-13 | 50 | 0 | 1 | *—CH₂CH₂OC(O)NHCH₂CH₂O— | CH₃ | 4.5 |
| P-14 | 50 | 0 | 1 | *—CH₂CH₂CH₂CH₂OC(O)NHCH₂CH₂O— | CH₃ | 5.0 |

-continued

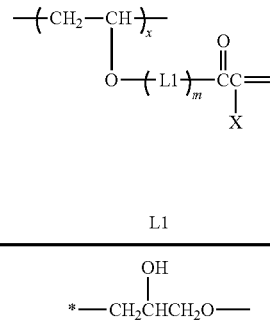

| | x | y | m | L1 | X | Number Average Molecular Weight Mn (×10⁴) |
|---|---|---|---|---|---|---|
| P-15 | 50 | 0 | 1 | *—CH₂CH(OH)CH₂O— | H | 3.5 |
| P-16 | 50 | 0 | 1 | *—CH₂CH(CH₂OH)O— | H | 3.0 |
| P-17 | 50 | 0 | 1 | *—CH₂CH₂OCH₂—CH(OH)CH₂O— | H | 3.0 |
| P-18 | 50 | 0 | 1 | *—CH₂OCH₂CH(OH)—CH₂O— | CH₃ | 3.0 |
| P-19 | 50 | 0 | 1 | *—CH₂₂OCH₂CH(CH₂OH)—O— | CH₃ | 3.0 |
| P-20 | 40 | 10 | 1 | *—CH₂CH₂O— | CH₃ | 0.6 |

*denotes the polymer main chain side.

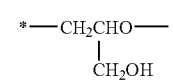

| | a | b | c | L1 | A | Number Average Molecular Weight Mn (×10⁴) |
|---|---|---|---|---|---|---|
| P-21 | 55 | 45 | 0 | *—CH₂CH₂O—** | — | 1.8 |
| P-22 | 45 | 55 | 0 | *—CH₂CH₂O—** | — | 0.8 |
| P-23 | 50 | 45 | 5 | *—CH₂CH₂OC(O)NHCH₂CH₂O—** | —CH₂—CH(OCH₂CH₂OH)— | 0.7 |
| P-24 | 50 | 45 | 5 | *—CH₂CH(OH)—CH₂O—** | —CH₂—CH(O-CH₂-epoxide)— | 4.0 |
| P-25 | 50 | 45 | 5 | *—CH₂CH(CH₂OH)O—** | —CH₂—CH(O-CH₂-epoxide)— | 4.0 |
| P-26 | 50 | 40 | 10 | *—CH₂CH₂O—** | —CH₂—CH(OCH₂CH₃)— | 4.0 |
| P-27 | 50 | 40 | 10 | *—CH₂CH₂O—** | —CH₂—CH(O-cyclohexyl)— | 4.0 |

-continued $$-(CF_2-CF)_a- \quad -(CH_2-CH)_b- \quad -(A)_c-$$
$$\phantom{xxx}|\phantom{xxxxxxxxxx}|$$
$$\phantom{xxx}CF_3\phantom{xxxxx}O-L1-\overset{O}{\overset{\|}{C}}CH=CH_2$$

| | a | b | c | L1 | A | Number Average Molecular Weight Mn (×10⁴) |
|---|---|---|---|---|---|---|
| P-28 | 50 | 40 | 10 | *—CH₂CH₂O—** | —CH(CH₃)—CH(COOH)— | 5.0 |

*denotes the polymer main chain side.
**denotes the acryloyl group side.

$$-(CF_2-CF)_x- \quad -(CH_2-CH)_y- \quad -(B)_{z2}-$$
$$\phantom{xxx}|\phantom{xxxxxxxxxxxx}|$$
$$\phantom{xxx}CF_3\phantom{xxxxx}O-(CH_2)_n-O-\overset{O}{\overset{\|}{C}}-\overset{X}{\overset{|}{C}}=CH_2$$

$$-(CH_2-CH)_{z1}-$$
$$\phantom{xxxxx}|$$
$$\phantom{xxxxx}O-(CH_2)_n-OH$$

| | x | y | z1 | z2 | n | X | B | Number Average Molecular Weight Mn (×10⁴) |
|---|---|---|---|---|---|---|---|---|
| P-29 | 50 | 40 | 5 | 5 | 2 | H | —CH₂—CH(O—CH₂CH₃)— | 5.0 |
| P-30 | 50 | 35 | 5 | 10 | 2 | H | —CH₂—CH(O—C(CH₃)₃)— | 5.0 |
| P-31 | 40 | 40 | 10 | 10 | 4 | CH₃ | —CH₂—CH(O—C₆H₁₁)— | 4.0 |

$$-(CF_2-CF)_{50}- \quad -(Y)_a- \quad -(Z)_b-$$
$$\phantom{xxx}|$$
$$\phantom{xxx}CF_3$$

| | a | b | Y | Z | Number Average Molecular Weight Mn (×10⁴) |
|---|---|---|---|---|---|
| P-32 | 45 | 5 | —CH(CH₃)—CH(CO₂CH₂CH(OH)CH₂OC(=O)C(CH₃)=CH₂)— | —CH(CH₃)—CH(COOH)— | 4.0 |
| P-33 | 40 | 10 | —CH(CO₂H)—CH(CONHCH₂CH₂OC(=O)CH=CH₂)— | —CH(—O—C(=O))—CH(C(=O))— | 4.0 |

$$-\!\!\left(\!CH_2\!-\!CH\!\right)_{\!x}\!\!-\quad -\!\!\left(\!CH_2\!-\!CH\!\right)_{\!y}\!\!-\quad -\!\!\left(\!CH_2\!-\!CH\!\right)_{\!z}\!\!-$$
$$\underset{Rf}{\overset{O=C}{\underset{|}{O}}}\qquad \underset{L-\overset{O}{\overset{\|}{C}}CH=CH_2}{\overset{O=C}{\underset{|}{O}}}\qquad \underset{L-H}{\overset{O=C}{\underset{|}{O}}}$$

| | x | y | z | Rf | L | Number Average Molecular Weight Mn ($\times 10^4$) |
|---|---|---|---|---|---|---|
| P-34 | 60 | 40 | 0 | —$CH_2CH_2C_8F_{17}$—n | *—$CH_2CH_2O$— | 11 |
| P-35 | 60 | 30 | 10 | —$CH_2CH_2C_4F_8H$—n | *—$CH_2CH_2O$— | 30 |
| P-36 | 40 | 60 | 0 | —$CH_2CH_2C_6F_{12}H$ | *—$CH_2CH_2CH_2CH_2O$— | 4.0 |

*denotes the polymer main chain side.

$$-\!\!\left(\!CH_2\!-\!CH\!\right)_{\!x}\!\!-$$
$$\underset{Rf}{\overset{|}{O}}$$

$$-\!\!\left(\!CH_2\!-\!CH\!\right)_{\!y}\!\!-$$
$$\underset{O-(CH_2)_n-O\overset{O}{\overset{\|}{C}}CH=CH_2}{\overset{|}{}}$$

$$-\!\!\left(\!CH_2\!-\!CH\!\right)_{\!z}\!\!-$$
$$\underset{O-(CH_2)_n-OH}{\overset{|}{}}$$

| | x | y | z | n | Rf | Number Average Molecular Weight Mn ($\times 10^4$) |
|---|---|---|---|---|---|---|
| P-37 | 50 | 50 | 0 | 2 | —$CH_2C_4F_8H$—n | 5.0 |
| P-38 | 40 | 55 | 5 | 2 | —$CH_2C_4F_8H$—n | 4.0 |
| P-39 | 30 | 70 | 0 | 4 | —$CH_2C_8F_{17}$—n | 10 |
| P-40 | 60 | 40 | 0 | 2 | —$CH_2CH_2C_8F_{16}H$—n | 5.0 |

The synthesis of the copolymer for use in the low refractive index layer can be performed by synthesizing a precursor such as hydroxyl group-containing polymer according to various polymerization methods such as solution polymerization, precipitation polymerization, suspension polymerization, precipitation polymerization, block polymerization and emulsion polymerization, and then introducing a (meth)acryloyl group through the above-described polymer reaction. The polymerization reaction can be performed by a known operation such as batch system, semi-continuous system or continuous system.

The polymerization initiating method includes a method of using a radical initiator, a method of irradiating light or radiation, and the like. These polymerization methods and polymerization initiating methods are described, for example, in Teiji Tsuruta, Kobunshi Gosei Hoho (Polymer Synthesis Method), revised edition, Nikkan Kogyo Shinbun Sha (1971), and Takayuki Ohtsu and Masaetsu Kinoshita, Kobunshi Gosei no Jikken Ho (Test Method of Polymer Synthesis), pp. 124-154, Kagaku Dojin (1972).

Among those polymerization methods, a solution polymerization method using a radical initiator is preferred. Examples of the solvent for use in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol. These solvents may be used individually or as a mixture of two or more thereof or may be used as a mixed solvent with water.

The polymerization temperature should be set according to the molecular weight of polymer, the kind of initiator, and the like and, a polymerization temperature from 0° C. or less to 100° C. or more can be used, but the polymerization is preferably performed in the range from 50 to 100° C.

The reaction pressure can be appropriately selected but is usually from 1 to 100 kg/cm$^2$, preferably from 1 to 30 kg/cm$^2$. The reaction time is approximately from 5 to 30 hours.

The reprecipitation solvent for the polymer obtained is preferably isopropanol, hexane, methanol or the like.

The fluorine-containing polymer for use in the low refractive index layer is added in an amount of 20 to 95 weight % based on the solid content of the coating solution for the low refractive index layer.

The inorganic fine particle which can be contained in the low refractive index layer of the present invention is described below.

The amount of the inorganic fine particle blended is preferably 1 to 100 mg/m$^2$, more preferably from 5 to 80 mg/m$^2$, still more preferably from 10 to 60 mg/m$^2$.

When the amount blended is in this range, excellent scratch resistance is obtained, generation of fine asperities on the low refractive index layer surface decreases, and the appearance such as non-loosening of black and the integrated reflectance are improved.

The inorganic fine particle is contained in the low refractive index layer and therefore, this particle preferably has a low reflective index. Examples thereof include fine particles of magnesium fluoride and silica. Particularly, in view of refractive index, dispersion stability and cost, a silica fine particle is preferred. The average particle size of the silica fine particle is preferably from 30 to 150%, more preferably from 35 to 80%, still more preferably from 40 to 60%, of the thickness of the low refractive index layer. In other words, when the thickness of the low refractive index layer is 100 nm, the particle size of the silica fine particle is preferably from 30 to 150 nm, more preferably from 35 to 80 nm, still more preferably from 40 to 60 nm.

If the particle size of the silica fine particle is too small, the effect of improving the scratch resistance decreases, whereas if it is excessively large, fine asperities are formed on the low refractive index layer surface and this deteriorates the appearance such as non-loosening of black or the integrated reflectance. The silica fine particle may be crystalline or amorphous, may be a monodisperse particle, or may be even an aggregated particle as long as the predetermined particle size is satisfied. The shape is most preferably spherical but even if amorphous, there arises no problem.

The average particle size of the inorganic fine particle is measured by a Coulter counter.

In order to more reduce the increase in refractive index of the low refractive index layer, a hollow silica fine particle is preferably used. The refractive index of the hollow silica fine particle is from 1.17 to 1.40, preferably from 1.17 to 1.35, more preferably 1.17 to 1.30. The refractive index used here indicates a refractive index of the particle as a whole and does not represent a refractive index of only silica as an outer shell forming the hollow silica particle. At this time, assuming that the radius of the vacancy inside the particle is a and the radius of the outer shell of the particle is b, the porosity x calculated according the following formula (VIII) is preferably from 10 to 60%, more preferably from 20 to 60%, most preferably from 30 to 60%.

$$x=(4\pi a^3/3)/(4\pi b^3/3)\times 100 \quad \text{Formula (VIII)}$$

If the hollow silica particle is rendered to have more reduced refractive index and more increased porosity, the thickness of the outer shell becomes small and the strength as a particle decreases. Therefore, in view of scratch resistance, a particle having a refractive index as low as less than 1.17 cannot be used.

Here, the refractive index of the hollow silica particle was measured by an Abbe's refractometer (manufactured by ATAGO K.K.).

Also, at least one silica fine particle having an average particle size of less than 25% of the thickness of the low refractive index layer (this fine particle is referred to as a "small particle-size silica fine particle") is preferably used in combination with the silica fine particle having the above-described particle size (this fine particle is referred to as a "large particle-size silica fine particle").

The small particle-size silica fine particle can be present in a space between large particle-size silica fine particles and therefore, can contribute as a holding agent for the large particle-size silica fine particle.

When the thickness of the low refractive index layer is 100 nm, the average particle size of the small particle-size silica fine particle is preferably from 1 to 20 nm, more preferably from 5 to 15 nm, still more preferably from 10 to 15 nm. Use of such a silica fine particle is preferred in view of the raw material cost and the holding agent effect.

The silica fine particle may be subjected to a physical surface treatment such as plasma discharge treatment and corona discharge treatment, or a chemical surface treatment with a surfactant, a coupling agent or the like, so as to stabilize the dispersion in a dispersion product or a coating solution or to enhance the affinity for or binding property with binder components. Use of a coupling agent is particularly preferred. As the coupling agent, an alkoxy metal compound (e.g., titanium coupling agent, silane coupling agent) is preferably used. In particular, a treatment with a silane coupling agent is effective.

This coupling agent is used as a surface treating agent for previously applying a surface treatment to an inorganic filler of the low refractive index layer before a coating solution for the low refractive index layer is prepared, but the coupling agent is preferably further added as an additive at the preparation of a coating solution for the low refractive index layer and incorporated into the layer.

The silica fine particle is preferably dispersed in a medium in advance of the surface treatment so as to reduce the load of the surface treatment.

The matters described above in regard to the silica fine particle also apply to other inorganic fine particles.

In view of scratch resistance, at least one functional layer constituting the antireflection film of the present invention preferably contains an organosilane compound or a hydrolysate and/or partial condensate thereof, so-called sol component (hereinafter sometimes referred to as this), in a coating solution for forming the functional layer. Particularly, for obtaining both the antireflection ability and the scratch resistance, the low refractive index layer preferably contains a sol component and the hard coat layer also preferably contains a sol component. This sol component is condensed to form a cured product during drying and heating after the coating of the coating solution, and works out to a binder of the layer. When the cured product has a polymerizable unsaturated bond, a binder having a three-dimensional structure is formed by the irradiation of actinic rays.

The organosilane compound is preferably represented by the following formula 5:

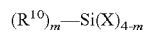    Formula 5:

In formula 5, $R^{10}$ represents a substituted or unsubstituted alkyl group or a substituted or unsubstituted aryl group. The alkyl group is preferably an alkyl group having from 1 to 30 carbon atoms, more preferably from 1 to 16 carbon atoms, still more preferably from 1 to 6 carbon atoms. Specific examples of the alkyl group include methyl, ethyl, propyl, isopropyl, hexyl, decyl and hexadecyl. Examples of the aryl group include phenyl and naphthyl, with phenyl being preferred.

X represents a hydroxyl group or a hydrolyzable group such as an alkoxy group (preferably an alkoxy group having from 1 to 5 carbon atoms, e.g., methoxy, ethoxy), a halogen (e.g., Cl, Br, I) and a group represented by $R^2COO$ (wherein $R^2$ is preferably a hydrogen atom or an alkyl group having from 1 to 5 carbon atoms, e.g., $CH_3COO$, $C_2H_5COO$), preferably an alkoxy group, more preferably a methoxy group or an ethoxy group.

m represents an integer of 1 to 3, preferably 1 or 2, more preferably 1.

When a plurality of $R^{10}$s or Xs are present, multiple $R^{10}$s or Xs may be the same or different.

The substituent contained in $R^{10}$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted.

When a plurality of $R^{10}$s are present, at least one is preferably a substituted alkyl group or a substituted aryl group. In particular, an organosilane compound having a vinyl polymerizable substituent represented by the following formula 6 is preferred:

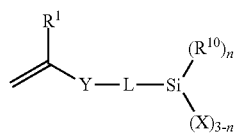

Formula 6

In formula 6, $R^1$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^1$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, *—COO—**, *—CONH—** or *—O—**, preferably a single bond, *—COO—** or *—CONH—**, more preferably a single bond or *—COO—**, still more preferably *—COO—**. * denotes the position bonded to =C($R^1$) and ** denotes the position bonded to L.

L represents a divalent linking chain. Specific examples thereof include a substituted or unsubstituted alkylene group, a substituted or unsubstituted arylene group, a substituted or unsubstituted alkylene group having inside a linking group (e.g., ether, ester, amido), and a substituted or unsubstituted arylene group having inside a linking group. L is preferably a substituted or unsubstituted alkylene group, a substituted or unsubstituted arylene group or an alkylene group having inside a linking group, more preferably an unsubstituted alkylene group, an unsubstituted arylene group or an alkylene group having inside an ether or ester linking group, still more preferably an unsubstituted alkylene group or an alkylene group having inside an ether or ester linking group. Examples of the substituent include a halogen, a hydroxyl group, a mercapto group, a carboxyl group, an epoxy group, an alkyl group and an aryl group. These substituents each may be further substituted.

n represents 0 or 1. When a plurality of Xs are present, multiple Xs may be the same or different. n is preferably 0.

$R^{10}$ has the same meaning as in formula 5 and is preferably a substituted or unsubstituted alkyl group or an unsubstituted aryl group, more preferably an unsubstituted alkyl group or an unsubstituted aryl group.

X has the same meaning as in formula 5 and is preferably a halogen atom, a hydroxyl group or an unsubstituted alkoxy group, more preferably a chlorine atom, a hydroxyl group or an unsubstituted alkoxy group having from 1 to 6 carbon atoms still more preferably a hydroxyl group or an alkoxy having from 1 to 3 carbon atoms, and particularly preferably a methoxy group.

The compounds represented by formulae 5 and 6 may be used in combination of two or more thereof. Specific examples of the compounds represented by formulae 5 and 6 are set forth below, but the present invention, is not limited thereto.

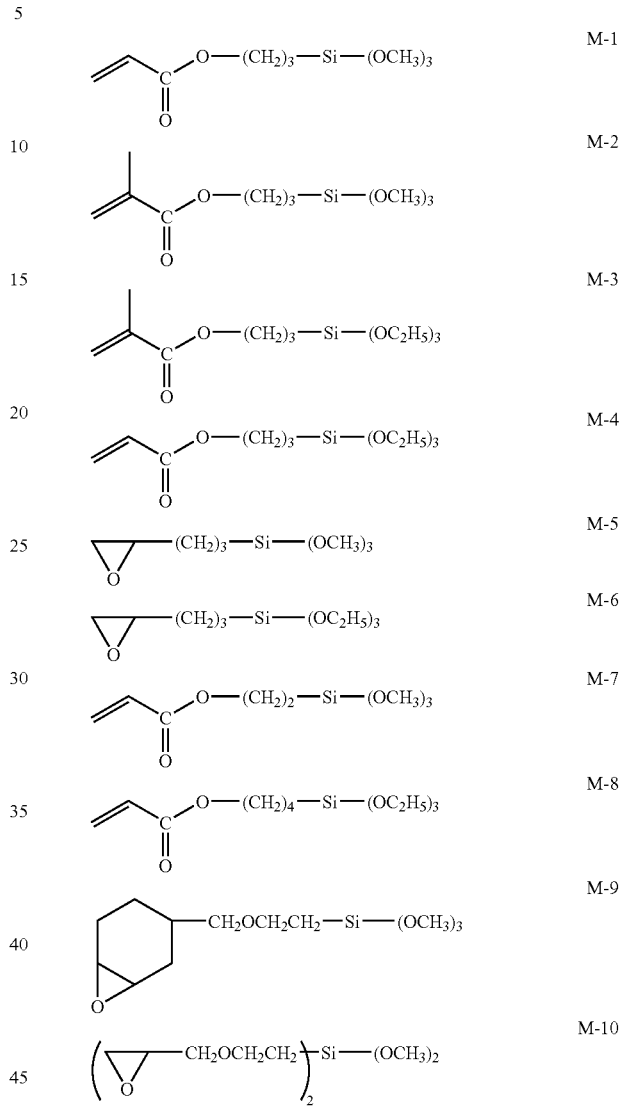

Among these compounds, (M-1), (M-2) and (M-5) are preferred.

The hydrolysate and/or partial condensate of the organosilane compound for use in the present invention are described in detail below.

The hydrolysis and subsequent condensation reaction of organosilane is generally performed in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxyaluminum and tetrabutoxyzirconium; and metal chelate compounds with the center metal being a metal such as Zr, Ti or Al. Among these catalysts, preferred are, as the inorganic acid, hydrochloric acid and sulfuric acid, and as the organic acid, those having an acid dissociation constant (pKa value (25° C.)) of 4.5 or less in water, more preferred are hydrochloric acid, sulfuric acid and organic acids having an acid dissociation constant of 3.0 or less in water, still more preferred are hydrochloric acid, sulfuric acid and organic acids having an acid dissociation constant of 2.5 or less in water, more preferred are organic acids having an acid dissociation constant of 2.5 or less in water, still more preferred are methanesulfonic acid, oxalic acid, phthalic acid and malonic acid, and yet sill more preferred is oxalic acid.

The hydrolysise.condensation reaction of organosilane may be performed with or without a solvent but in order to uniformly mix the components, an organic solvent is preferably used. Suitable examples thereof include alcohols, aromatic hydrocarbons, ethers, ketones and esters.

The solvent is preferably a solvent capable of dissolving organosilane and a catalyst. The organic solvent is preferably used as a coating solution or as a part of a coating solution in view of process, and those of not impairing the solubility or dispersibility when mixed with other materials such as fluorine-containing polymer are preferred.

Among these organic solvents, examples of the alcohols include a monohydric alcohol and a dihydric alcohol. The monohydric alcohol is preferably a saturated aliphatic alcohol from 1 to 8 carbon atoms.

Specific examples of the alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene acetate glycol monoethyl ether.

Specific examples of the aromatic hydrocarbons include benzene, toluene and xylene. Specific examples of the ethers include tetrahydrofuran and dioxane. Specific examples of the ketones include acetone, methyl ethyl ketone, methyl isobutyl ketone and diisobutyl ketone. Specific examples of the esters include ethyl acetate, propyl acetate, butyl acetate and propylene carbonate.

One of these organic solvents can be used alone or two or more thereof can be used as a mixture. The solid content concentration in the reaction is not particularly limited but is usually from 1 to 90%, preferably from 20 to 70%.

The reaction is performed by adding water in an amount of 0.3 to 2 mol, preferably 0.5 to 1 mol, per mol of the hydrolyzable group of organosilane and stirring the resulting solution at 25 to 100° C. in the presence or absence of the above-described solvent and in the presence of a catalyst.

In the present invention, the hydrolysis is preferably performed by stirring the solution at 25 to 100° C. in the presence of at least one metal chelate compound where an alcohol represented by the formula: $R^3OH$ (wherein $R^3$ represents an alkyl group having from 1 to 10 carbon atoms) and a compound represented by the formula: $R^4COCH_2COR^5$ (wherein $R^4$ represents an alkyl group having from 1 to 10 carbon atoms and $R^5$ represents an alkyl group having from 1 to 10 carbon atoms or an alkoxy group having from 1 to 10 carbon atoms) are present as ligands and the center metal is a metal selected from Zr, Ti and Al.

Any metal chelate compound can be suitably used without particular limitation as long as it is a metal chelate compound where an alcohol represented by the formula: $R^3OH$ (wherein $R^3$ represents an alkyl group having from 1 to 10 carbon atoms) and a compound represented by the formula: $R^1COCH_2COR^3$ (wherein $R^1$ represents an alkyl group having from 1 to 10 carbon atoms and $R^5$ represents an alkyl group having from 1 to 10 carbon atoms or an alkoxy group having from 1 to 10 carbon atoms) are present as ligands and the center metal is a metal selected from Zr, Ti and Al. Within this category, two or more metal chelate compounds may be used in combination. The metal chelate compound for use in the present invention is preferably a compound selected from the compounds represented by the formulae: $Zr(OR^3)_{p1}(R^1COCHCOR^5)_{p2}$, $Ti(OR^3)_{q1}(R^1COCHCOR^5)_{q2}$ and $Al(OR^3)_{r1}(R^4COCHCOR)_{r2}$, and these compounds have an activity of accelerating the condensation reaction of a hydrolysate and/or partial condensate of the organosilane compound.

In the metal chelate compounds, $R^3$ and $R^4$ may be the same or different and each represents an alkyl group having from 1 to 10 carbon atoms, such as ethyl group, n-propyl group, i-propyl group, n-butyl group, sec-butyl group, tert-butyl group, n-pentyl group or phenyl group. $R^5$ represents the same alkyl group having from 1 to 10 carbon atoms as above or an alkoxy group having from 1 to 10 carbon atoms such as methoxy group, ethoxy group, n-propoxy group, i-propoxy group, n-butoxy group, sec-butoxy group or tert-butoxy group. In the metal chelate compounds, p1, p2, q1, q2, r1 and r2 each represents an integer determined to satisfy the relationships of $p1+p2=4$, $q1+q2=4$ and $r1+r2=3$.

Specific examples of the metal chelate compound include zirconium chelate compounds such as zirconium tri-n-butoxyethylacetoacetate, zirconium di-n-butoxy-bis(ethylacetoacetate), zirconium n-butoxy-tris(ethylacetoacetate), zirconium tetrakis(n-propylacetoacetate), zirconium tetrakis(acetylacetoacetate) and zirconium tetrakis(ethylacetoacetate); titanium chelate compounds such as titanium diisopropoxy-bis(ethylacetoacetate), titanium diisopropoxy.bis(acetylacetate) and titanium diisopropoxy.bis (acetylacetone); and aluminum chelate compounds such as aluminum diisopropoxyethylacetoacetate, aluminum diisopropoxyacetylacetonate, aluminum isopropoxybis(ethylacetoacetate), aluminum isopropoxybis(acetylacetonate), aluminum tris(ethylacetoacetate), aluminum tris (acetylacetonate) and aluminum monoacetylacetonato.bis (ethylacetoacetate).

Among these metal chelate compounds, preferred are zirconium tri-n-butoxyethylacetoacetate, titanium diisopropoxybis(acetylacetonate), aluminum diisopropoxyethylacetoacetate and aluminum tris(ethylacetoacetate). These meal chelate compounds can be used individually or as a mixture of two or more thereof. A partial hydrolysate of these metal chelate compounds may also be used.

The metal chelate compound is preferably used in an amount of 0.01 to 50 weight %, more preferably from 0.1 to 50 weight %, still more preferably from 0.5 to 10 weight %, based on the organosilane compound. If the amount added is less than 0.01 weight %, the condensation reaction of the organosilane compounds proceeds slowly and the durability of the coating film may be worsened, whereas if it exceeds 50 weight %, the composition comprising a hydrolysate and/or partial condensate of organosilane compound and a metal chelate compound may be deteriorated in the storage stability and this is not preferred.

In the coating solution for forming the hard coat layer or low refractive index layer for use in the present invention, a β-diketone compound and/or a β-ketoester compound is preferably added in addition to the composition containing the above-described sol component and metal chelate compound. This is further described below.

The compound used in the present invention is a β-diketone compound and/or β-ketoester compound represented by the formula: $R^4COCH_2COR^5$, and this compound functions as a stability enhancer for the composition for use in the present invention. That is, this compound is considered to coordinate to a metal atom in the metal chelate compound (zirconium, titanium and/or aluminum compound) and inhibit the metal chelate compound from exerting the activity of accelerating the condensation reaction of a hydrolysate and/or partial condensate of organosilane compound, thereby improving the storage stability of the composition obtained. $R^4$ and $R^5$ constituting the β-diketone compound and/or β-ketoester compound have the same meanings as $R^4$ and $R^5$ constituting the metal chelate compound.

Specific examples of the β-diketone compound and/or β-ketoester compound include acetylacetone, methyl acetoacetate, ethyl acetoacetate, n-propyl acetoacetate, i-propyl acetoacetate, n-butyl acetoacetate, sec-butyl acetoacetate, tert-butyl acetoacetate, 2,4-hexane-dione, 2,4-heptane-dione, 3,5-heptane-dione, 2,4-octane-dione, 2,4-nonane-dione and 5-methyl-hexane-dione. Among these, ethyl acetoacetate and acetylacetone are preferred, and acetylacetone is more preferred. These β-diketone compounds and/or β-ketoester compounds can be used individually or as a mixture of two or more thereof. In the present invention, the β-diketone compound and/or ketoester compound is preferably used in an amount of 2 mol or more, more preferably from 3 to 20 mol, per mol of the metal chelate compound. If the amount added is less than 2 mol, the composition obtained may be poor in the storage stability and this is not preferred.

The content of the hydrolysate and/or partial condensate of organosilane compound is preferably small in a surface layer which is a relatively thin film, and large in a lower layer which is a thick film. In the case of a surface layer such as low refractive index layer, the content is preferably from 0.1 to 50 weight %, more preferably from 0.5 to 20 weight %, still more preferably from 1 to 10 weight %, based on the entire solid content of the layer containing it (layer to which added).

The amount added to a layer other than the low refractive index layer is preferably from 0.001 to 50 weight %, more preferably from 0.01 to 20 weight %, still more preferably from 0.05 to 10 weight %, particularly preferably from 0.1 to 5 weight %, based on the entire solid content of the layer containing it (layer to which added).

In the present invention, it is preferred to first prepare a composition containing the hydrolysate and/or partial condensate of organosilane compound and the metal chelate compound, add a β-diketone compound and/or P-ketoester compound thereto, incorporate the resulting solution into a coating solution for at least one layer of the hard coat layer and the low refractive index layer, and apply the coating solution.

The amount of the sol component of organosilane used in the low refractive index layer is preferably from 5 to 100 weight %, more preferably from 5 to 40 weight %, still more preferably from 8 to 35 weight %, particularly preferably from 10 to 30 weight %, based on the fluorine-containing polymer, when considering the expression of effect, the refractive index, the shape/surface state of film, and the like.

In the present invention, a dispersion stabilizer is preferably used in combination in the coating solution for forming each layer so as to prevent aggregation and precipitation of the inorganic filler. Examples of the dispersion stabilizer which can be used include polyvinyl alcohol, polyvinylpyrrolidone, cellulose derivatives, polyamide, phosphoric acid ester, polyether, surfactants, silane coupling agents and titanium coupling agents. Among these, silane coupling agents are preferred because the film after curing is strong.

The low refractive index layer-forming composition for use in the present invention, which usually takes a liquid form, is produced by dissolving the copolymer as the preferred constituent component and if desired, various additives and a radical polymerization initiator in an appropriate solvent. At this time, the concentration of solid contents is appropriately selected according to use but is generally on the order of 0.01 to 60 weight %, preferably from 0.5 to 50 weight %, more preferably from 1 to 20 weight %.

As described above, the addition of additives such as curing agent is not necessarily advantageous in view of the film hardness of the low refractive index layer, but in view of the interface adhesion to high refractive index layer or the like, a curing agent such as polyfunctional (meth)acrylate compound, polyfunctional epoxy compound, polyisocyanate compound, aminoplast, polybasic acid and their anhydrates, or an inorganic fine particle such as silica, may be added in a small amount. In the case of adding such an additive, the amount added is preferably from 0 to 30 weight %, more preferably from 0 to 20 weight %, still more preferably from 0 to 10 weight %, based on the entire solid content of the low refractive index layer film.

For the purpose of imparting properties such as slipperiness and resistance against soil, water and chemicals, known silicon-base or fluorine-base stain-proofing agent, slipping agent and the like can be appropriately added. In the case of adding such an additive, the additive is preferably added in the range from 0.01 to 20 weight %, more preferably from 0.05 to 10 weight %, still more preferably from 0.1 to 5 weight %, based on the entire solid content of the low refractive index layer.

Preferred examples of the silicone-base compound include compounds containing a plurality of dimethylsilyloxy units as the repeating unit and having a substituent at the chain terminal and/or on the side chain. In the chain of the compound containing dimethylsilyloxy as the repeating unit, a structural unit other than dimethylsilyloxy may be contained. A plurality of substituents, which may be the same or different, are preferably present. Preferred examples of the substituent include groups containing an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group, an amino group or the like. The molecular weight is not particularly limited but is preferably 100,000 or less, more preferably 50,000 or less, and most preferably from 3,000 to 30,000. The silicone atom content of the silicone-base compound is not particularly limited but is preferably 18.0 weight % or more, more preferably from 25.0 to 37.8 weight %, and most preferably from 30.0 to 37.0 weight %. Specific preferred examples of the silicone-base compound include, but are not limited to, X-22-174DX, X-22-2426, X-22-164B, X22-164C, X-22-170DX, X-22-176D and X-22-1821 (all are trade names) produced by Shin-Etsu Chemical Co., Ltd., and FM-0725, FM-7725, DMS-U22, RMS-033, RMS-083 and UMS-182 (all are trade names) produced by Chisso Corporation.

The fluorine-base compound is preferably a compound having a fluoroalkyl group. The fluoroalkyl group is preferably a fluoroalkyl group having from 1 to 20 carbon atoms, more preferably from 1 to 10 carbon atoms, and may be linear (for example, —$CF_2CF_3$, —$CH_2(CF_2)_4H$, —$CH_2(CF_2)_8CF_3$ or —$CH_2CH_2(CF_2)_4H$), branched (for example, $CH(CF_3)_2$, $CH_2CF(CF_3)_2$, $CH(CH_3)CF_2CF_3$ or $CH(CH_3)(CF_2)_5CF_2H$) or alicyclic (preferably a 5- or 6-membered ring, for example, a perfluorocyclohexyl group, a perfluorocyclopentyl group or an alkyl group substituted by such a group) or may have an ether bond (for example, $CH_2OCH_2CF_2CF_3$, $CH_2CH_2OCH_2C_4F_8H$, $CH_2CH_2OCH_2CH_2CBF17$ or $CH_2CH_2OCF_2CF_2OCF_2CF_2H$). A plurality of the fluoroalkyl groups may be contained within the same molecule.

The fluorine-base compound preferably further has a substituent which contributes to the bond formation or compatibility with the low refractive index layer film. A plurality of substituents, which may be the same or different, are preferably present. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group and an amino group. The fluorine-base compound may be a copolymer or copolymer oligomer with a compound not containing a fluorine atom. The molecular weight is not particularly limited. The fluorine atom content of the fluorine-base compound is not particularly limited but is preferably 20 weight % or more, more preferably from 30 to 70 weight %, and most preferably from 40 to 70 weight %. Specific preferred examples of the fluorine-base compound include, but are not limited to, R-2020, M-2020, R-3833 and M-3833 (all are trade names) produced by Daikin Kogyo Co., Ltd., and Megafac F-171, F-172, F-179A and DYFENSA MCF-300 (all are trade names) produced by Dai-Nippon Ink & Chemicals, Inc.

For the purpose of imparting properties such as dust-protecting property and antistatic property, a dust inhibitor, an antistatic agent and the like such as known cationic surfactant or polyoxyalkylene-base compound may be appropriately added. A structural unit of such a dust inhibitor or antistatic agent may be contained as a part of functions in the above-described silicone-base compound or fluorine-base compound. In the case of adding such an additive, the additive is preferably added in the range from 0.01 to 20 weight %, more preferably from 0.05 to 10 weight %, still more preferably from 0.1 to 5 weight %, based on the entire solid content of the lower refractive index layer. Preferred examples of the compound include, but are not limited to, Megafac F-150 (trade name) produced by Dai-Nippon Ink & Chemicals, Inc.) and SH-3748 (trade name) produced by Toray Dow Corning.

[Transparent Support]

The transparent support of the antireflection film of the present invention is preferably a plastic film. Examples of the polymer for forming the plastic film include cellulose esters (e.g., triacetyl cellulose, diacetyl cellulose; representative examples thereof include TAC-TD80U and TD80UF produced by Fuji Photo Film Co., Ltd.), polyamides, polycarbonates, polyesters (e.g., polyethylene terephthalate, polyethylene naphthalate), polystyrenes, polyolefins, norbornene-base resins (ARTQN, trade name, produced by JSR) and amorphous polyolefins (ZEONEX, trade name, produced by Nippon Zeon). Among these, preferred are triacetyl cellulose, polyethylene terephthalate and polyethylene naphthalate, and more preferred is triacetyl cellulose.

The triacetyl cellulose comprises a single layer or multiple layers. The single-layer triacetyl cellulose is prepared by drum casting disclosed in JP-A-7-11055 or band casting and the triacetyl cellulose comprising multiple layers is prepared by a so-called co-casting method disclosed in JP-A-61-94725 and JP-B-62-43846 (the term "JP-B" as used herein means an "examined Japanese patent publication"). More specifically, a raw material flake is dissolved in a solvent such as halogenated hydrocarbons (e.g., dichloromethane), alcohols (e.g., methanol, ethanol, butanol), esters (e.g., methyl formate, methyl acetate) and ethers (e.g., dioxane, dioxolane, diethyl ether), and thereto, if desired, various additives such as plasticizer, ultraviolet absorbent, deterioration inhibitor, lubricant and peel accelerator are added. The obtained solution (called "dope") is cast on a support comprising a horizontal endless metal belt or a rotating drum by dope-supplying means (called "die"). At this time, in the case of a single layer, a single dope is solely cast and in the case of multiple layers, a high-concentration cellulose ester dope and low-concentration dopes in both sides thereof are co-cast. The dope is dried on the support to some extent, the film thus imparted with rigidity is peeled from the support, and the film is passed through a drying zone by various transportation devices to remove the solvent.

A representative example of the solvent for dissolving the triacetyl cellulose is dichloromethane. However, in view of the global environment or working environment, the solvent preferably contains substantially no halogenated hydrocarbon such as dichloromethane. The term "contain substantially no halogenated hydrocarbon" as used herein means that the percentage of halogenated hydrocarbon in the organic solvent is less than 5 weight % (preferably less than 2 weight %).

In the case of preparing a triacetyl cellulose dope by using a solvent containing substantially no dichloromethane or the like, a special dissolution method described below is necessary.

A first dissolution method called a cooling dissolution method is described below. In a solvent, triacetyl cellulose is gradually added with stirring at a temperature in the vicinity of room temperature (−10 to 40° C.). Thereafter, the mixture is cooled to −100 to −10° C. (preferably from −80 to −10° C., more preferably from −50 to −20° C., most preferably from −50 to −30° C.). The cooling may be performed in a dry ice-methanol bath (−75° C.) or in a cooled diethylene glycol solution (−30 to −20° C.). As a result of cooling, the mixture of triacetyl cellulose and solvent is solidified. This is then heated to 0 to 200° C. (preferably from 0 to 150° C., more preferably from 0 to 120° C., most preferably from 0 to 50° C.) to provide a solution where triacetyl cellulose flows in the solvent. The temperature may be elevated by allowing the solidified mixture to stand at room temperature or may be elevated in a warm bath.

A second method called high-temperature dissolution method is described below. In a solvent, triacetyl cellulose is gradually added with stirring at a temperature in the vicinity of room temperature (−10 to 40° C.). In the triacetyl cellulose solution for use in the present invention, triacetyl cellulose is preferably swelled in advance by adding it to a mixed solvent containing various solvents. In this method, the triacetyl cellulose is preferably dissolved to a concentration of 30 weight % or less, but in view of the drying efficiency at the film formation, the concentration is preferably higher. Thereafter, the mixed solution of organic solvents is heated to 70 to 240° C. (preferably from 80 to 220° C., more preferably from 100 to 200° C., most preferably from 100 to 190° C.) under a pressure of 0.2 to 30 MPa. This heated solution cannot be coated as it is and must be cooled to a temperature lower than the lowest boiling point of the solvents used. In this case, the solution is generally cooled to −10 to 50° C. and returned to an atmospheric pressure. The cooling may be performed only by allowing the high-pressure high-temperature container or line housing the triacetyl cellulose solution to stand at room temperature or preferably, the apparatus may be cooled by using a cooling medium such as cooling water. The cellulose acetate film containing substantially no halogenated hydrocarbon such as dichloromethane and the production method thereof are described in JIII Journal of Technical Disclosure (No. 2001-1745, issued on Mar. 15, 2001, hereinafter simply referred to as "Kokai Giho 2001-1745").

In the case of using the antireflection film of the present invention for a liquid display device, the antireflection film is disposed on the outermost surface of a display, for example, by providing an adhesive layer on one surface. When the transparent support is triacetyl cellulose, since triacetyl cellulose is used as a protective film for protecting the polarizing layer of a polarizing plate, it is preferred in view of the cost to use the antireflection film of the present invention as it is for the protective film.

In the case where the antireflection film of the present invention is disposed on the outermost surface of a display by providing an adhesive layer on one surface or used as it is for the protective film of a polarizing plate, after forming an outermost layer mainly comprising a fluorine-containing polymer on a transparent support, a saponification treatment is preferably performed so as to ensure satisfactory adhesion. The saponification treatment is performed by a known method, for example, by dipping the film in an alkali solution for an appropriate time. After the dipping in an alkali solution, the film is preferably washed thoroughly with water or dipped in a dilute acid to neutralize the alkali component so as to prevent the alkali component from remaining in the film.

By the saponification treatment, the surface of the transparent support in the side opposite the surface having the outermost layer is hydrophilized.

The hydrophilized surface is effective particularly for improving the adhesive property to a deflecting film mainly comprising polyvinyl alcohol. Furthermore, the hydrophilized surface is hardly attached with dusts in air and on bonding with a deflecting film, dusts scarcely intrude into the space between the deflecting film and the antireflection film, so that dot defects due to dusts can be effectively prevented.

The saponification treatment is preferably performed such that the surface of the transparent support in the side opposite the surface having the outermost layer has a contact angle to water of 408 or less, preferably 300 or less, more preferably 20° or less.

The specific method for the alkali saponification treatment can be selected from the following two methods (1) and (2). The method (1) is advantageous in that the treatment can be performed by the same step as that for general-purpose tri-acetyl cellulose film, but since the antireflection film surface is also saponified, the surface may be alkali-hydrolyzed to deteriorate the film or if the solution for saponification treatment remains, this causes a problem of soiling. If the case is so, the method (2) is advantageous, though a special step for the treatment is necessary.

(1) After the formation of an antireflection layer on a transparent support, the film is dipped at least once in an alkali solution, whereby the back surface of the film is saponified.

(2) Before or after the formation of an antireflective layer on a transparent support, an alkali solution is coated on the surface in the side opposite the surface where the antireflection film is formed, and then the film is heated and washed with water and/or neutralized, whereby only the back surface of the film is saponified.

The antireflection film of the present invention can be formed by the following method, but the present invention is not limited to this method.

A coating solution containing components for forming each layer is prepared. The coating solution for forming a hard coat layer is coated on a transparent support by a dip coating method, an air knife coating method, a curtain coating method, a roller coating method, a wire bar coating method, a gravure coating method or an extrusion coating method (see, U.S. Pat. No. 2,681,294), and then heated and dried. Among these coating methods, a microgravure coating method is preferred. The formed coating is cured by polymerizing the monomer for forming an antiglare hard coat layer under irradiation of light or under heating, whereby a hard coat layer is formed.

If desired, the hard coat layer may be composed of multiple layers and in this case, a smooth hard coat layer may be coated and cured in the same manner before the coating of the antiglare hard coat layer.

Thereafter, the coating solution for forming a low refractive index layer is coated on the hard coat layer in the same manner and irradiated with light or heated to form a low refractive index layer. In this way, the antireflection film of the present invention is obtained.

The microgravure coating method for use in the present invention is a coating method characterized in that a gravure roll having a diameter of about 10 to 100 mm, preferably from about 20 to 50 mm, and having a gravure pattern engraved on the entire circumference is rotated below the support in the direction reverse to the transportation direction of the support and at the same time, an extra coating solution is scraped off from the surface of the gravure roll by a doctor blade, whereby a constant amount of the coating solution is transferred to and coated on the downside surface of the support while leaving the upside surface of the support in a free state. A roll-form transparent support is continuously unrolled and on one surface of the unrolled support, at least one layer of the hard coat layer and the low refractive index layer containing a fluorine-containing polymer can be coated by the microgravure coating method.

With respect to the conditions for the coating by the microgravure coating method, the number of lines in the gravure pattern engraved on the gravure roll is preferably from 50 to 800 lines/inch, more preferably from 100 to 300 lines/inch, the depth of the gravure pattern is preferably from 1 to 600 μm, more preferably from 5 to 200 μm, the rotation number of the gravure roll is preferably from 3 to 800 rpm, more preferably from 5 to 200 rpm, and the support transportation speed is preferably from 0.5 to 100 m/min, more preferably from 1 to 50 m/min.

The haze value of the thus-formed antireflection film of the present invention is from 3 to 70%, preferably from 4 to 60%, and the average reflectance at 450 to 650 nm is 3.0% or less, preferably 2.5% or less.

The antireflection film of the present invention has a haze value and an average reflectance within the above-described respective ranges, whereby good antiglare and antireflection property can be obtained without incurring deterioration of the transmitted image.

The polarizing plate is mainly constituted by a polarizing film and two protective films sandwiching the polarizing film from both sides. The antireflection film of the present invention is preferably used for at least one sheet of those two protective films sandwiching the polarizing film from both sides. When the antireflection film of the present invention serves concurrently as a protective film, the production cost of the polarizing plate can be reduced. Also, when the antireflection film of the present invention is used as the outermost layer, a polarizing plate prevented from reflection of external light or the like and excellent in the scratch resistance, antifouling property and the like can be produced.

As the polarizing film, a known polarizing film or a polarizing film cut out from a lengthy polarizing film with the absorption axis of the polarizing film being neither parallel nor perpendicular to the longitudinal direction may be used. The lengthy polarizing film with the absorption axis of the polarizing film being neither parallel nor perpendicular to the longitudinal direction is produced by the following method.

That is, the polarizing film is obtained by stretching a continuously fed polymer film under application of tension while holding both edges of the film with holding means and this film can be produced by a stretching method where the stretching at least in the film cross direction is from 1.1 to 20.0 times, the difference in the travelling speed of the holding device in the longitudinal direction between both edges of the film is 3% or less and in the state of both edges of the film being held, the film travelling direction is bent such that the angle made by the film travelling direction at the outlet in the step of holding both edges of the film and the substantial stretching direction of the film is tilted at 20 to 70°. Particularly, a stretching method of giving a tilt angle of 45° is preferred in view of productivity.

The stretching method of the polymer film is described in detail in JP-A-2002-86554, paragraphs 0020 to 0030.

Out of two protective films of the polarizer, the film other than the antireflection film is preferably an optical compensatory film having an optical compensation layer comprising an optically anisotropic layer. The optical compensatory film (retardation film) can improve the view angle properties of a liquid crystal display screen.

The optical compensatory film may be a known optical compensatory film but from the standpoint of enlarging the view angle, an optical compensatory film described in JP-A-2001-100042 is preferred, where an optical compensation layer comprising a compound having a discotic structure unit is provided and the angle made by the discotic compound and the support is changing in the dept direction of the layer.

This angle is preferably increasing as the distance from the support plane side of the optically anisotropic layer increases.

The antireflection film of the present invention can be applied to image display devices such as liquid crystal display device (LCD), plasma display panel (PDP), electroluminescence display (ELD) and cathode ray tube display device (CRT). Since the antireflection film of the present invention has a transparent support, this film is used by bonding the transparent support side to the image display surface of an image display device.

In the case of using the antireflection film of the present invention as one surface protective film of a polarizing film, the antireflection film can be preferably used for a transmissive, reflective or transflective liquid crystal display device in a mode such as twisted nematic (TN) mode, super twisted nematic (STN) mode, vertical alignment (VA) mode, in-plane switching (IPS) mode or optically compensated bend cell (OCB) mode.

The VA-mode liquid crystal cell includes (1) a VA-mode liquid crystal cell in the narrow sense where rod-like liquid crystalline molecules are substantially vertically aligned when no voltage is applied but the molecules are substantially horizontally aligned when a voltage is applied (see, JP-A-2-176625), (2) a multi-domain VA-mode (MVA-mode) liquid crystal cell for the enlargement of view angle (see, SID97, Digest of Tech. Papers (preparatory paper), 28, 845 (1997)), (3) a liquid crystal cell in a mode (n-ASM mode) where rod-like liquid crystalline molecules are substantially vertically aligned when no voltage is applied but the molecules are aligned in a twisted multi-domain manner when a voltage is applied (see, Nippon Ekisho Toron Kai (Japan Liquid Crystal Workshop) (preparatory paper), 58-59 (1998)) and (4) a SURVIVAL-mode liquid crystal cell (announced in LCD International 98).

The OCB-mode liquid crystal cell is a liquid crystal display device using a liquid crystal cell in a bend alignment mode where rod-like liquid crystalline molecules are aligned substantially in the reverse directions (symmetrically) between the upper and lower parts of the liquid crystal cell, and this is disclosed in U.S. Pat. Nos. 4,583,825 and 5,410,422. Since rod-like liquid crystalline molecules are symmetrically aligned in the upper and lower parts of the liquid crystal cell, this bend alignment-mode liquid crystal cell has a function of self-optical compensation. Therefore, this liquid crystal mode is also called an OCB (optically compensatory bend) liquid crystal mode. The bend alignment-mode liquid crystal display device is advantageous in that the response speed is fast.

In the ECB-mode liquid crystal cell, rod-like liquid crystalline molecules are substantially horizontally aligned when no voltage is applied. This is most often used as a color TFT liquid crystal display device and is described in a large number of publications such as EL, PDP, LCD Display, Toray Research Center (2001).

Particularly, in the case of a TN-mode or IPS-mode liquid crystal display device, when out of front and back two protective films of a polarizer, an optical compensatory film having an effect of enlarging the view angle is used for the surface opposite the antireflection film of the present invention as described in JP-A-2001-100043, a polarizing plate having an antireflection effect and a view angle enlarging effect with a thickness of one polarizing plate can be obtained and this is preferred.

EXAMPLES

The present invention is described in greater detail below by referring to Examples, but the present invention is limited thereto. Unless otherwise indicated, the "parts" and "%" are on the weight basis.

(Synthesis of Perfluoroolefin Copolymer (1))

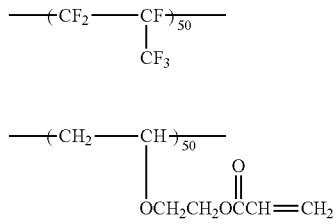

Perfluoroolefin Copolymer (1)

(50:50 denotes the molar ratio)

Into a stainless steel-made autoclave having an inner volume of 100 ml and equipped with a stirrer, 40 ml of ethyl acetate, 14.7 g of hydroxyethyl vinyl ether and 0.55 g of dilauroyl peroxide were charged. The inside of the system was degassed and purged with nitrogen gas. Thereafter, 25 g of hexafluoropropylene (HFP) was further introduced into the autoclave and the temperature was elevated to 65° C. The pressure when the temperature inside the autoclave reached 65° C. was 5.4 kg/cm². The reaction was continued for 8 hours while keeping that temperature and when the pressure reached 3.2 kg/cm², the heating was stopped and the system was allowed to cool. When the inner temperature was dropped to room temperature, unreacted monomer was expelled and after opening the autoclave, the reaction solution was taken out. The obtained reaction solution was charged into largely excess hexane, the solvent was removed by decantation and the polymer precipitated was taken out. This polymer was dissolved in a slight amount of ethyl acetate and by performing reprecipitation twice from hexane, the residual monomer was completely removed. After the drying, 28 g of polymer was obtained. Thereafter, 20 g of the obtained polymer was dissolved in 100 ml of N,N-dimethylacetamide and after 11.4 g of acrylic acid chloride was added dropwise under ice cooling, the resulting solution was stirred at room temperature for 10 hours. After adding ethyl acetate, the reaction solution was washed with water and the organic layer was extracted and then concentrated. The obtained polymer was reprecipitated with hexane to obtain 19 g of Perfluoroolefin Copolymer (1). The refractive index of the obtained polymer was 1.421.

(Preparation of Fluororesin-Containing Polymer (FP-8))

In a reactor equipped with a stirrer and a reflux condenser, 39.93 g of 1H,1H,7H-dodecafluoroheptyl acrylate, 1.1 g of dimethyl 2,2'-azobisisobutyrate and 30 g of 2-butanone were added and heated at 78° C. for 6 hours in a nitrogen atmosphere to complete the reaction, The weight average molecular weight was $2.9 \times 10^4$.

(Preparation of Sol Solution a)

In a reactor equipped with a stirrer and a reflux condenser, 120 parts of methyl ethyl ketone, 100 parts of acryloyloxypropyltrimethoxysilane (KBM5103, produced by Shin-Etsu Chemical Co., Ltd.) and 3 parts of diisopropoxyaluminum ethylacetate were added and mixed. Thereto, 30 parts of ion exchanged water was added and the resulting mixture was reacted at 60° C. for 4 hours and then cooled to room temperature to obtain Sol Solution a. The weight average molecular weight was 1,600 and a component having a molecular weight of 1,000 to 20,000 was occupying 100% in the oligomer or greater components. Also, the analysis by gas chromatography revealed that the raw material acryloyloxypropyltrimethoxysilane was not remaining at all.

(Preparation of Sol Solution b)

Sol Solution b was obtained in the same manner as Sol Composition a except that 6 parts of acetylacetone was added after the reaction and cooling to room temperature.

(Preparation of Coating Solutions A and A-1 to A-5 for Antiglare Hard Coat Layer)

A dipentaerythritol triacrylate and pentaerythritol tetraacrylate mixture (PETA, produced by Nippon Kayaku Co., Ltd.) (50 g) was diluted with 38.5 g of toluene. Thereto, 2 g of a polymerization initiator (Irgacure 184, produced by Ciba Specialty Chemicals) was added and mixed with stirring. The resulting solution was coated and UV-cured and the obtained coating film had a refractive index of 1.51.

To this solution, 1.7 g of a 30% toluene dispersion obtained by dispersing polystyrene particles having an average particle size of 3.5 μm (SXS-350H, produced by Soken Kagaku K.K., refractive index: 1.60) in a polytron disperser at 10,000 rpm for 20 minutes and 13.3 g of a 30% toluene dispersion of acryl-styrene particles having an average particle size of 3.5 μm (produced by Soken Kagaku K.K., refractive index: 1.55) were added. Finally, 0.75 g of Fluorine-Base Polymer (FP-8) shown in Table 1 and 10 g of a silane coupling agent (KBM-5103, produced by Shin-Etsu Chemical Co., Ltd.) were added, thereby completing the solution.

The resulting mixed solution was filtered through a polypropylene-made filter having a pore size of 30 μm to prepare Coating Solution A for Antiglare Hard Coat Layer.

Coating Solutions A-1 to A-4 for Antiglare Hard Coat Layer were prepared in the same manner except for changing the fluorine-base polymer as shown in Table 1. In Coating Solution A-1, a fluorine-base polymer was not added.

(Preparation of Coating Solutions B and B-1 to B-5 for Light-Diffusing Layer)

A commercially available zirconia-containing UV-curable hard coat solution (DESOLITE Z7404, produced by JSR, solid concentration: about 61%, $ZrO_2$ content in solid contents: about 70%, containing a polymerizable monomer and a polymerization initiator) (285 g) and 85 g of a dipentaerythritol pentaacrylate and dipentaerythritol hexaacrylate mixture (DPHA, produced by Nippon Kayaku Co., Ltd.) were mixed and the resulting mixture was diluted with 60 g of methyl isobutyl ketone and 17 g of methyl ethyl ketone. Thereto, 28 g of a silane coupling agent (KBM-5103, produced by Shin-Etsu Chemical Co., Ltd.) was added and mixed with stirring. The resulting solution was coated and UV-cured and the obtained coating film had a refractive index of 1.61.

To this solution, 35 g of a dispersion obtained by dispersing a 30% methyl isobutyl ketone dispersion of reinforced and crosslinked PMMA particles classified to an average particle size of 3.0 μm (MXS-300, produced by. Soken Kagaku K.K., refractive index: 1.49) in a polytron disperser at 10,000 rpm for 20 minutes was added. Subsequently, 90 g of a dispersion obtained by dispersing a 30% methyl ethyl ketone dispersion of silica particles having an average particle size of 1.5 μm (SEAHOSTA KE-P150, produced by Nippon Shokubai Co., Ltd., refractive index: 1.46) in a polytron disperser at 10,000 rpm for 30 minutes was added and finally, 0.12 g of Fluorine-Base Polymer (FP-8) was mixed and stirred, thereby completing the solution.

The resulting mixed solution was filtered through a polypropylene-made filter having a pore size of 30 μm to prepare Coating Solution B for Light-Diffusing Layer.

Coating Solutions B-1 to B-4 for Light-Diffusing Layer were prepared in the same manner except for changing the fluorine-base polymer as shown in Table 2. In Coating Solution B-1, a fluorine-base polymer was not added.

(Preparation of Coating Solutions C and C-1 to C-5 for Light-Diffusing Layer)

Coating Solution C for Light-Diffusing Layer was prepared in the same manner as Coating Solution B including amounts added except that 130 g of a 30% methyl ethyl ketone dispersion of reinforced and highly crosslinked PMMA particles (MXS-150H, crosslinking agent: ethylene glycol dimethacrylate, amount of crosslinking agent: 30%, produced by Soken Kagaku K.K., refractive index: 1.49) classified to an average particle size of 1.5 μm was used in place of the silica particles having an average particle size of 1.5 μm in Coating Solution B for Light-Diffusing Layer.

Coating Solutions C-1 to C-4 for Light-Diffusing Layer were prepared in the same manner except for changing the fluorine-base polymer as shown in Table 3. In Coating Solution C-1, a fluorine-base polymer was not added.

(Preparation of Coating Solution A for Low Refractive Index Layer)

A heat-crosslinkable fluorine-containing polymer (13 g) having a refractive index of 1.42 (JN-7228, solid concentration: 6%, produced by JSR), 1.3 g of a colloidal silica dispersion (silica, a product differing in the particle size from MEK-ST, average particle size: 45 nm, solid concentration: 30%, produced by Nissan Chemicals Industries, Ltd.), 0.6 g of Sol Solution a, 5 g of methyl ethyl ketone and 0.6 g of cyclohexanone were added and stirred. The resulting solution was filtered through a polypropylene-made filter having a pore size of 1 μm to prepare Coating Solution A for Low Refractive Index Layer.

(Preparation of Coating Solution B for Low Refractive Index Layer)

Coating Solution B for Low Refractive Index Layer was prepared in the same manner as Coating Solution A including amounts added except that 1.95 g of a hollow silica dispersion (refractive index: 1.31, average particle size: 60 nm, solid concentration: 20%) was used in place of the colloidal silica dispersion in the preparation of Coating Solution A for Low Refractive Index Layer.

(Preparation of Coating Solution C for Low Refractive Index Layer)

A heat-crosslinkable fluorine-containing polymer (15 g) having a refractive index of 1.42 (JN-7228, solid concentration: 6%, produced by JSR), 0.6 g of a colloidal silica dispersion (silica, MEK-ST, average particle size: 15 nm, solid concentration: 30%, produced by Nissan Chemicals Industries, Ltd.), 0.8 g of a colloidal silica dispersion (silica, a product differing in the particle size from MEK-ST, average particle size: 45 nm, solid concentration: 30%, produced by Nissan Chemicals Industries, Ltd.), 0.4 g of Sol Solution a, 3 g of methyl ethyl ketone and 0.6 g of cyclohexanone were added and stirred. The resulting solution was filtered through a polypropylene-made filter having a pore size of 1 μm to prepare Coating Solution C for Low Refractive Index Layer.

(Preparation of Coating Solution D for Low Refractive Index Layer)

Perfluoroolefin Copolymer (1) (1.5.2 g), 1.4 g of a colloidal silica dispersion (silica, a product differing in the particle size from MEK-ST, average particle size: 45 nm, solid concentration: 30%, produced by Nissan Chemicals Industries, Ltd.), 0.3 g of reactive silicone X-22-164B (trade name, produced by Shin-Etsu Chemical Co., Ltd.), 7.3 g of Sol Solution a, 0.76 g of a photopolymerization initiator (Irgacure 907 (trade name), produced by Ciba Geigy), 301 g of methyl isobutyl ketone and 9.0 g of cyclohexanone were added and stirred. The resulting solution was filtered through a polypropylene-made filter having a pore size of 5 μm to prepare Coating Solution D for Low Refractive Index Layer.

(Preparation of Coating Solution E for Low Refractive Index Layer)

Coating Solution E for Low Refractive Index Layer was prepared in the same manner as Coating Solution D including amounts added except that 1.95 g of a hollow silica dispersion (refractive index: 1.31, average particle size: 60 nm, solid concentration: 20%) was used in place of the colloidal silica dispersion in the preparation of Coating Solution D for Low Refractive Index Layer.

Example 1

Preparation and Evaluation of Antireflection Film, Samples 1 to 36 of the Invention and Comparative Samples 1 to 12

(1) Coating of Functional Layer

A 80 μm-thick triacetyl cellulose film (TAC-TD80U, produced by Fuji Photo Film Co., Ltd.) in a roll form was unrolled and thereon, a coating solution for the functional layer (antiglare hard coat layer or light-diffusing layer) shown in Tables 1 to 3 was coated by using a doctor blade and a microgravure roll having a diameter of 50 mm and having a gravure pattern with a line number of 135 lines/inch and a depth of 60 μm, at a gravure roll rotation number of 30 rpm and a transportation speed of 30 m/min. Thereafter, the coating solution was dried at 60° C. for 150 seconds and then an ultraviolet ray was irradiated thereon at an illuminance of 400 mW/cm$^2$ and an irradiation dose of 250 mJ/cm$^2$ by using an air cooled metal halide lamp of 160 W/cm (manufactured by Eye Graphics Co., Ltd.) under nitrogen purging to cure the coating layer and thereby form a functional layer of antiglare hard coat layer (thickness: 6 μm) or light-diffusing layer (thickness: 3.4 μm). Then, the film was taken up.

(2) Coating of Low Refractive Index Layer

The triacetyl cellulose film having coated thereon a functional layer was again unrolled and a coating solution for low refractive index layer shown in Tables 1 to 3 was coated thereon by using a doctor blade and a microgravure roll having a diameter of 50 mm and having a gravure pattern with a line number of 200 lines/inch and a depth of 30 μm, at a gravure roll rotation number of 30 rpm and a transportation speed of 15 m/min. Thereafter, the coating solution was dried at 120° C. for 150 seconds and further dried at 140° C. for 8 minutes, and then an ultraviolet ray was irradiated thereon at an illuminance of 400 mW/cm$^2$ and an irradiation dose of 900 mJ/cm$^2$ by using an air cooled metal halide lamp of 240 W/cm (manufactured by Eye Graphics Co., Ltd.) under nitrogen purging to form a low refractive index layer having a thickness of 100 nm, thereby producing an antireflection film. Then, the film was taken up.

(Saponification Treatment of Antireflection Film)

The antireflection film was subjected to the following treatment.

An aqueous sodium hydroxide solution (1.5 mol/liter) was prepared and kept at 50° C. Furthermore, an aqueous dilute sulfuric acid solution (0.01 mol/liter) was prepared and kept at 35° C. The antireflection film produced was dipped in the aqueous sodium hydroxide solution prepared above for 2 minutes and then dipped in water to thoroughly wash out the aqueous sodium hydroxide solution. Subsequently, the film was dipped in the aqueous dilute sulfuric acid solution prepared above for 1 minute and then dipped in water to thoroughly wash out the aqueous dilute sulfuric acid solution. Finally, the sample was thoroughly dried at 120° C.

In this way, a saponified antireflection film (Samples 1 to 36 of the Invention, Comparative Samples 1 to 12) was produced.

(Evaluation of Antireflection Film)

These antireflection film samples obtained were evaluated on the following items. The results are shown in Tables 1 to 3.

(1) Average Reflectance

The spectral reflectance at an incident angle of 50 in the wavelength region of 380 to 780 nm was measured by using a spectrophotometer (manufactured by JASCO Corporation). The integrating sphere average reflectance at 450 to 650 nm was used for the result.

(2) Evaluation of Scratch Resistance with Steel Wool

A rubbing test was performed by using a rubbing tester under the following conditions.

Evaluation environment conditions: 25° C., 60% RH Rubbing material:

A steel wool (grade No. 0000, produced by Nippon Steel Wool K.K.) was wound around the rubbing tip (1 cm×1 cm) of the tester, which comes into contact with the sample, and fixed with a band to hold it there.

Moving distance (one way): 13 cm

Rubbing speed: 13 cm/sec

Load: 500 g/cm$^2$

Tip contact area: 1 cm×1 cm

Rubbing number: 10 reciprocations

An oily black ink was coated on the back side of the rubbed sample and the reflected light was observed with an eye. The scratch in the rubbed portion was evaluated according to the following criteria.

⊚: Scratch was not found at all even when very carefully observed.

◯: Faint scratch was slightly found when very carefully observed.

◯Δ: Faint scratch was found.

Δ: Scratch in the middle level was found.

ΔX-X: Scratch was found at a glance.

(3) Evaluation of Scratch Resistance with Water-Wetted Cotton Swab

A cotton swab was fixed to the rubbing tip of a rubbing tester, the sample was fixed with clips at upper and lower sides in a smooth dish, and the rubbing test was performed at room temperature of 25° C. by dipping the sample and the cotton swab in water at 25° C. and applying a load of 500 g to the cotton swab. The rubbing test was performed by changing the rubbing number under the following conditions.

Rubbing distance (one way): 1 cm
Rubbing speed: about 2 reciprocations/sec

The rubbed sample was observed and the rubbing resistance was evaluated as follows by the number of reciprocations of causing film separation.

X: Film was separated in 0 to 10 reciprocations.
XΔ: Film was separated in 10 to 30 reciprocations.
Δ: Film was separated in 30 to 50 reciprocations.
◯Δ: Film was separated in 50 to 100 reciprocations.
◯: Film was separated in 100 to 150 reciprocations.
◉: Film was not separated even by rubbing in 150 reciprocations.

(4) Surface Tension

When the fluoroaliphatic group-containing copolymer of the present invention is localized on the surface of a coating solution for a functional layer, the surface tension of the coating solution decreases. Therefore, the surface tension of the coating solution for forming a functional layer was measured in an environment at a temperature of 25° C. by using a surface tensiometer (KYOWA CBVP SURFACE TENSIOMETER A3, manufactured by Kyowa Interface Science Co., Ltd.).

(5) Surface Free Energy

When the fluoroaliphatic group-containing copolymer of the present invention is localized on the surface of a functional layer, the surface free energy on the functional layer surface changes. Therefore, after the antireflection film was subjected to humidity conditioning for 2 hours at a temperature of 25° C. and a humidity of 60% RH, the contact angle to water and to methylene iodide was measured and from the obtained values, the surface free energy was calculated.

Also, for examining the behavior when the low refractive index layer is coated on the functional layer surface, only the solvent (a mixed solvent of methyl ethyl ketone and cyclohexanone) of the coating solution for forming the low refractive index layer was spread on the functional layer face of an obliquely inclined optical functional film and dried. Then, the same measurement was performed and the surface free energy was calculated. The results are shown in Tables 1 to 5 as the surface energy after coating.

(6) Surface State Uniformity

A fluorescent lamp was irradiated from the back face side with the coated face upside and the generation frequency of dot defects such as shedding and particle, and surface state unevenness such as coating unevenness and drying unevenness, in 10 m$^2$ of the transmission plane was examined with an eye. The obtained value was divided by 10 to calculate the number of occurrences of surface state unevenness per m$^2$ and the surface state uniformity was evaluated by the number calculated.

X: more than 10 occurrences/m$^2$
XΔ: from 1 to 10 occurrences/m$^2$
Δ: from 1 to 5 occurrences/m$^2$
◯Δ: from 0.5 to 1 occurrences/m$^2$
◯: less than 0.5 occurrences/m$^2$

TABLE 1

| | Antiglare Hard Coat Layer Coating Solution | Fluoro-aliphatic Group-Containing Copolymer | Low Refractive Index Layer Coating Solution | Surface Tension (mN/m) Before Addition | Surface Tension (mN/m) After Addition | Surface Free Energy Before Coating | Surface Free Energy After Coating | Reflectance Integrating Sphere (%) | Scratch Resistance Steel Wool | Scratch Resistance Water-Wetted Cotton Swab | Surface State Uniformity |
|---|---|---|---|---|---|---|---|---|---|---|---|
| Comparative Sample 1 | A-1 | not added | A | 35 | — | 40 | 40 | 2.6 | ◉ | ◯ | X |
| Sample 1 of Invention | A | FP-8 | A | 35 | 32 | 35 | 40 | 2.65 | ◯ | ◯ | ◯ |
| Sample 2 of Invention | A-2 | FP-13 | A | 35 | 30 | 33 | 38 | 2.65 | ◯ | ◯ | ◯ |
| Sample 3 of Invention | A-3 | F-132 | A | 35 | 28 | 31 | 33 | 2.7 | ◯Δ | ◯ | ◯ |
| Sample 4 of Invention | A | FP-8 | B | 35 | 32 | 35 | 40 | 2.2 | ◯Δ | ◯ | ◯ |
| Sample 5 of Invention | A-2 | FP-13 | B | 35 | 30 | 33 | 38 | 2.2 | ◯Δ | ◯ | ◯ |
| Sample 6 of Invention | A-3 | FP-132 | B | 35 | 28 | 31 | 33 | 2.3 | ◯Δ | ◯ | ◯ |
| Comparative Sample 2 | A-4 | R-1 | A | 35 | 25 | 31 | 31 | 2.9 | X | ◯ | ◯ |
| Comparative Sample 3 | A-1 | not added | D | 35 | — | 40 | 40 | 2.7 | ◉ | ◯ | X |
| Sample 7 of Invention | A | FP-8 | D | 35 | 32 | 35 | 40 | 2.75 | ◉ | ◯ | ◯ |
| Sample 8 of Invention | A-2 | FP-13 | D | 35 | 30 | 33 | 38 | 2.75 | ◉ | ◯ | ◯ |
| Sample 9 of Invention | A-3 | FP-132 | D | 35 | 28 | 31 | 33 | 2.8 | ◯ | ◯ | ◯ |
| Sample 10 of Invention | A | FP-8 | E | 35 | 32 | 35 | 40 | 2.3 | ◯ | ◯ | ◯ |
| Sample 11 of Invention | A-2 | FP-13 | E | 35 | 30 | 33 | 38 | 2.3 | ◯ | ◯ | ◯ |
| Sample 12 of Invention | A-3 | FP-132 | E | 35 | 28 | 31 | 33 | 2.4 | ◯Δ | ◯ | ◯ |

TABLE 1-continued

| | Antiglare Hard Coat Layer Coating Solution | Fluoro-aliphatic Group-Containing Copolymer | Low Refractive Index Layer Coating Solution | Surface Tension (mN/m) Before Addition | Surface Tension (mN/m) After Addition | Surface Free Energy Before Coating | Surface Free Energy After Coating | Reflectance Integrating Sphere (%) | Scratch Resistance Steel Wool | Scratch Resistance Cotton Swab | Surface State Uniformity |
|---|---|---|---|---|---|---|---|---|---|---|---|
| Comparative Sample 4 | A-4 | R-1 | D | 35 | 25 | 31 | 31 | 3.0 | X | ○ | ○ |

TABLE 2

| | Light-Diffusing Layer Coating Solution | Fluoro-aliphatic Group-Containing Copolymer | Low Refractive Index Layer Coating Solution | Surface Tension (mN/m) Before Addition | Surface Tension (mN/m) After Addition | Surface Free Energy Before Coating | Surface Free Energy After Coating | Reflectance Integrating Sphere (%) | Scratch Resistance Steel Wool | Scratch Resistance Cotton Swab | Surface State Uniformity |
|---|---|---|---|---|---|---|---|---|---|---|---|
| Comparative Sample 5 | B-1 | not added | C | 25 | — | 35 | 35 | 1.9 | ◎ | ○ | X |
| Sample 13 of Invention | B | FP-8 | C | 25 | 24 | 31 | 35 | 1.95 | ○ | ○ | ○ |
| Sample 14 of Invention | B-2 | FP-13 | C | 25 | 23 | 29 | 33 | 1.95 | ○ | ○ | ○ |
| Sample 15 of Invention | B-3 | F-132 | C | 25 | 21 | 29 | 31 | 2.0 | ○Δ | ○ | ○ |
| Sample 16 of Invention | B | FP-8 | B | 25 | 24 | 31 | 36 | 1.5 | ○Δ | ○ | ○ |
| Sample 17 of Invention | B-2 | FP-13 | B | 25 | 23 | 30 | 34 | 1.5 | ○Δ | ○ | ○ |
| Sample 18 of Invention | B-3 | FP-132 | B | 25 | 21 | 30 | 31 | 1.6 | ○Δ | ○ | ○ |
| Comparative Sample 6 | B-4 | R-1 | C | 25 | 20 | 28 | 28 | 2.2 | X | ○ | ○ |
| Comparative Sample 7 | B-1 | not added | D | 25 | — | 35 | 35 | 2.0 | ◎ | ○ | X |
| Sample 19 of Invention | B | FP-8 | D | 25 | 24 | 31 | 35 | 2.05 | ◎ | ○ | ○ |
| Sample 20 of Invention | B-2 | FP-13 | D | 25 | 23 | 29 | 33 | 2.05 | ◎ | ○ | ○ |
| Sample 21 of Invention | B-3 | FP-132 | D | 25 | 21 | 29 | 31 | 2.1 | ○ | ○ | ○ |
| Sample 22 of Invention | B | FP-8 | E | 25 | 24 | 31 | 36 | 1.6 | ○ | ○ | ○ |
| Sample 23 of Invention | B-2 | FP-13 | E | 25 | 23 | 30 | 34 | 1.6 | ○ | ○ | ○ |
| Sample 24 of Invention | B-3 | FP-132 | E | 25 | 21 | 30 | 31 | 1.7 | ○Δ | ○ | ○ |
| Comparative Sample 8 | B-4 | R-1 | D | 25 | 20 | 28 | 28 | 2.3 | X | ○ | ○ |

TABLE 3

| | Light-Diffusing Layer Coating Solution | Fluoro-aliphatic Group-Containing Copolymer | Low Refractive Index Layer Coating Solution | Surface Tension (mN/m) Before Addition | Surface Tension (mN/m) After Addition | Surface Free Energy Before Coating | Surface Free Energy After Coating | Reflectance Integrating Sphere (%) | Scratch Resistance Steel Wool | Scratch Resistance Cotton Swab | Surface State Uniformity |
|---|---|---|---|---|---|---|---|---|---|---|---|
| Comparative Sample 9 | C-1 | not added | A | 25 | — | 35 | 35 | 1.9 | ◎ | ○ | X |
| Sample 25 of Invention | C | FP-8 | A | 25 | 24 | 31 | 35 | 1.95 | ○ | ○ | ○ |
| Sample 26 of Invention | C-2 | FP-13 | A | 25 | 23 | 29 | 33 | 1.95 | ○ | ○ | ○ |
| Sample 27 of Invention | C-3 | F-132 | A | 25 | 21 | 29 | 31 | 2.00 | ○Δ | ○ | ○ |

TABLE 3-continued

| | Light-Diffusing Layer Coating Solution | Fluoroaliphatic Group-Containing Copolymer | Low Refractive Index Layer Coating Solution | Surface Tension (mN/m) Before Addition | Surface Tension (mN/m) After Addition | Surface Free Energy Before Coating | Surface Free Energy After Coating | Reflectance Integrating Sphere (%) | Scratch Resistance Steel Wool | Scratch Resistance Cotton Swab | Surface State Uniformity |
|---|---|---|---|---|---|---|---|---|---|---|---|
| Sample 28 of Invention | C | FP-8 | B | 25 | 24 | 31 | 36 | 1.5 | ○△ | ○ | ○ |
| Sample 29 of Invention | C-2 | FP-13 | B | 25 | 23 | 30 | 34 | 1.5 | ○△ | ○ | ○ |
| Sample 30 of Invention | C-3 | FP-132 | B | 25 | 21 | 30 | 31 | 1.6 | ○△ | ○ | ○ |
| Comparative Sample 10 | C-4 | R-1 | A | 25 | 20 | 28 | 28 | 2.2 | X | ○ | ○ |
| Comparative Sample 11 | C-1 | not added | D | 25 | — | 35 | 35 | 2.0 | ◉ | ○ | X |
| Sample 31 of Invention | C | FP-8 | D | 25 | 24 | 31 | 35 | 2.05 | ◉ | ○ | ○ |
| Sample 32 of Invention | C-2 | FP-13 | D | 25 | 23 | 29 | 33 | 2.05 | ◉ | ○ | ○ |
| Sample 33 of Invention | C-3 | FP-132 | D | 25 | 21 | 29 | 31 | 2.1 | ○ | ○ | ○ |
| Sample 34 of Invention | C | FP-8 | E | 25 | 24 | 31 | 36 | 1.6 | ○ | ○ | ○ |
| Sample 35 of Invention | C-2 | FP-13 | E | 25 | 23 | 30 | 34 | 1.6 | ○ | ○ | ○ |
| Sample 36 of Invention | C-3 | FP-132 | E | 25 | 21 | 30 | 31 | 1.7 | ○△ | ○ | ○ |
| Comparative Sample 12 | C-4 | R-1 | D | 25 | 20 | 28 | 28 | 2.2 | X | ○ | ○ |

R-1: Mw=30,000

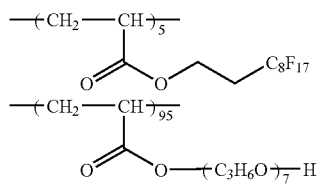

From the results shown in Tables 1 to 3, the followings are clearly seen.

In the case of the antireflection film of the present invention, in samples where a fluoroaliphatic group-containing copolymer is added, the fluoroaliphatic group-containing copolymer is localized on the surface of the coating solution for functional layer and thereby the surface tension decreases, as a result, the surface state uniformity is improved. Furthermore, in samples where the fluoroaliphatic group-containing copolymer is added, the surface free energy of the underlying functional layer (antiglare hard coat layer or light-diffusing layer) is decreased and after coating of the solvent for forming the upper layer, the surface free energy is increased. This reveals that the fluoroaliphatic group-containing copolymer is localized on the underlying functional layer when the underlying functional layer is formed, and the fluoroaliphatic group-containing copolymer diffuses into the upper layer and is not localized on the underlying layer when the upper layer is formed. By virtue of this effect, it is considered that in the optical film of the present invention, the adhesion between the upper layer and the lower layer is enhanced and good scratch resistance is obtained.

According to the present invention, an antireflection film having excellent surface state uniformity and high scratch resistance can be obtained with high productivity.

In Samples 1 to 12 of the present invention, when the 'diluting' solvent used in Coating Solution A for Antiglare Hard Coat Layer was changed from toluene to a solvent composition of toluene/anone=85/15 or toluene/anone=70/30, as the ratio of anone became higher, the interface adhesive strength between support and antiglare hard coat layer was intensified and the scratch resistance performance was enhanced.

Also, in Samples 1 to 12 of the present invention, when Sol Solution b was used in place of Sol Solution a of organosilane used in the coating solution for low refractive index layer, aging stability of the coating solution was improved and suitability for continuous coating was enhanced.

Furthermore, in Samples 1 to 12 of the present invention, when 10 g of a dipentaerythritol pentaacrylate and dipentaerythritol hexaacrylate mixture (DPHA, produced by Nippon Kayaku Co., Ltd.) was added to Coating Solution D for Low Refractive Index Layer and the resulting coating solution was coated in the same manner, the scratch resistance was remarkably enhanced.

In addition, in Samples 1 to 12 of the present invention, when a heat-crosslinkable fluorine-containing polymer having a refractive index of 1.44 (JTA-113, solid concentration: 6%, produced by JSR) was used in place of the heat-crosslinkable fluorine-containing polymer used in the coating solution for low refractive index layer, the scratch resistance was remarkably enhanced.

Example 2

Preparation and Evaluation of Antireflection Film, Samples 101 to 136 of the Invention and Comparative Samples 101 to 112

(Preparation of Coating Solution for Hard Coat Layer)

A methyl ethyl ketone dispersion of silica fine particle (450.0 g) (MEK-ST, solid concentration: 30 weight %, produced by Nissan Chemicals Industries, Ltd.), 15.0 g of methyl ethyl ketone, 220.0 g of cyclohexanone and 16.0 g of a photopolymerization initiator (Irgacure 907, produced by Nippon Ciba Geigy) were added to 315.0 g of a dipentaerythritol pentaacrylate and dipentaerythritol hexaacrylate mixture (DPHA, produced by Nippon Kayaku Co., Ltd.) and stirred. The resulting solution was filtered through a polypropylene-made filter having a pore size of 0.4 μm to prepare a coating solution for hard coat layer.

(Preparation of Titanium Dioxide Fine Particle Dispersion)

The titanium dioxide fine particle used was a titanium dioxide fine particle (MPT-129, produced by Ishihara Sangyo Kaisha, Ltd.) containing cobalt and surface-treated by using aluminum hydroxide and zirconium hydroxide.

A dispersant shown below (38.6 g) and 704.3 g of cyclohexanone were added to 257.1 g of the particle obtained above and dispersed by a Dyno-mill to prepare a titanium dioxide dispersion having a weight average size of 70 nm. Dispersant:

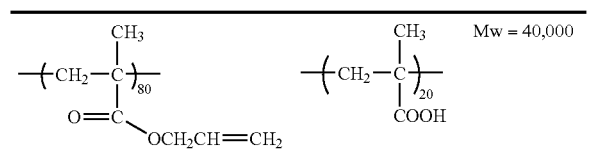

(Preparation of Coating Solutions E and E-1 to E-4 for Medium Refractive Index Layer)

A dipentaerythritol pentaacrylate and dipentaerythritol hexaacrylate mixture (58.4 g) (DPHA), 3.1 g of a photopolymerization initiator (Irgacure 907), 1.1 g of a photosensitizer (KAYACURE DETX, produced by Nippon Kayaku Co., Ltd.), 482.4 g of methyl ethyl ketone and 1,869.8 g of cyclohexanone were added to 88.9 g of the titanium dioxide dispersion prepared above and stirred and finally, a fluorine-base polymer (FP-8, FP-13, FP-132, R-1) shown in Table 4 was added (however, when shown as "not added", the polymer was not added). After thorough stirring, the resulting solution was filtered through a polypropylene-made filter having a pore size of 0.4 μm to prepare Coating Solutions E and E-1 to E-4 for Medium Refractive Index Layer.

(Preparation of Coating Solutions F and F-1 to F-3 for High Refractive Index Layer)

A dipentaerythritol pentaacrylate and dipentaerythritol hexaacrylate mixture (47.9 g) (DPHA, produced by Nippon Kayaku Co., Ltd.), 4.0 g of a photopolymerization initiator (Irgacure 907, produced by Nippon Ciba Geigy), 1.3 g of a photosensitizer (KAYACURE DETX, produced by Nippon Kayaku Co., Ltd.), 455.8 g of methyl ethyl ketone and 1,427.8 g of cyclohexanone were added to 586.8 g of the titanium dioxide dispersion prepared above and stirred and finally, 0.5 g of a fluorine-base polymer (FP-8, FP-13, FP-132, R-1) was added (however, when shown as "not added", the polymer was not added). After thorough stirring, the resulting solution was filtered through a polypropylene-made filter having a pore size of 0.4 pun to prepare a Coating Solutions F and F-1 to F-4 for High Refractive Index Layer.

(Preparation of Coating Solution F for Low Refractive Index Layer)

A heat-crosslinkable fluorine-containing polymer (9 g) having a refractive index of 1.42 (a product differing in the solvent from JN-7228 [product using methyl isobutyl ketone], solid concentration: 10%, produced by JSR), 1.4 g of a colloidal silica dispersion (silica, a product differing in the particle size from MEK-ST, average particle size: 45 nm, solid concentration: 30%, produced by Nissan Chemicals Industries, Ltd.), 0.4 g of Sol Composition a of organosilane, 3 g of methyl isobutyl ketone and 0.6 g of cyclohexanone were added and stirred. The resulting solution was filtered through a polypropylene-made filter having a pore size of 1 μm to prepare Coating Solution F for Low Refractive Index Layer.

(Preparation of Coating Solution G for Low Refractive Index Layer)

Coating Solution G for Low Refractive Index Layer was prepared in the same manner as Coating Solution F including amounts added except that 1.95 g of a hollow silica dispersion (refractive index: 1.31, average particle size: 60 nm, solid concentration: 20%) was used in place of the colloidal silica dispersion in the preparation of Coating Solution. F for Low Refractive Index Layer.

(Preparation of Coating Solution H for Low Refractive Index Layer)

Perfluoroolefin Copolymer (1) (15.2 g), 1.4 g of a colloidal silica dispersion (silica, a product differing in the particle size from MEK-ST, average particle size: 45 nm, solid concentration: 30%, produced by Nissan Chemicals Industries, Ltd.), 0.3 g of a reactive silicone X-22-164B (trade name, produced by Shin-Etsu Chemical Co., Ltd.), 7.3 g of Sol Solution a, 0.76 g of a photopolymerization initiator (Irgacure 907 (trade name), produced by Ciba Geigy), 301 g of methyl isobutyl ketone and 9.0 g of cyclohexanone were added and stirred. The resulting solution was filtered through a polypropylene-made filter having a pore size of 5 μm to prepare Coating Solution H for Low Refractive Index Layer.

(Preparation of Coating Solution I for Low Refractive Index Layer)

Coating Solution I for Low Refractive Index Layer was prepared in the same manner as Coating Solution I including amounts added except that 1.95 g of a hollow silica dispersion (refractive index: 1.31, average particle size: 60 nm, solid concentration: 20%) was used in place of the colloidal silica dispersion in the preparation of Coating Solution H for Low Refractive Index Layer.

(Production of Antireflection Film, Samples 101 to 136 of the Invention and Comparative Samples 101 to 112)

A coating solution for hard coat layer was coated on a 80 μm-thick triacetyl cellulose film (TD-80UF, produced by Fuji Photo Film Co., Ltd.) by a gravure coater and dried at 100° C. Thereafter, an ultraviolet ray was irradiated thereon at an illuminance of 400 mW/cm$^2$ and an irradiation dose of 300 mJ/cm$^2$ by using an air cooled metal halide lamp of 160 W/cm (manufactured by Eye Graphics Co., Ltd.) under nitrogen purging of giving an atmosphere having an oxygen concentration of 1.0 vol % or less and thereby the coating layer was cured to form a hard coat layer having a thickness of 3.5 μm.

On this hard coat layer, a coating solution for medium refractive index layer was coated by a gravure coater and dried at 100° C. Thereafter, an ultraviolet ray was irradiated thereon at an illuminance of 550 mW/cm$^2$ and an irradiation dose of 600 mJ/cm$^2$ by using an air cooled metal halide lamp of 240 W/cm (manufactured by Eye Graphics Co., Ltd.) under nitrogen purging of giving an atmosphere having an oxygen concentration of 1.0 vol % or less and thereby the coating layer was cured to form a medium refractive index layer (refractive index: 1.65, film thickness: 67 nm).

On the medium refractive index layer, a coating solution for high refractive index layer was coated by a gravure coater and dried at 100° C. Thereafter, an ultraviolet ray was irradiated thereon at an illuminance of 550 mW/cm$^2$ and an irradiation dose of 600 mJ/cm$^2$ by using an air cooled metal halide lamp of 240 W/cm (manufactured by Eye Graphics Co., Ltd.) under nitrogen purging of giving an atmosphere having an oxygen concentration of 1.0 vol % or less and thereby the coating layer was cured to form a high refractive index layer (refractive index: 1.93, film thickness: 107 nm).

On the high refractive index layer, a coating solution for low refractive index layer was coated by a gravure coater and dried at 80° C. Thereafter, an ultraviolet ray was irradiated thereon at an illuminance of 550 mW/cm$^2$ and an irradiation dose of 600 mJ/cm$^2$ by using an air cooled metal halide lamp of 160 W/cm (manufactured by Eye Graphics Co., Ltd.) under nitrogen purging of giving an atmosphere having an oxygen concentration of 1.0 vol % or less and thereby a low refractive index layer (refractive index: 1.43, film thickness: 86 nm) was formed. In this way, Antireflection Film Samples 101 to 136 of the invention and Comparative Samples 101 to 112 were produced.

(Evaluation of Antireflection Film)

The obtained film samples were evaluated in the same manner as in Example 1. The results are shown in Tables 4 and 5.

TABLE 4

| | Middle Refractive Index Layer Coating Solution | Fluoro-aliphatic Group-Containing Copolymer | High Refractive Index Layer Coating Solution | Fluoro-aliphatic Group-Containing Copolymer | Low Refractive Index Layer Coating Solution | Surface Tension (mN/m) Before Addition | After Addition |
|---|---|---|---|---|---|---|---|
| Comparative Sample 101 | E-1 | not added | F-1 | not added | F | 30 | — |
| Sample 101 of Invention | E | FP-8 | F-1 | not added | F | 30 | 29 |
| Sample 102 of Invention | E-2 | FP-13 | F-1 | not added | F | 30 | 27 |
| Sample 103 of Invention | E-3 | FP-132 | F-1 | not added | F | 30 | 25 |
| Sample 104 of Invention | E | FP-8 | F-1 | not added | G | 30 | 29 |
| Sample 105 of Invention | E-2 | FP-13 | F-1 | not added | G | 30 | 27 |
| Sample 106 of Invention | E-3 | FP-132 | F-1 | not added | G | 30 | 25 |
| Comparative Sample 102 | E-4 | R-1 | F-1 | not added | F | 30 | 21 |
| Comparative Sample 103 | E-1 | not added | F-1 | not added | F | 30 | — |
| Sample 107 of Invention | E-1 | not added | F | FP-8 | F | 30 | 29 |
| Sample 108 of Invention | E-1 | not added | F-2 | FP-13 | F | 30 | 27 |
| Sample 109 of Invention | E-1 | not added | F-3 | FP-132 | F | 30 | 25 |
| Sample 110 of Invention | E-1 | not added | F | FP-8 | G | 30 | 29 |
| Sample 111 of Invention | E-1 | not added | F-2 | FP-13 | G | 30 | 27 |
| Sample 112 of Invention | E-1 | not added | F-3 | FP-132 | G | 30 | 25 |
| Comparative Sample 104 | E-1 | not added | F-4 | R-1 | F | 30 | 21 |
| Comparative Sample 105 | E-1 | not added | F-1 | not added | F | 30 | — |
| Sample 113 of Invention | E | FP-8 | F | FP-8 | F | 30 | 29 |
| Sample 114 of Invention | E-2 | FP-13 | F-2 | FP-13 | F | 30 | 27 |
| Sample 115 of Invention | E-3 | FP-132 | F-3 | FP-132 | F | 30 | 25 |
| Sample 116 of Invention | E | FP-8 | F | FP-8 | G | 30 | 29 |

TABLE 4-continued

| | | | | | | | |
|---|---|---|---|---|---|---|---|
| Sample 117 of Invention | E-2 | FP-13 | F-2 | FP-13 | G | 30 | 27 |
| Sample 118 of Invention | E-3 | FP-132 | F-3 | FP-132 | G | 30 | 25 |
| Comparative Sample 106 | E-4 | R-1 | F-4 | R-1 | F | 30 | 21 |

| | Surface Free Energy (mN/m) | | Reflectance Integrating Sphere (%) | Scratch Resistance | | Surface State Uniformity |
|---|---|---|---|---|---|---|
| | Before Coating | After Coating | | Steel Wool | Cotton Swab (Water-Wetted) | |
| Comparative Sample 101 | 34 | 34 | 0.3 | ◉ | ○ | X |
| Sample 101 of Invention | 30 | 34 | 0.35 | ○ | ○ | ○ |
| Sample 102 of Invention | 28 | 32 | 0.35 | ○ | ○ | ○ |
| Sample 103 of Invention | 27 | 29 | 0.4 | ○Δ | ○ | ○ |
| Sample 104 of Invention | 30 | 35 | 0.2 | ○Δ | ○ | ○ |
| Sample 105 of Invention | 29 | 33 | 0.2 | ○Δ | ○ | ○ |
| Sample 106 of Invention | 27 | 29 | 0.3 | ○Δ | ○ | ○ |
| Comparative Sample 102 | 26 | 26 | 0.6 | X | ○ | ○ |
| Comparative Sample 103 | — | 34 | 0.3 | ◉ | ○ | X |
| Sample 107 of Invention | 29 | 34 | 0.35 | ○ | ○ | ○ |
| Sample 108 of Invention | 27 | 32 | 0.35 | ○ | ○ | ○ |
| Sample 109 of Invention | 25 | 29 | 0.4 | ○Δ | ○ | ○ |
| Sample 110 of Invention | 29 | 35 | 0.2 | ○Δ | ○ | ○ |
| Sample 111 of Invention | 29 | 33 | 0.2 | ○Δ | ○ | ○ |
| Sample 112 of Invention | 27 | 29 | 0.3 | ○Δ | ○ | ○ |
| Comparative Sample 104 | 26 | 26 | 0.6 | X | ○ | ○ |
| Comparative Sample 105 | 34 | 34 | 0.3 | ○ | ○ | X |
| Sample 113 of Invention | 30 | 34 | 0.4 | ○Δ | ○ | ○ |
| Sample 114 of Invention | 28 | 32 | 0.4 | ○Δ | ○ | ○ |
| Sample 115 of Invention | 27 | 29 | 0.5 | ○Δ | ○ | ○ |
| Sample 116 of Invention | 30 | 35 | 0.25 | ○Δ | ○ | ○ |

TABLE 4-continued

|  |  |  |  |  |  |  |
|---|---|---|---|---|---|---|
| Sample 117 of Invention | 29 | 33 | 0.25 | ○△ | ○ | ○ |
| Sample 118 of Invention | 25 | 29 | 0.4 | ○△ | ○ | ○ |
| Comparative Sample 106 | 21 | 26 | 0.9 | X | ○ | ○ |

TABLE 5

| | Middle Refractive Index Layer Coating Solution | Fluoro-aliphatic Group-Containing Copolymer | High Refractive Index Layer Coating Solution | Fluoro-aliphatic Group-Containing Copolymer | Low Refractive Index Layer Coating Solution | Surface Tension (mN/m) Before Addition | After Addition |
|---|---|---|---|---|---|---|---|
| Comparative Sample 107 | E-1 | not added | F-1 | not added | H | 30 | — |
| Sample 119 of Invention | E | FP-8 | F-1 | not added | H | 30 | 29 |
| Sample 120 of Invention | E-2 | FP-13 | F-1 | not added | H | 30 | 27 |
| Sample 121 of Invention | E-3 | FP-132 | F-1 | not added | H | 30 | 25 |
| Sample 122 of Invention | E | FP-8 | F-1 | not added | I | 30 | 29 |
| Sample 123 of Invention | E-2 | FP-13 | F-1 | not added | I | 30 | 27 |
| Sample 124 of Invention | E-3 | FP-132 | F-1 | not added | I | 30 | 25 |
| Comparative Sample 108 | E-4 | R-1 | F-1 | not added | H | 30 | 21 |
| Comparative Sample 109 | E-1 | not added | F-1 | not added | H | 30 | — |
| Sample 125 of Invention | E-1 | not added | F | FP-8 | H | 30 | 29 |
| Sample 126 of Invention | E-1 | not added | F-2 | FP-13 | H | 30 | 27 |
| Sample 127 of Invention | E-1 | not added | F-3 | FP-132 | H | 30 | 25 |
| Sample 128 of Invention | E-1 | not added | F | FP-8 | I | 30 | 29 |
| Sample 129 of Invention | E-1 | not added | F-2 | FP-13 | I | 30 | 27 |
| Sample 130 of Invention | E-1 | not added | F-3 | FP-132 | I | 30 | 25 |
| Comparative Sample 110 | E-1 | not added | F-4 | R-1 | H | 30 | 21 |
| Comparative Sample 111 | E-1 | not added | F-1 | not added | H | 30 | — |
| Sample 131 of Invention | E | FP-8 | F | FP-8 | H | 30 | 29 |
| Sample 132 of Invention | E-2 | FP-13 | F-2 | FP-13 | H | 30 | 27 |
| Sample 133 of Invention | E-3 | FP-132 | F-3 | FP-132 | H | 30 | 25 |

TABLE 5-continued

| | | | | | | | |
|---|---|---|---|---|---|---|---|
| Sample 134 of Invention | E | FP-8 | F | FP-8 | I | 30 | 29 |
| Sample 135 of Invention | E-2 | FP-13 | F-2 | FP-13 | I | 30 | 27 |
| Sample 136 of Invention | E-3 | FP-132 | F-3 | FP-132 | I | 30 | 25 |
| Comparative Sample 112 | E-4 | R-1 | F-4 | R-1 | H | 30 | 21 |

| | Surface Free Energy (mN/m) | | Reflectance Integrating Sphere (%) | Scratch Resistance | | Surface State Uniformity |
|---|---|---|---|---|---|---|
| | Before Coating | After Coating | | Steel Wool | Water-Wetted Cotton Swab | |
| Comparative Sample 107 | 34 | 34 | 0.3 | ◎ | ○ | X |
| Sample 119 of Invention | 30 | 34 | 0.35 | ◎ | ○ | ○ |
| Sample 120 of Invention | 28 | 32 | 0.35 | ○ | ○ | ○ |
| Sample 121 of Invention | 27 | 29 | 0.4 | ○ | ○ | ○ |
| Sample 122 of Invention | 30 | 35 | 0.2 | ○ | ○ | ○ |
| Sample 123 of Invention | 29 | 33 | 0.2 | ○ | ○ | ○ |
| Sample 124 of Invention | 27 | 29 | 0.3 | ○Δ | ○ | ○ |
| Comparative Sample 108 | 26 | 26 | 0.6 | X | ○ | ○ |
| Comparative Sample 109 | 34 | 34 | 0.3 | ◎ | ○ | X |
| Sample 125 of Invention | 30 | 34 | 0.35 | ◎ | ○ | ○ |
| Sample 126 of Invention | 28 | 32 | 0.35 | ○ | ○ | ○ |
| Sample 127 of Invention | 27 | 29 | 0.4 | ○ | ○ | ○ |
| Sample 128 of Invention | 30 | 35 | 0.2 | ○ | ○ | ○ |
| Sample 129 of Invention | 29 | 33 | 0.2 | ○ | ○ | ○ |
| Sample 130 of Invention | 27 | 29 | 0.3 | ○Δ | ○ | ○ |
| Comparative Sample 110 | 26 | 26 | 0.6 | X | ○ | ○ |
| Comparative Sample 111 | 34 | 34 | 0.3 | ◎ | ○ | X |
| Sample 131 of Invention | 30 | 34 | 0.4 | ○ | ○ | ○ |
| Sample 132 of Invention | 28 | 32 | 0.4 | ○ | ○ | ○ |
| Sample 133 of Invention | 27 | 29 | 0.5 | ○Δ | ○ | ○ |

TABLE 5-continued

| | | | | | | |
|---|---|---|---|---|---|---|
| Sample 134 of Invention | 30 | 35 | 0.25 | ○△ | ○ | ○ |
| Sample 135 of Invention | 29 | 33 | 0.25 | ○△ | ○ | ○ |
| Sample 136 of Invention | 27 | 29 | 0.4 | ○△ | ○ | ○ |
| Comparative Sample 112 | 26 | 26 | 0.9 | X | ○ | ○ |

* Measurements of surface tension and surface free energy of Samples in Tables 4 and 5:

In Comparative Samples 101 to 102 and Samples 101 to 106 of the Invention in Table 4 and Comparative Samples 107 to 108 and Samples 119 to 124 of the Invention in Table 5, the surface tension shows values of the coating solution for medium refractive index layer, and the surface free energy shows measured values of a sample where only the medium refractive index layer was formed, and a sample where only the solvent (a mixed solvent of methyl ethyl ketone and cyclohexanone) of the coating solution for high refractive index layer was spread on an obliquely inclined film after the formation of medium refractive index layer and dried.

In Comparative Samples 103 to 106 and Samples 107 to 118 of the Invention in Table 4 and Comparative Samples 109 to 112 and Samples 125 to 136 of the Invention in Table 5, the surface tension shows values of the coating solution for high refractive index layer, and the surface free energy shows measured values of a sample where the high refractive index layer was formed, and a sample where only the solvent (a mixed solvent of methyl ethyl ketone and cyclohexanone) of the coating solution for low refractive index layer was spread on an obliquely inclined film after the formation of high refractive index layer and dried.

From the results shown in Tables 4 and 5, the followings are clearly seen.

In the antireflection film of the present invention, the fluorine-base polymer is localized on the surface of the coating solution for functional layer and thereby the surface tension decreases, as a result, the surface, state uniformity is improved. Furthermore, the surface free energy of the functional layer is increased after coating of the solvent for forming the upper layer and good scratch resistance is obtained.

According to the present invention, an antireflection film having excellent surface state uniformity and high scratch resistance can be obtained with high productivity.

Example 3

A PVA film was dipped in an aqueous solution containing 2.0 g/liter of iodine and 4.0 g/liter of potassium iodide at 25° C. for 0.240 seconds and further dipped in an aqueous solution containing 10 g/liter of boric acid at 25° C. for 60 seconds. Subsequently, the film was introduced into a tenter stretching machine in the form shown in FIG. 2 of JP-A-2002-86554 and stretched to 5.3 times. Then, the tenter was bent as shown in FIG. 2 with respect to the stretching direction and thereafter, the width was kept constant. The film was dried in an atmosphere at 80° C. and removed from the tenter. The difference in the conveyance speed between right and left tenter clips was less than 0.05% and the angle made by the center line of film introduced and the center line of film delivered to the next step was 460. Here, |L1-L2| was 0.7 m, W was 0.7 m and a relationship of |L1-L2|=W was established. The substantial stretching direction Ax-Cx at the tenter outlet was inclined at 450 with respect to the center line 22 of film delivered to the next step. At the outlet of the tenter, wrinkling and deformation of film were not observed.

The film was laminated with saponified Fujitac (cellulose triacetate, retardation value: 3.0 nm) produced by Fuji Photo Film Co., Ltd., by using a 3% aqueous solution of PVA (PVA-117H produced by Kuraray Co., Ltd.) as the adhesive and the combined films were dried at 80° C. to obtain a polarizing plate having an effective width of 650 mm. The absorption axis direction of the obtained polarizing plate was inclined at 45° with respect to the longitudinal direction. The transmittance of this polarizing plate at 550 nm was 43.7% and the polarization degree was 99.97%. Furthermore, the polarizing plate was cut into a size of 310×233 mm, as a result, a polarizing plate having an absorption axis inclined at 450 with respect to the side could be obtained with an area efficiency of 91.5%.

Subsequently, each film of Samples (saponified) of the Invention produced in Examples 1 and 2 was laminated with this polarizing plate to produce a polarizing plate with an antiglare and antireflection film. Using this polarizing plate, a liquid crystal display device where an antiglare and antireflection layer was disposed as the outermost layer was produced. As a result, reflection of external light did not occur and excellent contrast was obtained. Also, the reflected image was effaced due to the antiglare property and thereby high visibility was ensured.

Example 4

Both surfaces of a polarizer produced by adsorbing iodine to polyvinyl alcohol and stretching the film were protected to produce a polarizing plate by bonding one surface with a 80 μm-thick triacetyl cellulose film (TAC-TD80U, produced by Fuji Photo Film Co., Ltd.) which was dipped in an aqueous 1.5 mol/liter NaOH solution at 55° C. for 2 minutes, then neutralized and washed with water, and bonding another surface with the triacetyl cellulose film of each Sample of the Invention in Examples 1 and 2, of which back surface was saponified. The thus-obtained polarizing plate was exchanged with the polarizing plate in the viewing side of a liquid crystal display device (having D-BEF produced by Sumitomo 3M, which is a polarizing separation film having a polarizing selection layer, between the backlight and the liquid crystal cell) of a note-type personal computer with a transmissive TN liquid crystal display device, such that the antireflection film side came to the outermost surface. As a result, the projection of surrounding scenes was extremely reduced and a display device having very high display quality was obtained.

Example 5

A view angle enlarging film (Wide View Film Ace, produced by Fuji Photo Film Co., Ltd.) having an optical compensation layer where the disc plane of a discotic structural unit is inclined with respect to the transparent support plane and the angle made by the disc plane of the discotic structural unit and the transparent support plane is changing in the depth direction of the optically anisotropic layer, was used for the protective film in the liquid crystal cell side of a polarizing plate which was laminated with each Sample of the Invention in Examples 1 and 2 and disposed in the viewing side of a transmissive TN liquid crystal cell, and also for the protective film in the liquid crystal cell side of a polarizing plate disposed in the backlight side. As a result, the contrast in a bright room was high, the view angle in the vertical and horizontal directions was very wide and the visibility was remarkably excellent. Thus, a liquid crystal display device having high display grade was obtained.

Samples 13 to 36 of the Invention (using Coating Solution B or C for Light-Diffusing Layer) have a scattered light intensity at 300 of 0.06% based on the light at an exit angle of 0° and when these samples were used, by virtue of their light scattering property, particularly the view angle in the downward direction and the yellow tinting in the horizontal direction were improved and a very excellent liquid crystal display device was obtained. In the case of a film for comparison produced in the same manner as Samples 13 to 36 of the Invention except for eliminating the crosslinked PMMA particle and silica particle from Coat Solution B for Light-Diffusing Layer, the scattered light intensity at 300 based on the light at an exit angle of 0° was substantially 0% and the effect of increasing the view angle in the downward direction and improving the yellow tinting was not obtained at all.

Example 6

Samples of the Invention in Examples 1 and 2 each was laminated to a glass plate on the surface of an organic EL display device through a pressure-sensitive adhesive, as a result, the reflection on the glass surface was suppressed and a display device having high visibility was obtained.

Example 7

Using each Sample of Examples 1 and 2, a polarizing plate having an antireflection film on one surface was produced and a λ/4 plate was laminated to the surface opposite the surface having the antireflection film of the polarizing plate. This polarizing plate was laminated to a glass plate on the surface of an organic EL display device, as a result, the surface reflection and the reflection from the inside of the surface glass were cut and a display device having very high visibility was obtained.

INDUSTRIAL APPLICABILITY

The optical functional film, particularly antireflection film, of the present invention exhibits excellent scratch resistance while having sufficiently high antireflection property. Furthermore, the image display device equipped with the optical functional film or antireflection film of the present invention and the image display device equipped with a polarizing plate using the optical functional film or antireflection film of the present invention are reduced in the reflection of external light or in the projection of surrounding scenes and ensures very high visibility.

The invention claimed is:

1. A method for producing an optical functional film, comprising at least a first functional layer and a second functional layer, which are adjacently formed in this order on a transparent support, wherein a coating composition for forming the first functional layer contains a fluoroaliphatic group-containing copolymer which has a polymerization unit derived from a fluoroaliphatic group-containing monomer represented by formula (2), an amount of the fluoroaliphatic group-containing monomer being 50 weight % or more based on an entire monomer amount of the fluoroaliphatic group-containing copolymer, the fluoroaliphatic group-containing copolymer is localized on a surface of the first functional layer when the coating composition for forming the first functional layer is coated, and the fluoroaliphatic group-containing copolymer dissolves out into a coating composition for forming the second functional layer when the second functional layer is coated, wherein the coating composition for forming the second functional layer is applied onto the first functional layer after the first functional layer is cured by ionizing radiation:

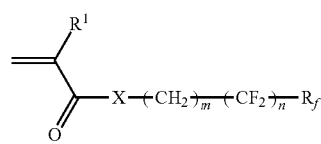

formula (2)

wherein $R^1$ represents a hydrogen atom, a halogen atom or a methyl group; X represents an oxygen atom, a sulfur atom or $-N(R^{12})-$; $R^{12}$ represents a hydrogen atom or an alkyl group having from 1 to 8 carbon atoms, which may have a substituent; $R_f$ represents $-CF_2H$; m represents an integer of 1 to 6; and n represents an integer of 1 to 17, and wherein the fluoroaliphatic group-containing copolymer may contain two or more polymerization units derived from the fluoroaliphatic group-containing monomer represented by formula (2).

2. The method according to claim 1, wherein the fluoroaliphatic group-containing copolymer comprises a polymerization unit derived from a monomer represented by formula (3):

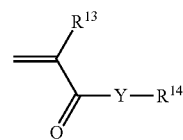

formula (3)

wherein $R^{13}$ represents a hydrogen atom, a halogen atom or a methyl group; Y represents an oxygen atom, a sulfur atom or $-N(R^{15})-$; $R^{15}$ represents a hydrogen atom or an alkyl group having from 1 to 8 carbon atoms; and $R^{1'}$ represents a linear, branched or cyclic alkyl group having from 1 to 60 carbon atoms, which may have a substituent, or an aromatic group which may have a substituent.

3. The method according to claim 1, wherein the coating composition for forming the first functional layer contains the fluoroaliphatic group-containing copolymer in an amount of from 0.001 to 1 weight %.

4. The method according to claim 1, wherein the fluoroaliphatic group-containing copolymer contained in the coating composition for forming the first functional layer has a weight average molecular weight of from 3,000 to 100,000.

5. The method according to claim 1, wherein the fluoroaliphatic group-containing copolymer contained in the coating composition for forming the first functional layer further comprises a polymerization unit derived from a monomer represented by the formula 3:

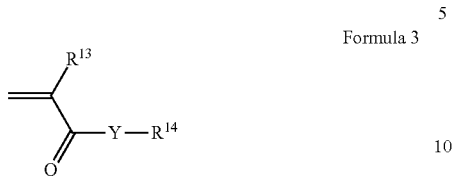

Formula 3 wherein $R^{13}$ represents a hydrogen atom, a halogen atom or a methyl group, Y represents an oxygen atom, a sulfur atom or $-N(R^{15})-$, $R^{15}$ represents a hydrogen atom or an alkyl group having from 1 to 8 carbon atoms, $R^{14}$ represents a linear, branched or cyclic alkyl group having from 1 to 60 carbon atoms which may have a substituent or an aromatic group which may have a substituent.

6. The method according to claim 5, wherein the aromatic group is a phenyl group or a naphthyl group.

7. The method according to claim 1, wherein the second functional layer is a low refractive index layer containing a cured composition of a crosslinking fluorine-containing polymer different from the fluoroaliphatic group-containing copolymer.

* * * * *